(12) United States Patent
Iwase et al.

(10) Patent No.: US 8,339,497 B2
(45) Date of Patent: Dec. 25, 2012

(54) INFORMATION PROCESSING APPARATUS, INFORMATION PROCESSING METHOD, AND PROGRAM FOR CHECKING PLURAL STORED IMAGES

(75) Inventors: Ayako Iwase, Kanagawa (JP); Hiroyuki Ozawa, Tokyo (JP); Ryo Takaoka, Tokyo (JP); Yuji Saitou, Tokyo (JP)

(73) Assignee: Sony Corporation, Tokyo (JP)

( * ) Notice: Subject to any disclaimer, the term of this patent is extended or adjusted under 35 U.S.C. 154(b) by 454 days.

(21) Appl. No.: 12/496,984

(22) Filed: Jul. 2, 2009

(65) Prior Publication Data
US 2010/0053216 A1  Mar. 4, 2010

(30) Foreign Application Priority Data

Aug. 29, 2008 (JP) ................... 2008-220895

(51) Int. Cl.
*H04N 5/222* (2006.01)
*H04N 5/228* (2006.01)
(52) U.S. Cl. ................ 348/333.01; 348/222.1
(58) Field of Classification Search .......... 345/173, 345/650; 348/222.1, 333.01; 715/700, 716, 715/764, 765, 766, 767, 769, 781, 782, 783, 715/784, 786, 788, 790, 791, 792, 793
See application file for complete search history.

(56) References Cited

U.S. PATENT DOCUMENTS

| | | | | |
|---|---|---|---|---|
| 5,283,864 | A * | 2/1994 | Knowlton | 715/776 |
| 6,006,227 | A * | 12/1999 | Freeman et al. | 707/695 |
| 6,466,237 | B1 * | 10/2002 | Miyao et al. | 715/838 |
| 6,638,313 | B1 * | 10/2003 | Freeman et al. | 715/275 |
| 6,725,427 | B2 * | 4/2004 | Freeman et al. | 715/273 |
| 6,768,999 | B2 * | 7/2004 | Prager et al. | 1/1 |
| 6,990,637 | B2 * | 1/2006 | Anthony et al. | 715/851 |
| 7,065,710 | B2 * | 6/2006 | Hayashi et al. | 715/732 |
| 7,296,242 | B2 * | 11/2007 | Agata et al. | 715/793 |
| 7,581,186 | B2 * | 8/2009 | Dowdy et al. | 715/727 |
| D609,715 | S * | 2/2010 | Chaudhri | D14/486 |

(Continued)

FOREIGN PATENT DOCUMENTS

EP  1 148 412 A2  10/2001

(Continued)

OTHER PUBLICATIONS

U.S. Appl. No. 12/580,627, filed Oct. 16, 2009, Ozawa, et al.

(Continued)

*Primary Examiner* — Nicholas Giles
(74) *Attorney, Agent, or Firm* — Oblon, Spivak, McClelland, Maier & Neustadt, L.L.P.

(57) ABSTRACT

An information processing apparatus includes: display means for displaying an image; operation input receiving means for receiving a user's operation input; and display control means for making a display control of allowing an image to correspond to an image card as an object imitating a real card, displaying a check image, which indicates a shape in which a plurality of the image cards overlap, on the display means, and displaying one of an image corresponding to a specific image card and information indicating the image in a partial or overall area of the specific image card when a check operation indicating an instruction to check the specific image card among the plurality of image cards is received by the operation input receiving means.

10 Claims, 40 Drawing Sheets

U.S. PATENT DOCUMENTS

| | | | |
|---|---|---|---|
| D613,300 S * | 4/2010 | Chaudhri | D14/488 |
| 7,797,641 B2 * | 9/2010 | Karukka et al. | 715/802 |
| D624,932 S * | 10/2010 | Chaudhri | D14/488 |
| 8,006,185 B2 * | 8/2011 | Marinkovich et al. | 715/723 |
| 2004/0150657 A1 * | 8/2004 | Wittenburg et al. | 345/619 |
| 2005/0091596 A1 * | 4/2005 | Anthony et al. | 715/712 |
| 2005/0210416 A1 * | 9/2005 | MacLaurin et al. | 715/851 |
| 2006/0109283 A1 * | 5/2006 | Shipman et al. | 345/629 |
| 2007/0067738 A1 * | 3/2007 | Flynt et al. | 715/810 |
| 2008/0062141 A1 * | 3/2008 | Chandhri | 345/173 |
| 2008/0129757 A1 * | 6/2008 | Tanaka et al. | 345/660 |
| 2009/0002335 A1 * | 1/2009 | Chaudhri | 345/173 |

FOREIGN PATENT DOCUMENTS

| | | |
|---|---|---|
| JP | 6-502732 | 3/1994 |
| JP | 2000-242390 | 9/2000 |
| JP | 2007-19685 | 1/2007 |
| JP | 2007-183989 | 7/2007 |
| WO | WO 2008/033853 A2 | 3/2008 |

OTHER PUBLICATIONS

U.S. Appl. No. 12/604,795, filed Oct. 23, 2009, Iwase, et al.
U.S. Appl. No. 12/607,475, filed Oct. 28, 2009, Ozawa, et al.
U.S. Appl. No. 12/776,856, filed May 10, 2010, Iwase, et al.
Japanese Office Action issued Jul. 19, 2011, in Patent Application No. 2008-220895.
European Search Report issued Nov. 11, 2010, in Application No. / Patent No. 09168919.0-2224 / 2161656.
Richard Mander, et al., "A 'Pile' Metharhor for Supporting Casual Organization of Information", Striking a Balance, (Proceedings of the Conference on Human Factors in Computing Systems), XP000426843, May 3-7, 1992, pp. 627-634.
U.S. Appl. No. 12/559,163, filed Sep. 14, 2009, Ozawa, et al.
U.S. Appl. No. 12/479,269, filed Jun. 5, 2009, Ozawa, et al.
U.S. Appl. No. 12/499,349, filed Jul. 8, 2009, Ozawa, et al.
U.S. Appl. No. 12/509,045, filed Jul. 24, 2009, Iwase, et al.
U.S. Appl. No. 12/511,717, filed Jul. 29, 2009, Iwase, et al.

* cited by examiner

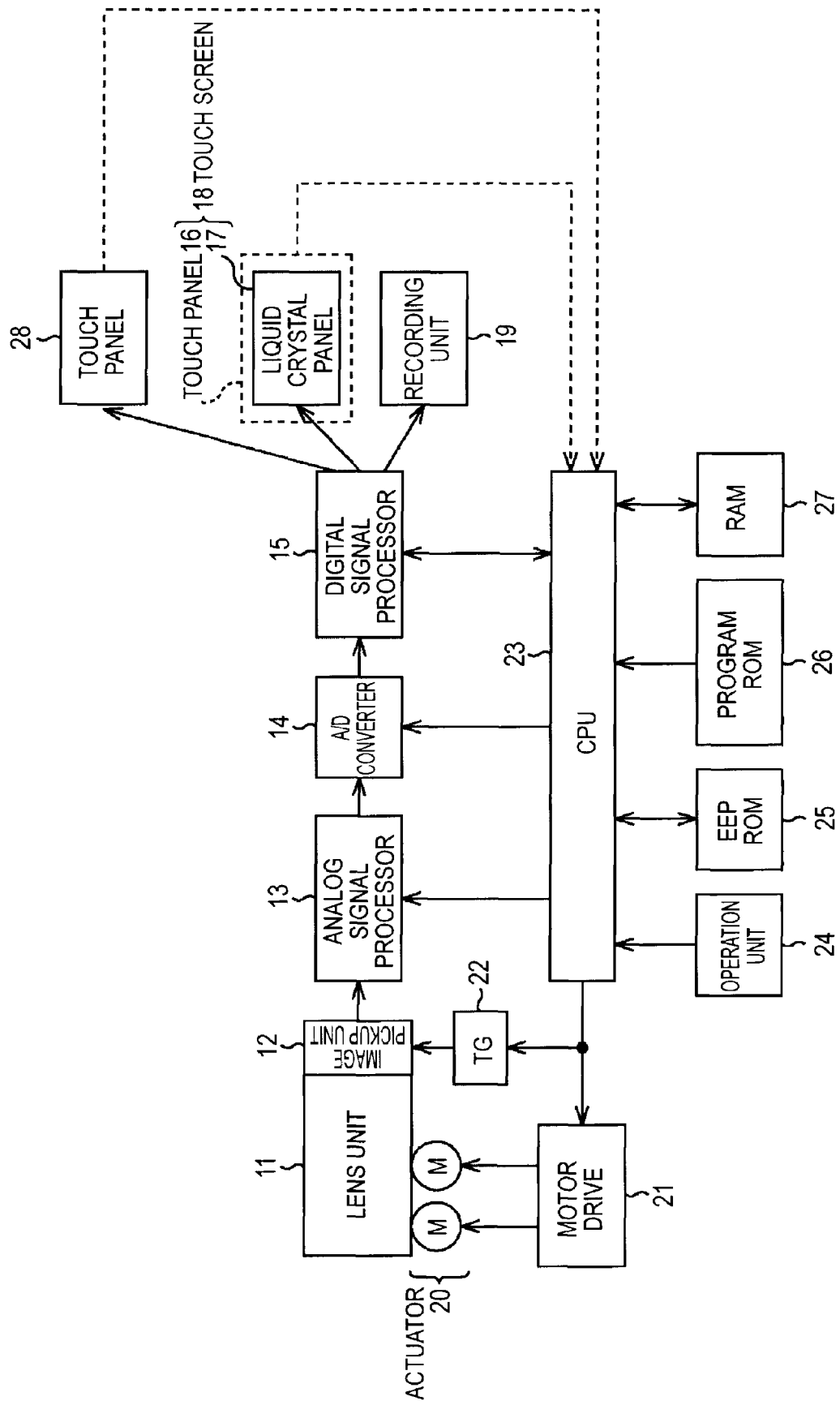

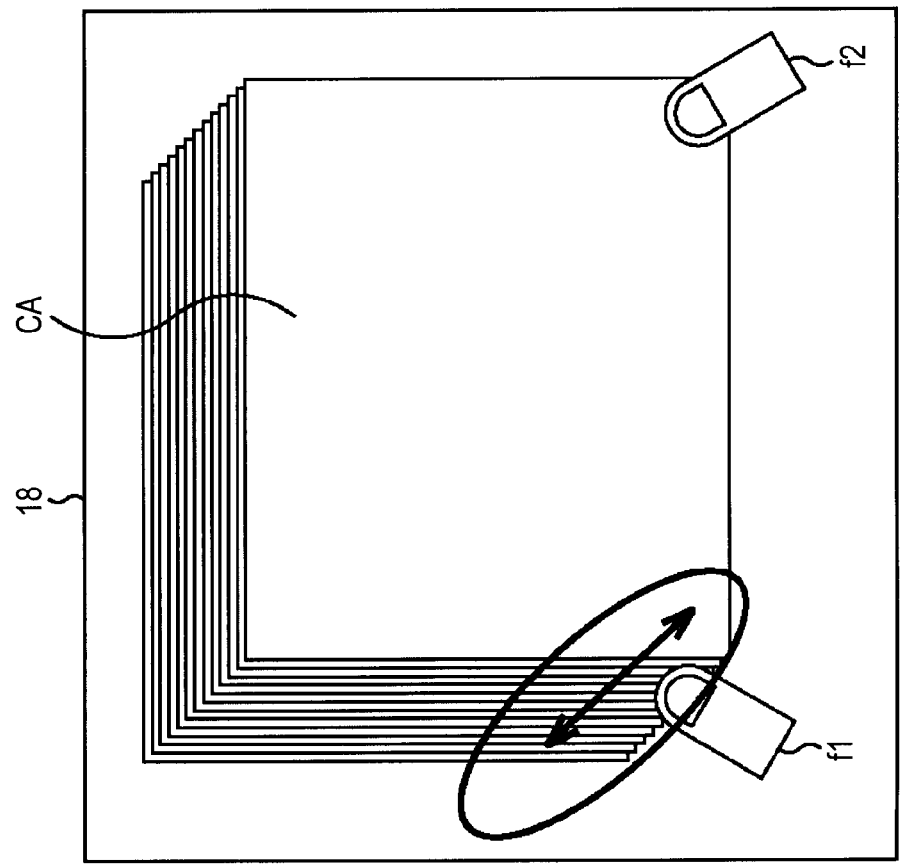
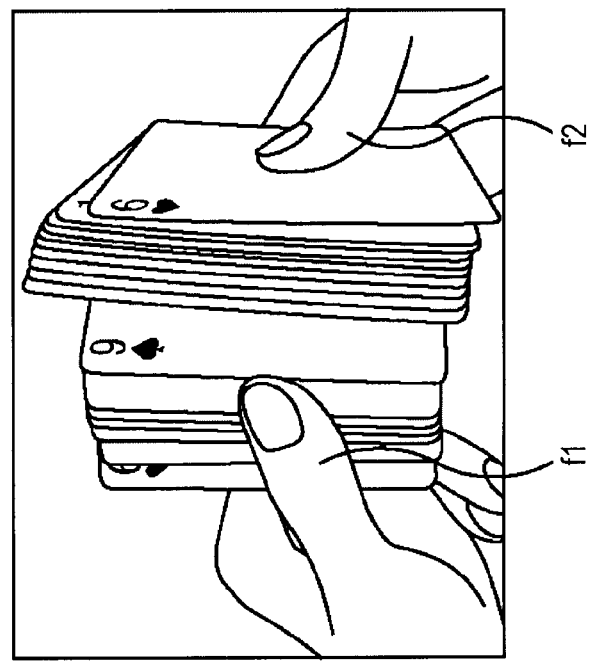

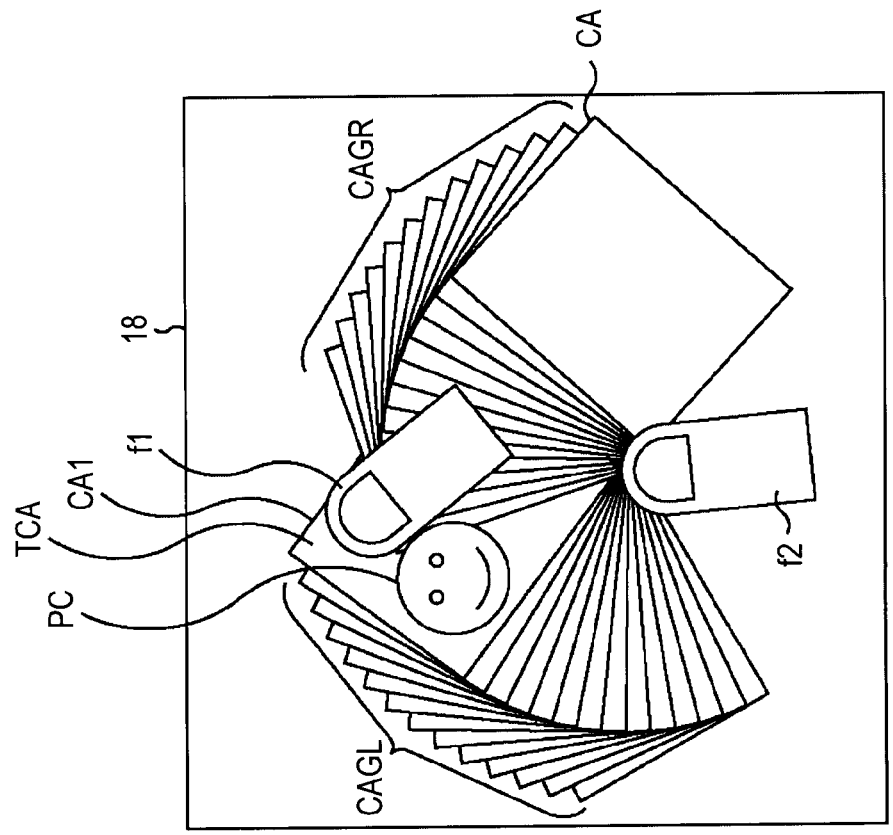
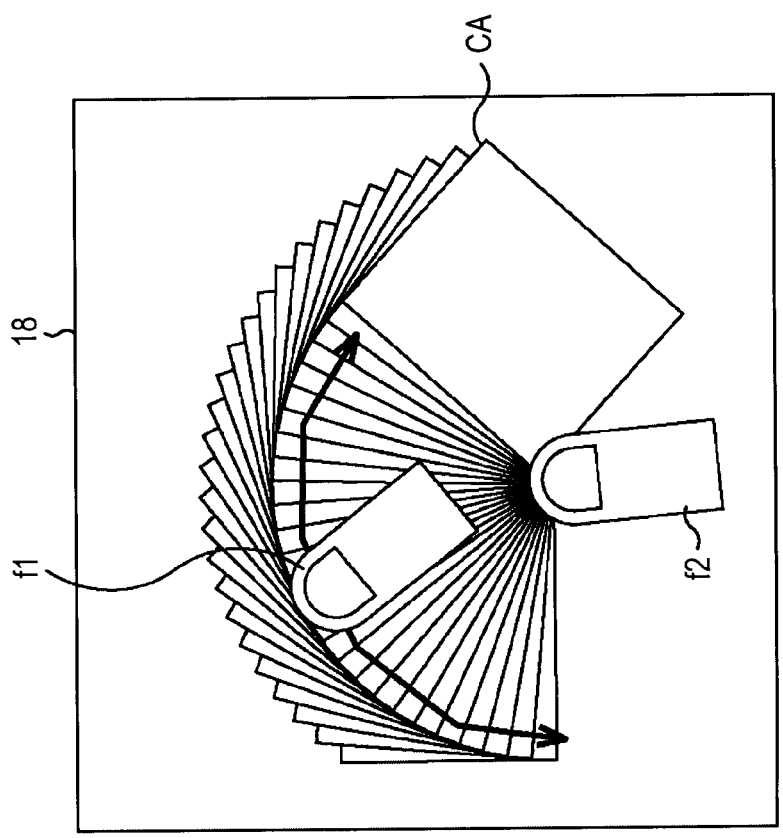

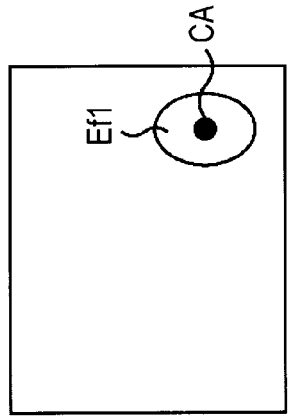
FIG.8E
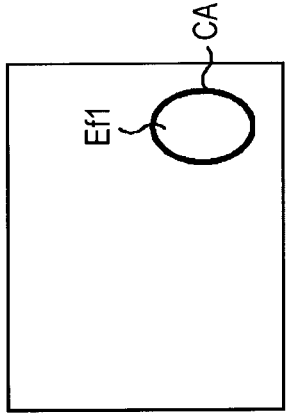
FIG.8F
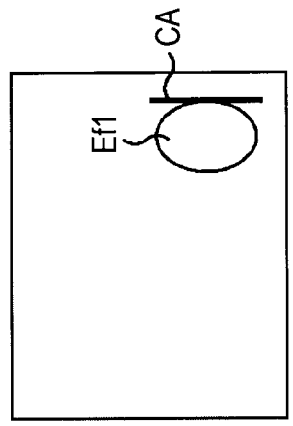
FIG.8B
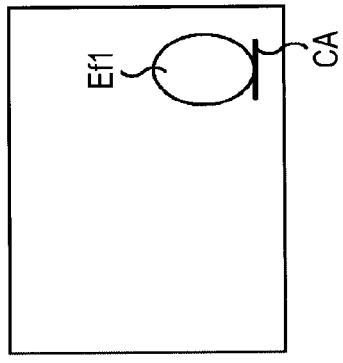
FIG.8D
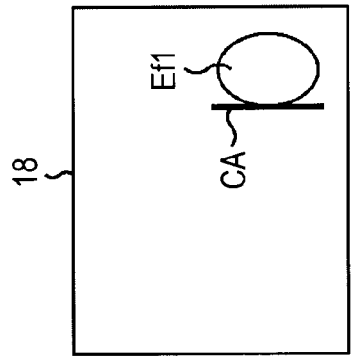
FIG.8A
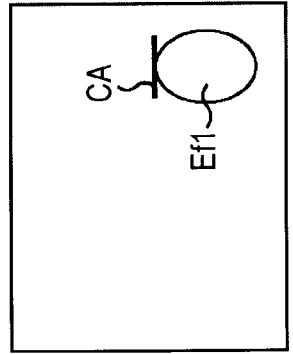
FIG.8C
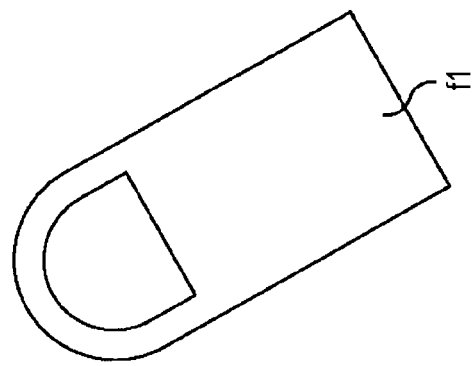

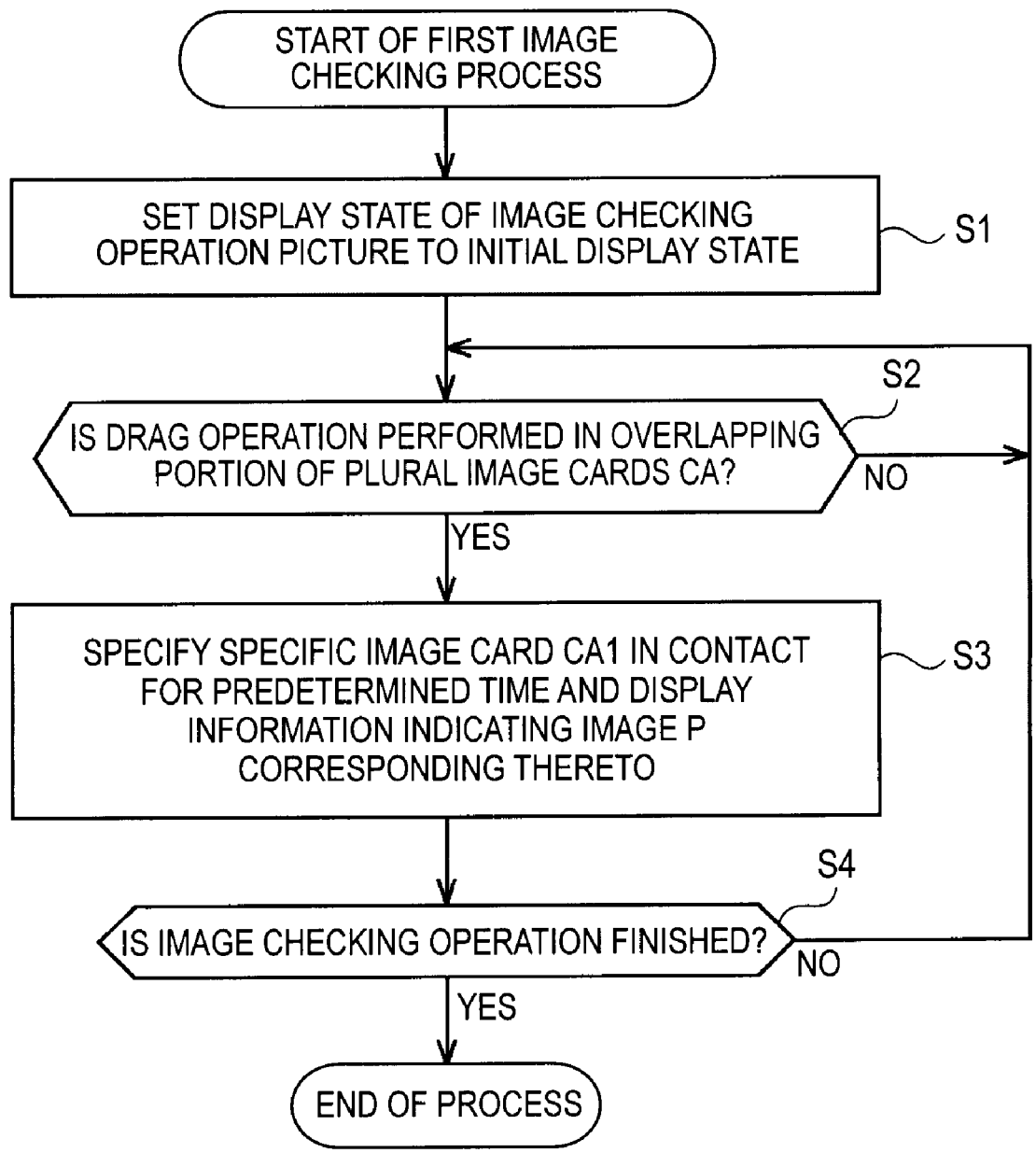

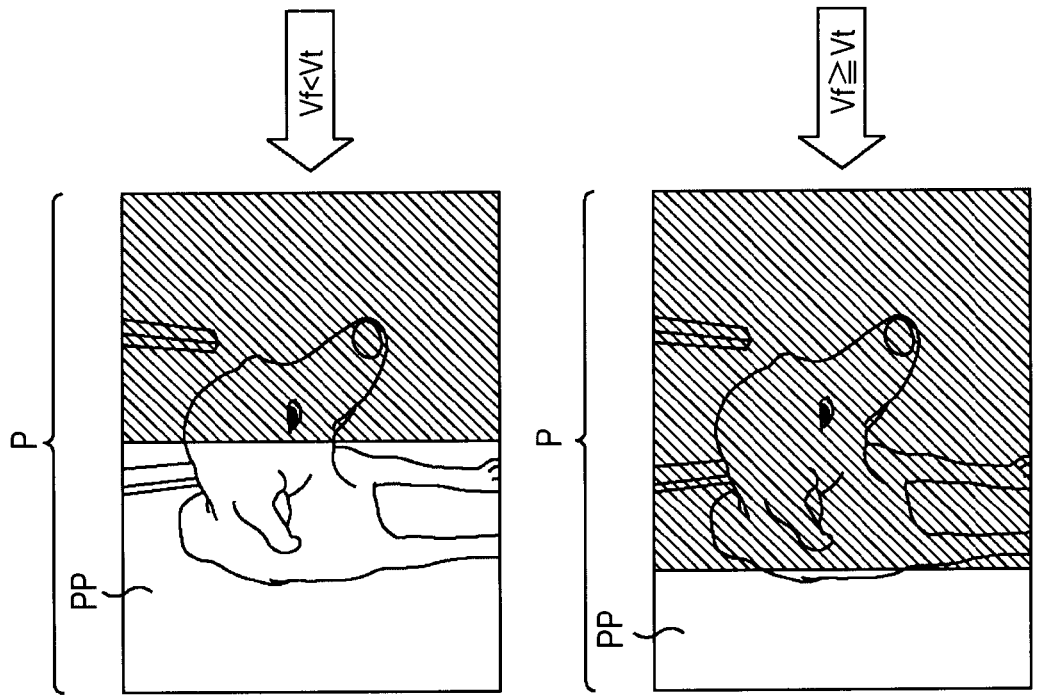
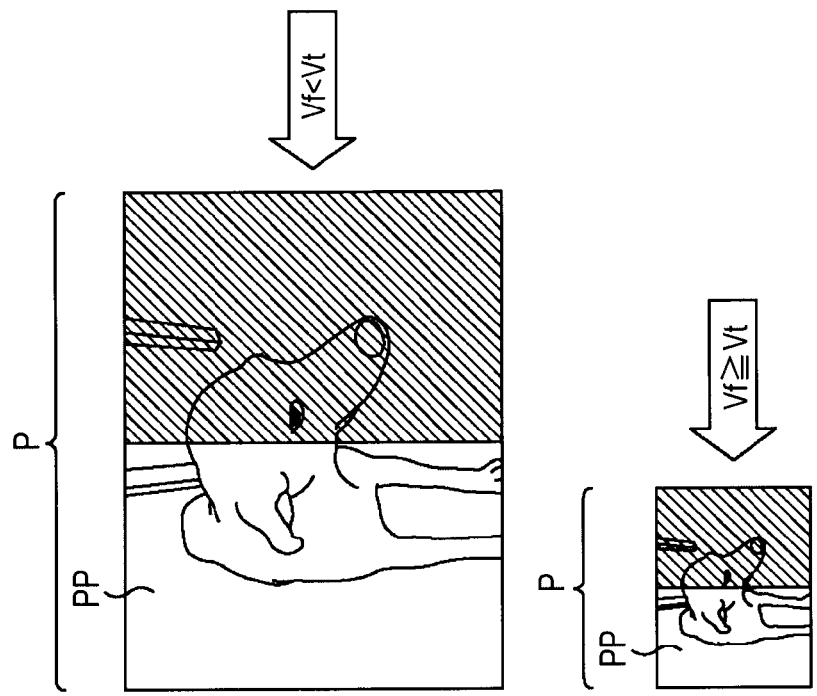

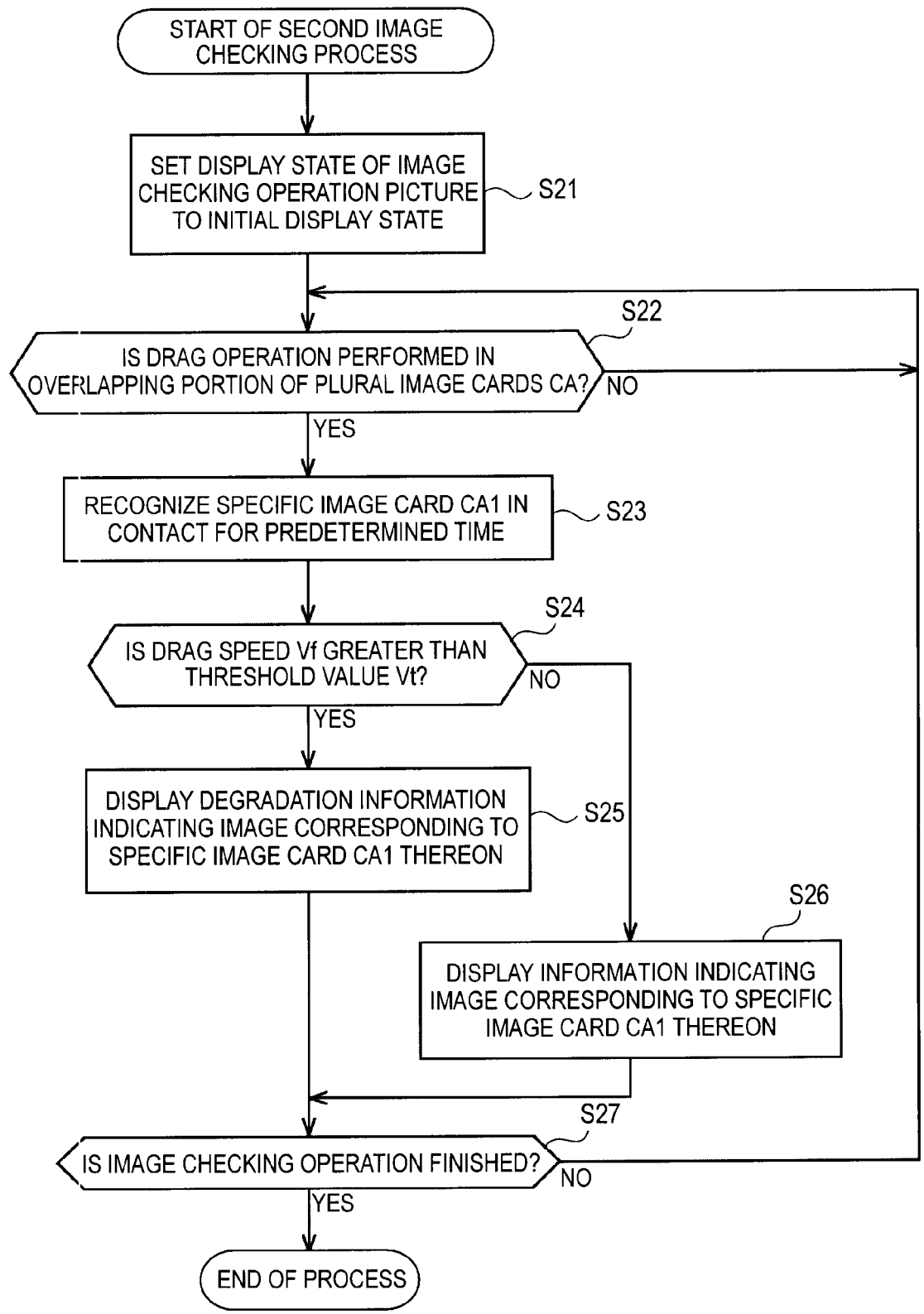

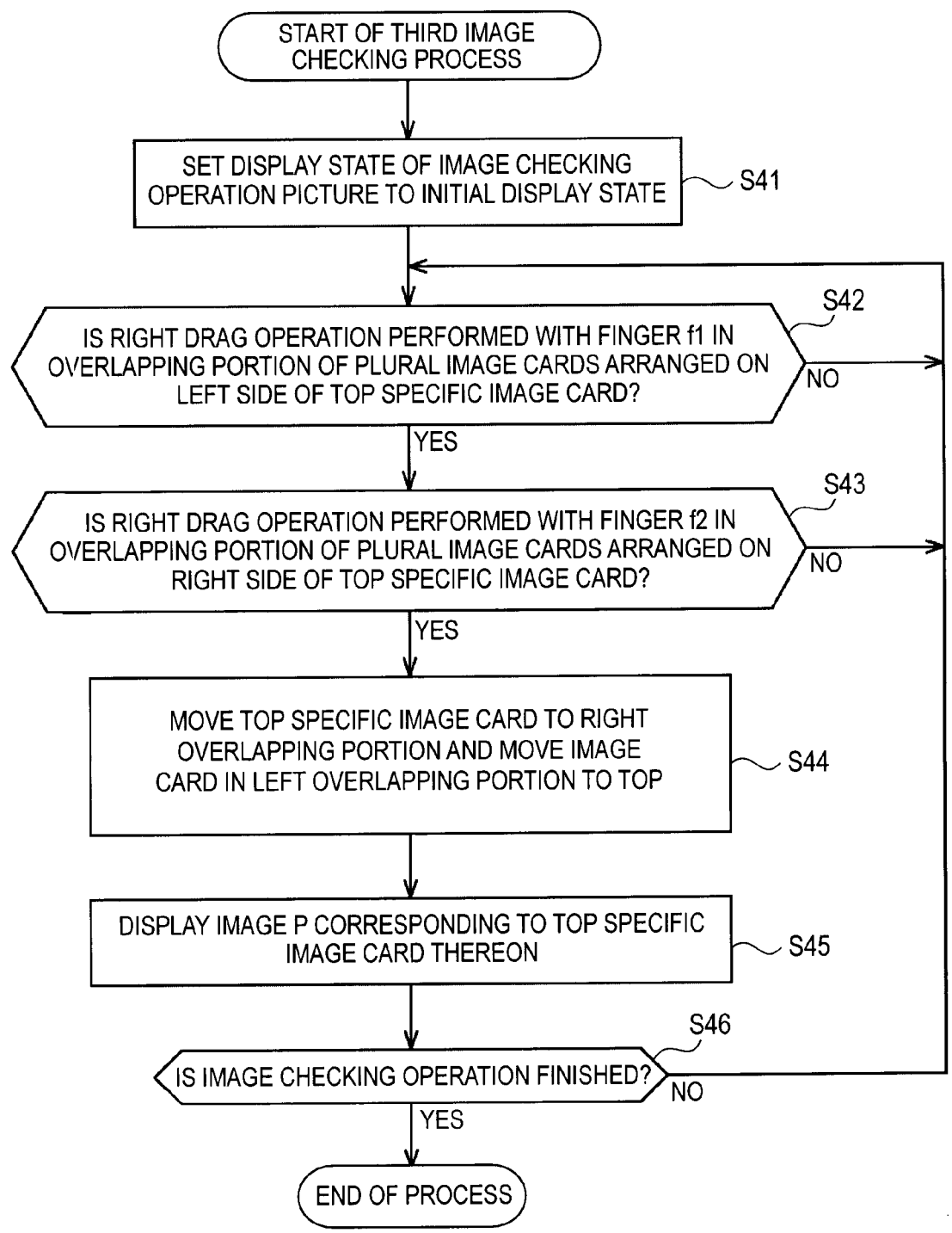

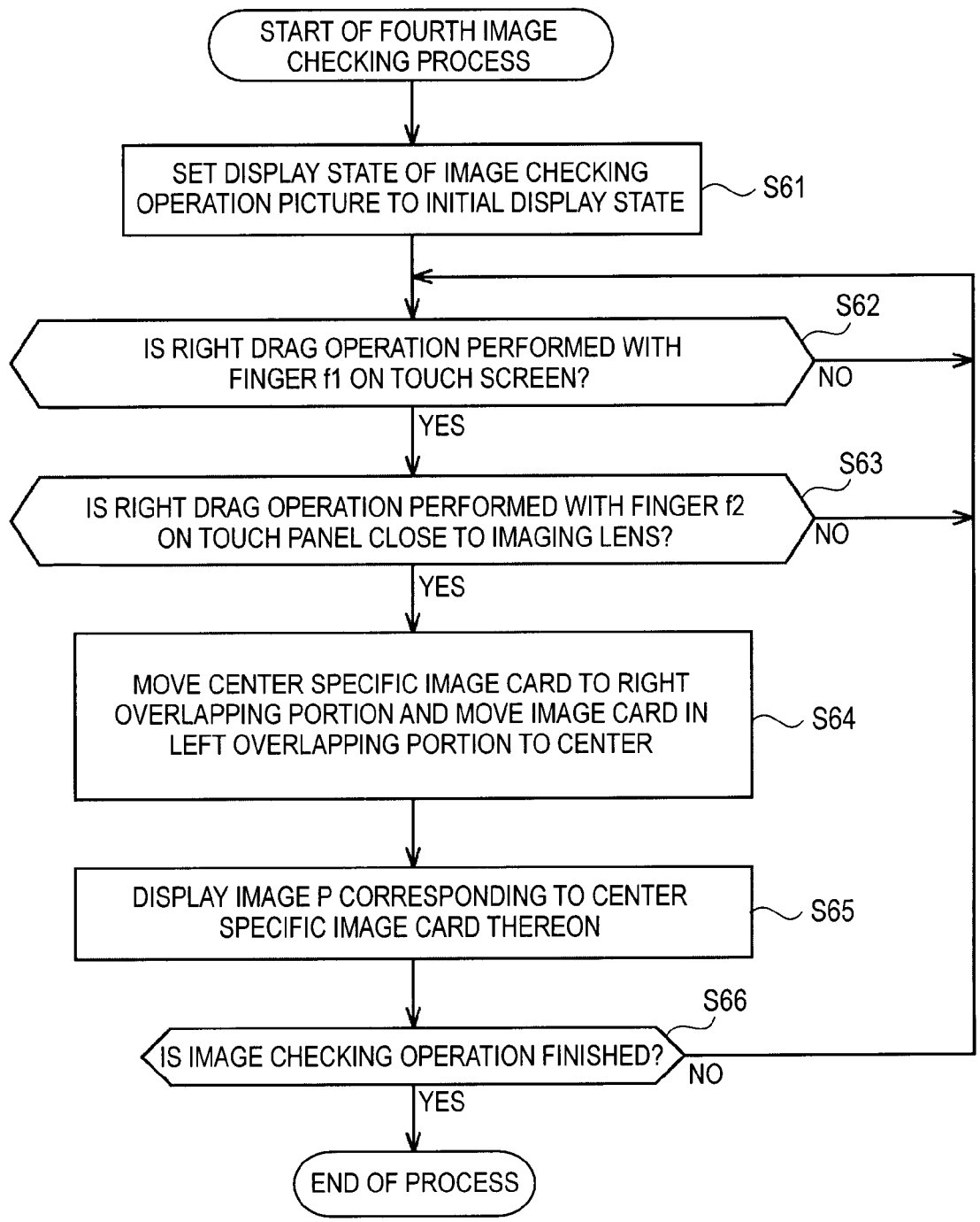

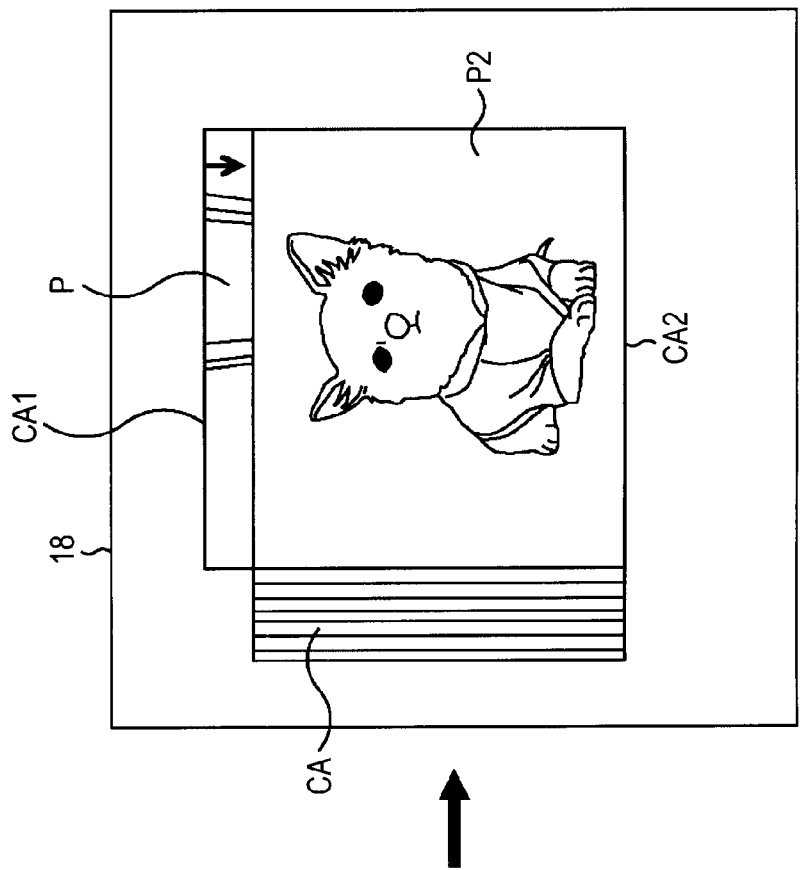
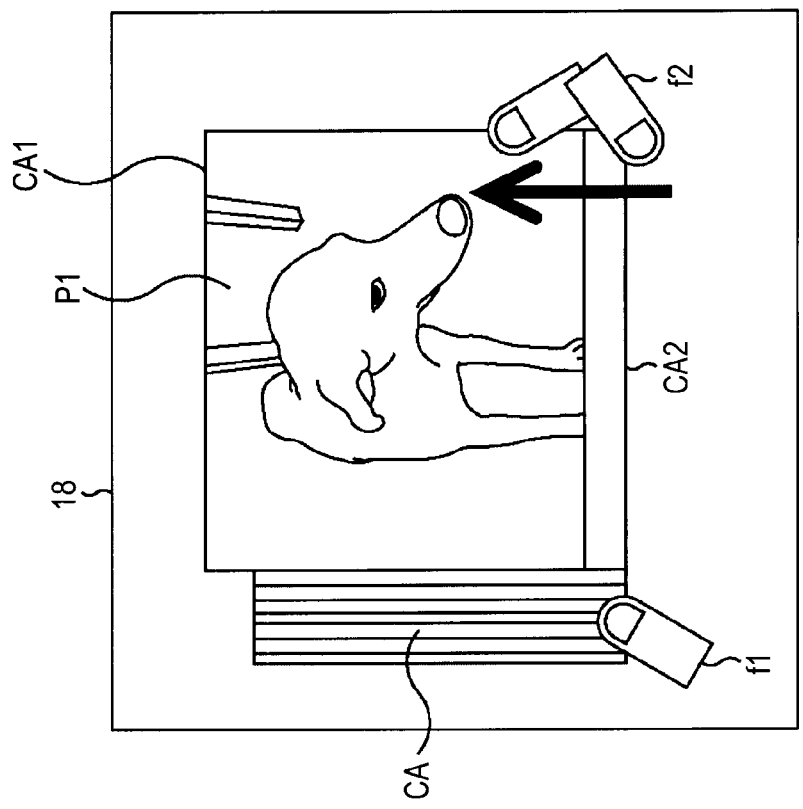

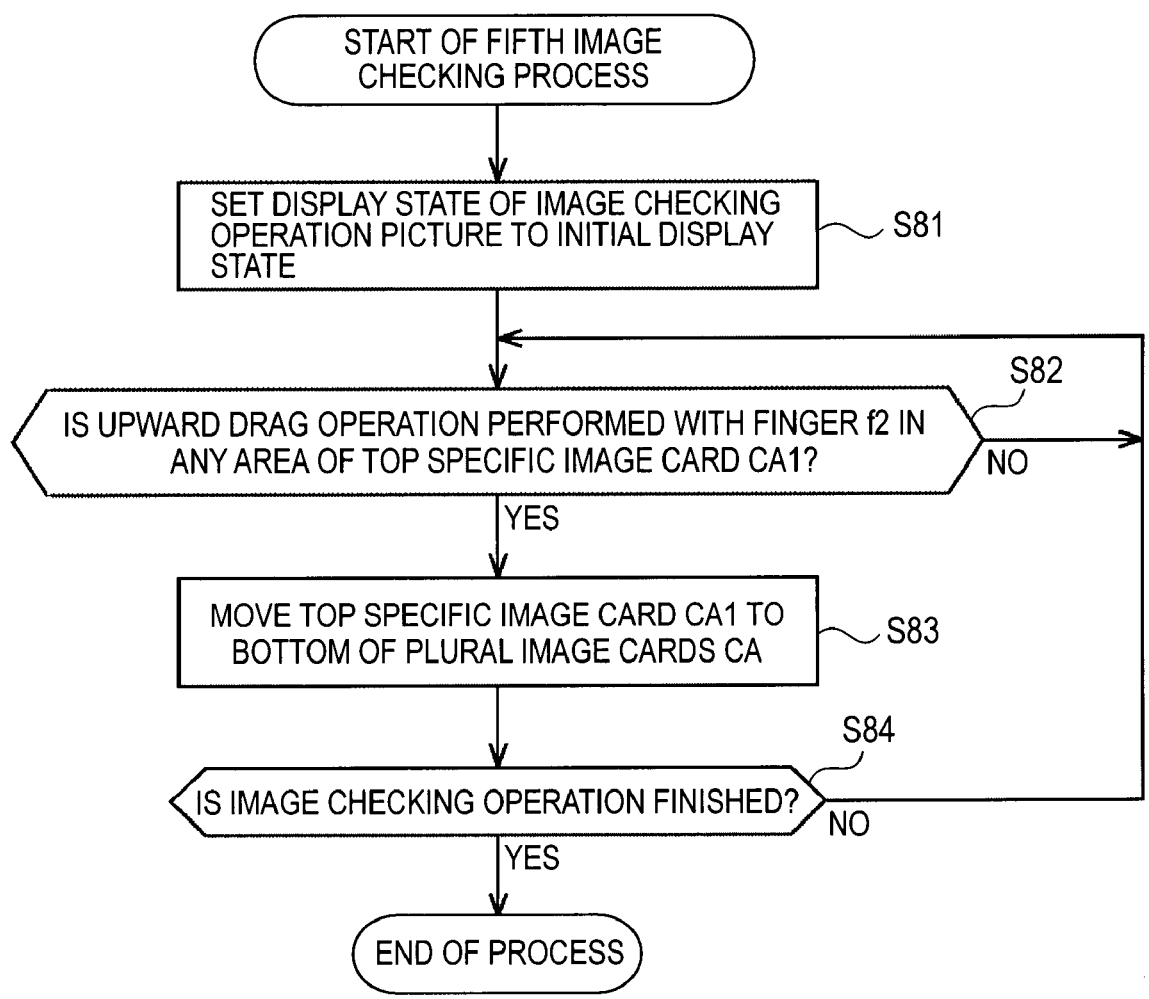

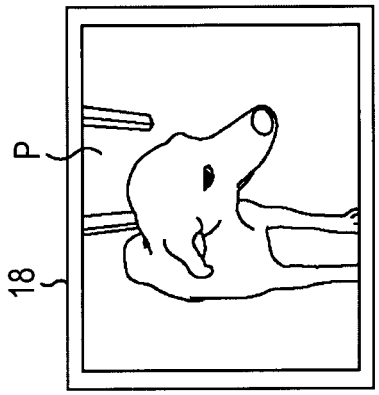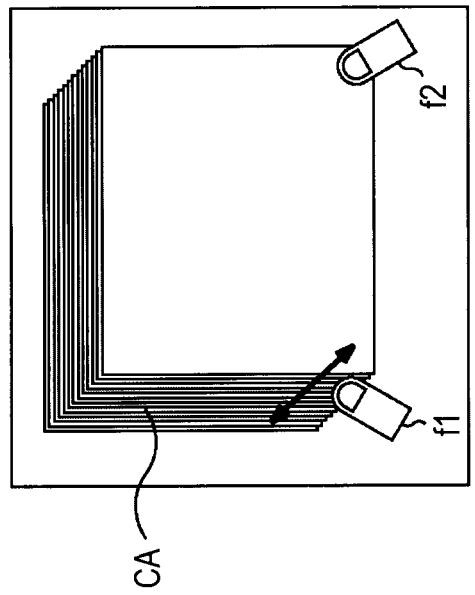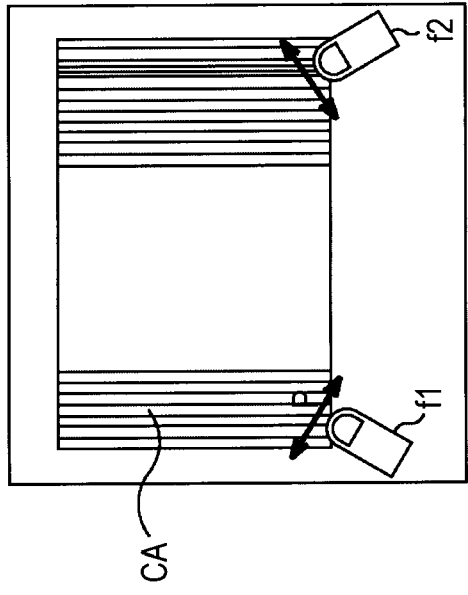

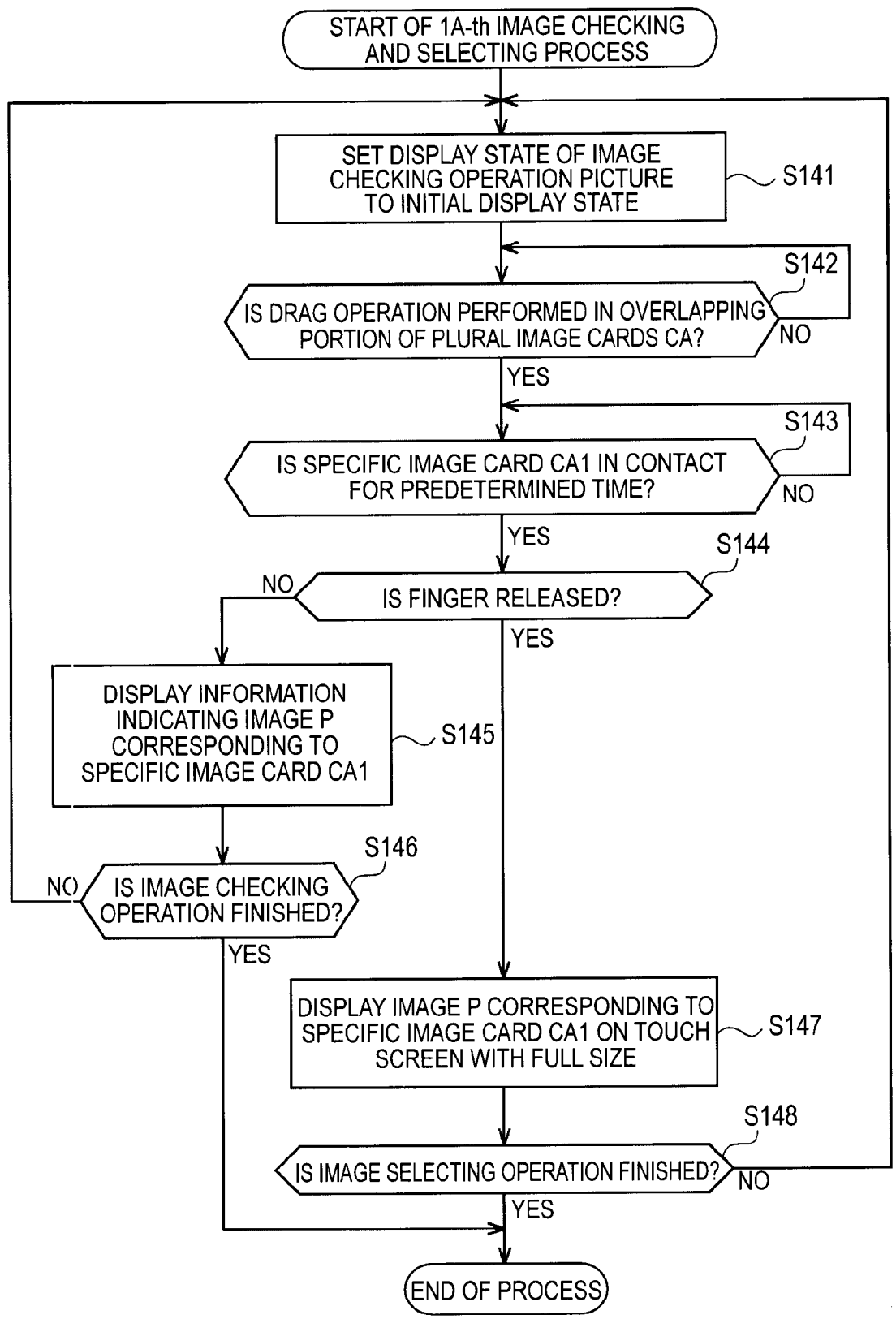

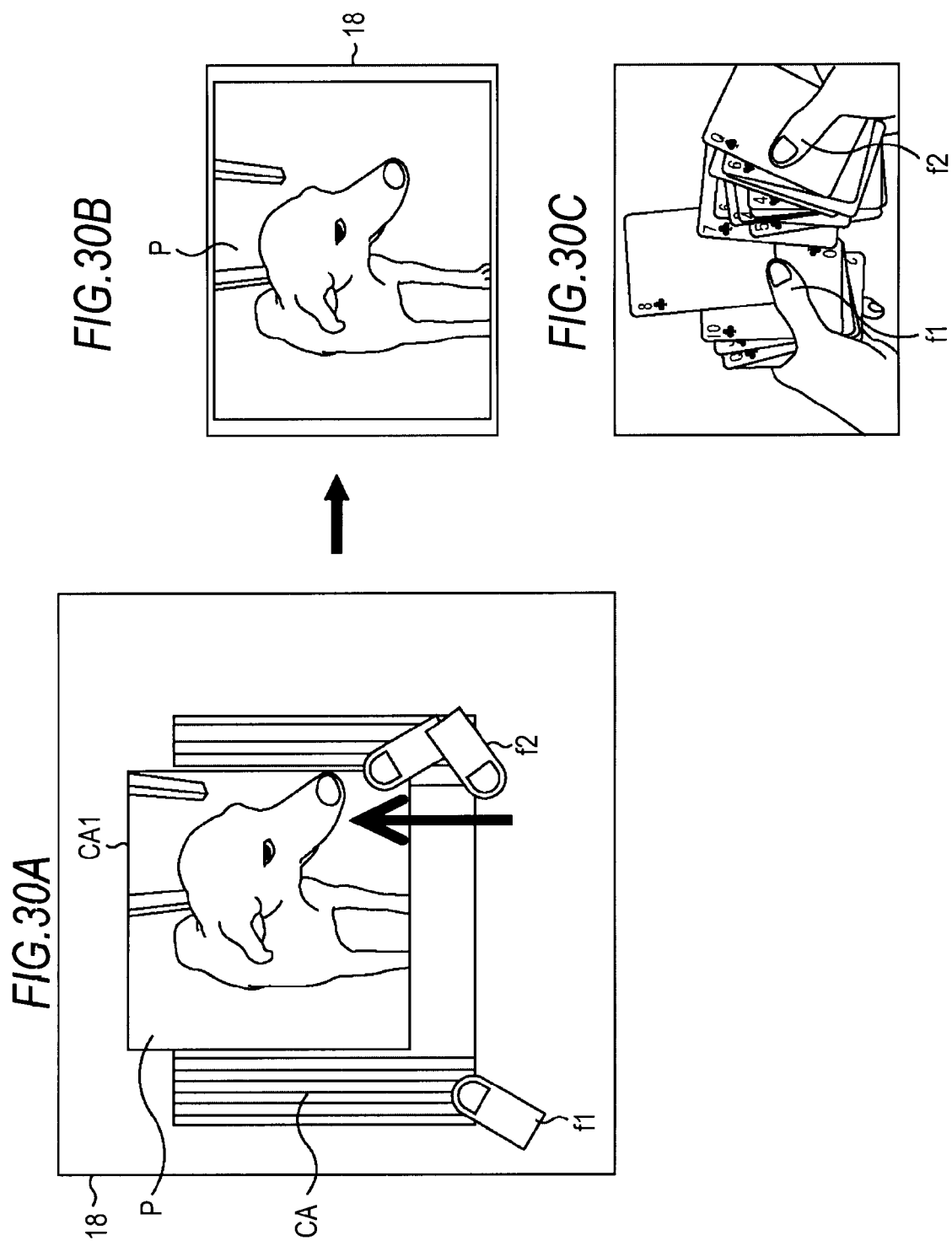

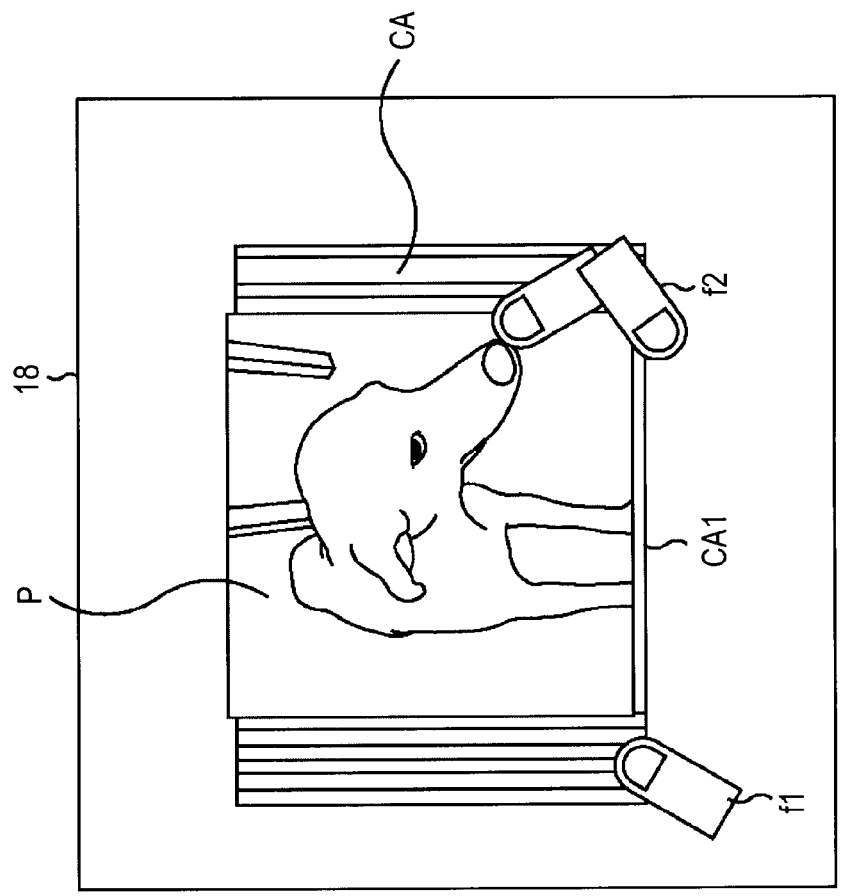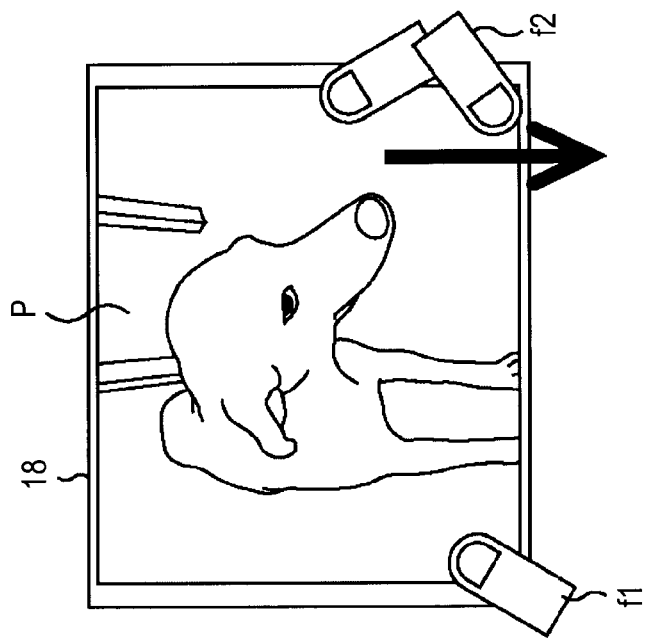

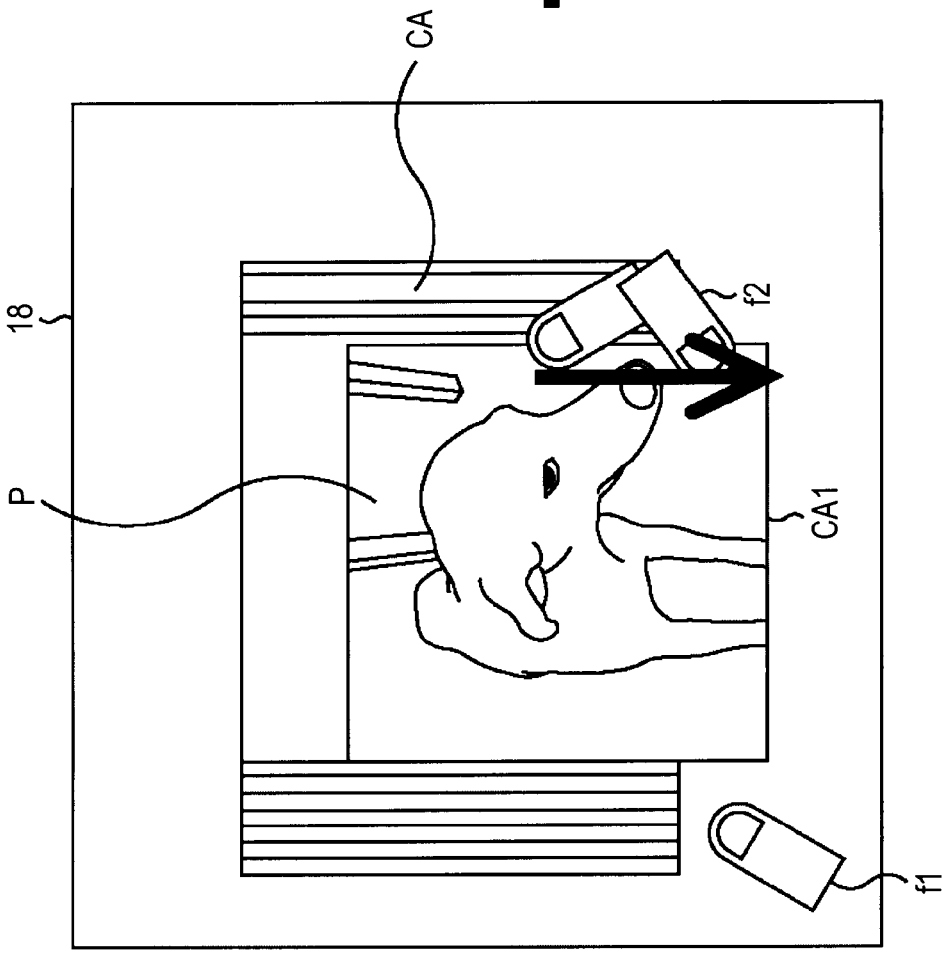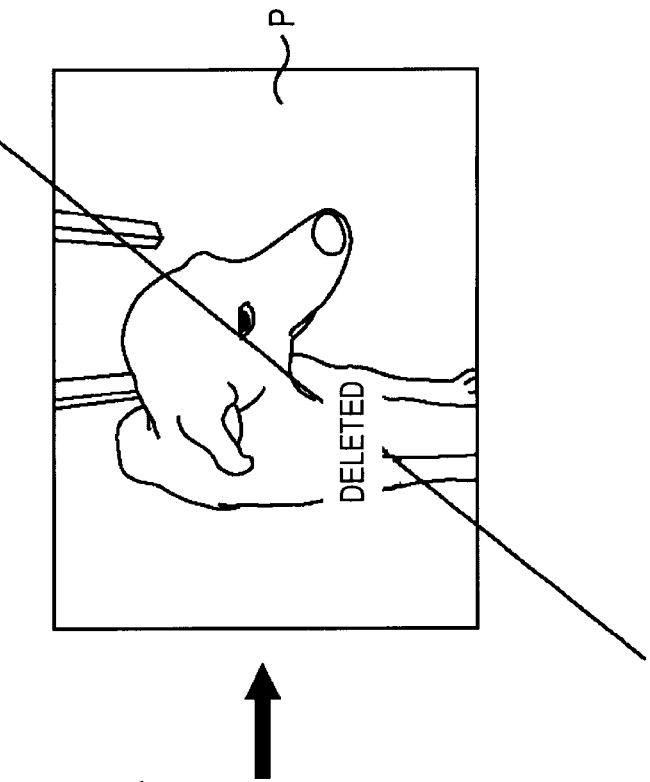

INFORMATION PROCESSING APPARATUS, INFORMATION PROCESSING METHOD, AND PROGRAM FOR CHECKING PLURAL STORED IMAGES

BACKGROUND OF THE INVENTION

1. Field of the Invention

The present invention relates to an information processing apparatus, an information processing method, and a program, and more particularly, to an information processing apparatus, an information processing method, and a program, which can efficiently check plural images and simply and intuitively perform a check operation.

2. Description of Related Art

In the past, a display method (hereinafter, referred to as "known display method") of arranging thumbnails in a tile shape to display a list thereof was generally employed as a display method of displaying plural images on a display screen of a digital camera (see JP-A-2007-019685).

SUMMARY OF THE INVENTION

However, in the known display method, the number of thumbnails which can be displayed at a time depends on the size of the display screen of the digital camera.

When the number of images included in an album of the digital camera is greater than the number of thumbnails which can be displayed at a time, a user should perform a scroll operation to check all the thumbnails. That is, the user should a troublesome operation such as an operation of pressing a button or a drag operation on a touch panel.

Particularly, when the number of images in an album is great, the user should repeatedly perform the scroll operation to find out a desired image in the album using the thumbnails, which might take a long time. As described above, since the number of thumbnails which can be displayed in the display screen of the digital camera depends on the size of the display screen, it might be difficult for the user to grasp the total number of images included in the album.

Therefore, there is a need for efficiently checking plural images and simply and intuitively carrying out a check operation.

According to an embodiment of the invention, there is provided an information processing apparatus including: display means for displaying an image; operation input receiving means for receiving a user's operation input; and display control means for making a display control of allowing an image to correspond to an image card as an object imitating a real card, displaying a check image, which indicates a shape in which a plurality of the image cards overlap, on the display means, and displaying one of an image corresponding to a specific image card and information indicating the image in a partial or overall area of the specific image card when a check operation indicating an instruction to check the specific image card among the plurality of image cards is received by the operation input receiving means.

The display control means may display an image indicating that the plurality of image cards are bound or an image indicating that the plurality of image cards overlap in a fan shape as the check image indicating a shape in which the plurality of image cards overlap.

When an operation of moving a user's finger by a predetermined distance in a predetermined direction with the user's finger in contact with the display means is a drag operation, the drag operation on an overlapping portion of the plurality of image cards may be employed as the check operation.

The display control means may recognize an image card in contact with the user's finger as the specific image card when the stop of the drag operation with the user's finger is received by the operation input receiving means, and may display one of a portion of the image, a thumbnail of the image, and a feature image which is a featured portion of the image as the information indicating the image.

The portion of the image may be one of both end portions of the image or a center portion of the image.

The display control means may recognize the top image card of the plurality of image cards as the specific image card, may display the overlapping portions of the image cards on the left and right sides of the specific image card, and may display the overlapping portions behind the top image card.

The display control means may recognize a predetermined image card of the plurality of image cards as the specific image card and may display the overlapping portions on the left and right sides of the specific image card so as to sequentially display the overlapping portion on one side of the left and right sides, the specific image card, and the overlapping portion on the other side.

The display control means may update the specific image card and may display one of an image corresponding to the updated specific image card and information indicating the image, by shifting the plurality of image cards to one side of the left and right sides of the specific image card when the one-side drag operation on the overlapping portion displayed on the one side and the one-side drag operation on the overlapping portion displayed on the other side are received by the operation input receiving means.

An information processing method and a program according to another embodiments of the invention are a method and a program corresponding to the above-mentioned information processing apparatus according to the embodiment of the invention.

According to the information processing apparatus and method and the program of the embodiments of the invention, in the information processing apparatus displaying an image and receiving a user's operation input, an image is allowed to correspond to an image card as an object imitating a real card, a check image, which indicates a shape in which a plurality of the image cards overlap, is displayed, and one of an image corresponding to a specific image card and information indicating the image is displayed in a partial or overall area of the specific image card when a check operation indicating an instruction to check the specific image card among the plurality of image cards is received.

According to the above-mentioned embodiments of the invention, it is possible to efficiently check plural images and to simply and intuitively perform a check operation.

BRIEF DESCRIPTION OF THE DRAWINGS

FIG. 1 is a block diagram illustrating a configuration of an image pickup device as an example of an information processing apparatus according to an embodiment of the invention.

FIGS. 3A and 3B are diagrams illustrating a first example of an image checking operation.

FIGS. 7A and 7B are diagrams illustrating the first example of the image checking operation.

FIGS. 8A, 8B, 8C, 8D, 8E, and 8F are diagrams illustrating the first example of the image checking operation.

FIG. 9 is a flowchart illustrating an example of a first image checking process.

FIGS. 11A and 11B are diagrams illustrating the second example of the image checking operation.

FIG. 12 is a flowchart illustrating an example of a second image checking process.

FIG. 15 is a flowchart illustrating an example of a third image checking process.

FIG. 18 is a flowchart illustrating an example of a fourth image checking process.

FIGS. 19A and 19B are diagrams illustrating a fifth example of the image checking operation.

FIG. 22 is a flowchart illustrating an example of a fifth image checking process.

FIGS. 26A, 26B, and 26C are diagrams illustrating a first example of an image checking and selecting operation.

FIG. 27 is a flowchart illustrating an example of a 1A-th image checking and selecting process.

FIGS. 30A, 30B, and 30C are diagrams illustrating a second example of the image checking and selecting operation.

FIGS. 31A and 31B are diagrams illustrating the second example of the image checking and selecting operation.

FIGS. 36A and 36B are diagrams illustrating an example of an image deleting operation.

DESCRIPTION OF PREFERRED EMBODIMENTS

Figure 2A:
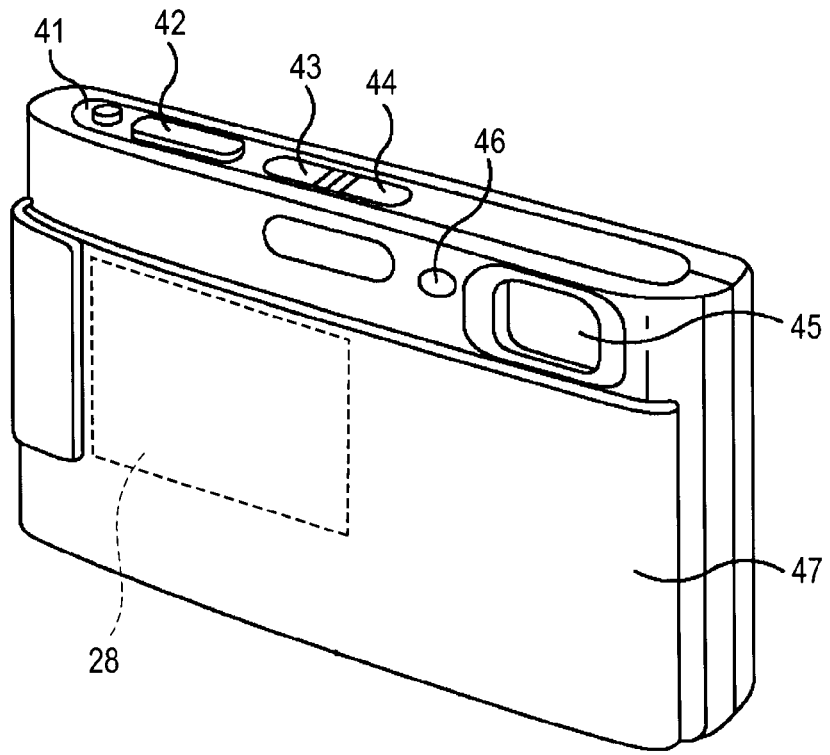
FIGS. 2A and 2B are perspective views illustrating an outer configuration of the image pickup device shown in FIG. 1.

Hereinafter, preferred embodiments of the invention will be described with reference to the accompanying drawings.

FIG. 1 is a block diagram illustrating a configuration of an image pickup device as an example of an information processing apparatus according to an embodiment of the invention.

In the example shown in FIG. 1, the image pickup device includes from a lens unit 11 to a touch panel 28.

The lens unit 11 includes an imaging lens, an iris, and a focusing lens. An image pickup unit 12 such as a CCD (Charge Coupled Device) is disposed in an optical path of a subject beam incident through the lens unit 11.

The image pickup unit 12, an analog signal processor 13, an A/D (Analog/Digital) converter 14, and a digital signal processing 15 are sequentially connected in this order.

A liquid crystal panel 17, a recording unit 19, and a touch panel 28 are connected to the digital signal processor 15.

An actuator 20 for adjusting the iris of the lens unit 11 or moving the focusing lens is connected to the lens unit 11. A motor driver 21 is connected to the actuator 20. The motor driver 21 controls the driving of the actuator 20.

A CPU (Central Processing Unit) 23 controls the overall image pickup device. Therefore, the analog signal processor 13, the A/D converter 14, the digital signal processor 15, the motor driver 21, a timing generator (TG) 22, an operation unit 24, an EEPROM (Electrically Erasable Programmable ROM) 25, a program ROM (Read Only Memory) 26, a RAM (Random Access Memory) 27, a touch panel 16, and a touch panel 28 are connected to the CPU 23.

A touch screen 18 includes the touch panel 16 and the liquid crystal panel 17. The touch panel 28 is disposed on a face of the image pickup device opposed to the touch screen 18, that is, a face closing to the imaging lens 45 (see FIGS. 2A and 2B).

The recording unit 19 includes an optical disk such as a DVD (Digital Versatile Disc), or a semiconductor memory such as a memory card, or other removable recording mediums. The recording unit 19 can be freely attached to and detached from the image pickup device body.

The EEPROM 25 stores a variety of set information. Other information such as information which should be kept when the device is powered off is stored in the EEPROM 25.

The program ROM 26 stores programs executed by the CPU 23 and data necessary for executing the programs.

The RAM 27 temporarily serves as a work area for allowing the CPU 23 to perform a variety of processes and stores necessary programs or data.

The overall operations of the image pickup device shown in FIG. 1 will be roughly described now.

The CPU 23 controls the units of the image pickup device by executing the programs stored in the program ROM 26.

The CPU 23 performs predetermined processes on the basis of signals from the touch panel 16 or the touch panel 28 or signals from the operation unit 24. Specific examples of the processes will be described later with reference to the flowcharts of FIGS. 9, 12, 15, and 18, FIGS. 22 to 24, FIGS. 27 to 29, and FIGS. 32, 33, 37, and 39.

The operation unit 24 is operated by a user and provides a signal corresponding to the operation to the CPU 23.

When a finger comes in contact with a position, that is, when a predetermined operation is input by the user, the touch screen 18 or the touch panel 28 detects coordinates of the contact position. An electrical signal (hereinafter, referred to as "coordinate signal") indicating the detected coordinates is sent to the CPU 23. The CPU 23 recognizes the coordinates of the contact position from the coordinate signal, acquires predetermined information corresponding to the coordinates, and performs a predetermined process on the basis of the acquired information.

In this specification, the "contact" includes a dynamic contact (a contact generated by allowing a contact object such as a finger to move in a predetermined trace) as well as a static contact (a contact with a predetermined area). For example, a finger's touch for opening a fan in an image is a type of contact.

By driving the actuator 20, the lens unit 11 is exposed from or received in a chassis of the image pickup device. By driving the actuator 20, the iris of the lens unit 11 is adjusted or the focusing lens of the lens unit 11 is moved.

The TG 22 supplies timing signals to the image pickup unit 12 under the control of the CPU 23. Exposure time of the image pickup unit 12 or the like is controlled by the timing signal.

The image pickup unit 12 receives a subject beam incident through the lens unit 11 and performs a photoelectric conversion, on the basis of the timing signal supplied from the TG 22. The image pickup unit supplies an analog image signal corresponding to the intensity of the received beam to the analog signal processor 13. At this time, the motor driver 21 drives the actuator 20 under the control of the CPU 23.

The analog signal processor 13 performs an analog signal process such as amplification on the analog image signal supplied from the image pickup unit 12 under the control of the CPU 23. The resultant analog image signal is supplied to the A/D converter 14 from the analog signal processor 13.

The A/D converter 14 converts the analog image signal from the analog signal processor 13 to a digital signal under the control of the CPU 23. The resultant digital image signal is supplied to the digital signal processor 15 from the A/D converter 14.

The digital signal processor 15 performs a digital signal process such as a noise removing process on the digital image signal supplied from the A/D converter 14 under the control of the CPU 23. The digital signal processor 15 displays an image (corresponding to the digital image signal on the liquid crystal panel 17.

The digital signal processor 15 compresses and encodes the digital image signal supplied from the A/D converter 14 in accordance with a predetermined compressing and encoding system such as JPEG (Joint Photographic Experts Group). The digital signal processor 15 records the compressed and encoded digital image signal in the recording unit 19. In this embodiment, it is assumed that images are recorded in the unit of album. The "album" is an expression imitating a real album to which pictures are attached and means a unit including a group of images collected depending on a predetermined relation by a user.

The digital signal processor 15 reads the compressed and encoded digital image signal from the recording unit 19 and decompresses and decodes the read digital image signal in accordance with a decompressing and decoding system corresponding to the predetermined compressing and encoding system. The digital signal processor 15 displays an image corresponding to the digital image signal on the liquid crystal panel 17.

In addition, the digital signal processor 15 generates a rimmed (hereinafter, referred to as "AF rimmed") image used to perform an auto focus (AF) function and displays the generated rimmed image on the liquid crystal panel 17 under the control of the CPU 23.

That is, an image taken by the image pickup unit 12 is displayed on the liquid crystal panel 17. In this case, the AF rim is set on the image displayed on the liquid crystal panel 17. The focus is controlled on the basis of the image inside the AF rim.

In this way, the image pickup device has the AF function. The AF function includes a function of setting the AF rim at a position on the image displayed on the liquid crystal panel 17, in addition to a function of controlling the focus. The AF function includes a function of controlling the position or size by only operating the touch screen 18 including the liquid crystal panel 17 and the touch panel 16.

The process of performing the AF function is embodied by allowing the CPU 23 to read and execute the programs stored in the program ROM 26. In addition, the image pickup device has an AE (Automatic Exposure) function and an AWB (Auto White Balance) function. Theses functions are also embodied by allowing the CPU 23 to read and execute the programs stored in the program ROM 26.

Additionally speaking, the AF function, the AE function, and the AWB function are only examples of the functions of the image pickup device. That is, the image pickup device has a variety of functions related to imaging. Hereinafter, basic functions related to the imaging are called basic functions and application functions related to the imaging are called application functions. In addition to the AF function, the AE function, and the AWB function, for example, "an imaging mode selecting function" or "an imaging timer setting function" can be employed as the basic functions. For example, "a pixel number changing function" or "a color adjusting function" can be employed as the application functions.

Figure 2B:
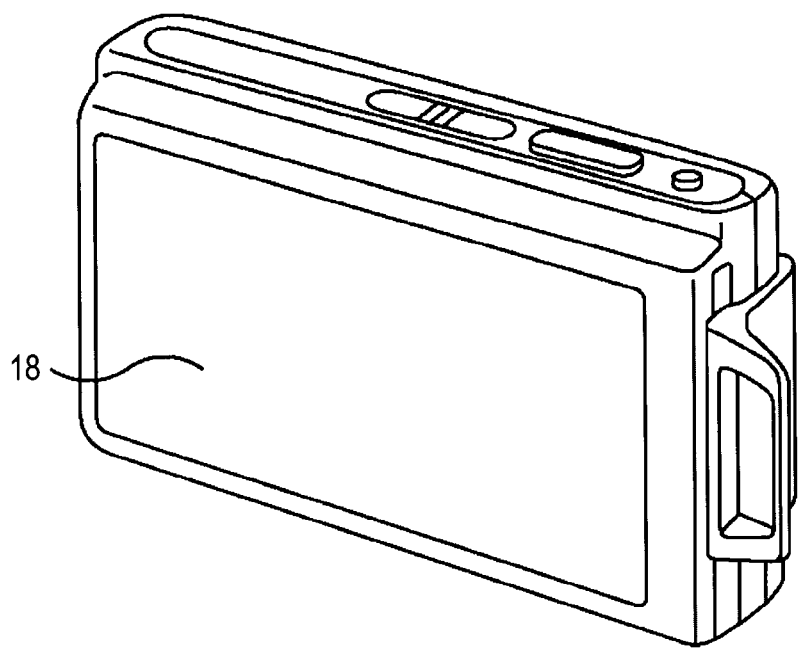

FIGS. 2A and 2B are perspective views illustrating an outer configuration of the image pickup device shown in FIG. 1.

A surface, which faces a subject when a user takes an image of the subject, of surfaces of the image pickup device, that is, the surface on which the lens unit 11 is disposed, is called a front surface. On the other hand, a surface, which faces the user when the user takes an image of the subject, among the surfaces of the image pickup device, that is, the opposite surface of the front surface, is called a rear surface. A surface, which is disposed on the upside when the user takes an image of the subject, among the surfaces of the image pickup device is called a top surface and a surface disposed on the downside is called a bottom surface.

FIG. 2A is a perspective view illustrating an outer configuration of the front surface of the image pickup device. FIG. 2B is a perspective view illustrating an outer configuration of the rear surface of the image pickup device.

The front surface of the image pickup device can be covered with a lens cover 47. When the lens cover 47 of the front surface is opened downward in the drawing, the state shown in FIG. 2A is obtained. As shown in FIG. 2A, an imaging lens 45 and an AF illuminator 46 included in the lens unit 11 are arranged sequentially from the right side in the upper portion of the front surface other than the lens cover 47. In the lower portion of the front surface covered with the lens cover 47, the touch panel 28 is disposed in a portion to be held by the user at the time of taking an image of a subject.

The AF illuminator 46 is also used as a self timer lamp. From the left side in FIG. 2A, a zoom lever (TELE/WIDE) 41, a shutter button 42, a reproduction button 43, and a power button 44 are sequentially arranged on the top surface of the image pickup device. The zoom lever 41, the shutter button 42, the reproduction button 43, and the power button 44 are included in the operation unit 24 shown in FIG. 1.

As shown in FIG. 2B, the touch screen 18 is disposed on the overall rear surface of the image pickup device.

In this way, since the touch screen 18 is disposed on the rear surface of the image pickup device, the user can execute a GUI (Graphical User Interface) operation using the touch screen 18 in a state where the front surface of the image pickup device is directed to a subject at the time of taking an image of the subject.

In this embodiment, for example, an operation (hereinafter, referred to as "image checking operation") of checking a specific image from plural images can be performed as the GUI operation using the touch screen 18.

A first example of the image checking operation will be described now with reference to FIGS. 3A and 3B. That is, FIGS. 3A and 3B are diagrams illustrating an example of a display method of displaying plural images on the touch screen 18 and the first example of the image checking operation.

Here, among operating statuses of the image pickup device, a status where a user can check plural images stored in an album of the image pickup device is called a reproduction mode. That is, when the reproduction mode is set, it is assumed that the image checking operation can be performed. The operation of setting the reproduction mode is not particularly limited. For example, as shown in FIG. 3A, an operation of bringing both a finger f1 and a finger f2 to into contact with the touch screen 18 may be employed. As described later, the finger f2 is not necessary for the image checking operation.

When the reproduction mode is set, for example, as shown in FIG. 3A, plural cards are displayed on the touch screen 18 in a state where the plural cards overlap. In this embodiment, for example, one image is displayed as an object (hereinafter, referred to as "image card CA") imitating a sheet of card. That is, information indicating a predetermined one of the plural images stored in an album of the image pickup device is displayed on the image card CA. The display plane of the touch screen 18 in which an image including plural overlapping image cards CA is displayed to select one image card CA therefrom is called an image checking operation picture. That is, FIG. 3A shows an example of an initial display state of the image checking operation picture.

The user can perform a drag operation on an area surrounded with an elliptical shape in FIG. 3A, that is, an area (the left-lower area of the image card CA in FIG. 3A) of the overlapping portion of the plural image cards CA, with the finger f1. The drag operation means an operation of bringing a user's finger into contact with a predetermined area of the touch screen 18 and then moving (dragging) the finger by a predetermined distance in a predetermined direction from the predetermined area as a start point with the contact of the finger maintained.

Figure 4B:
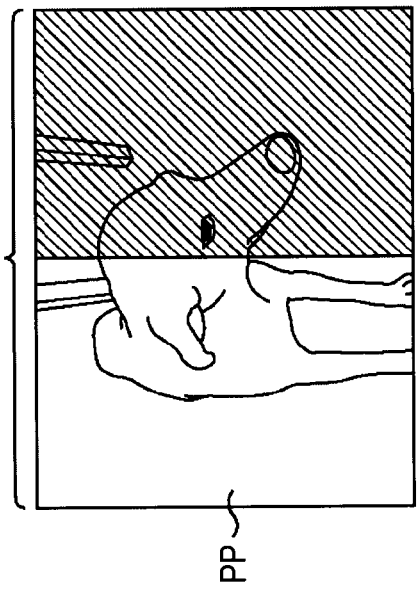
FIGS. 4A, 4B, and 4C are diagrams illustrating the first example of the image checking operation.
Figure 4C:
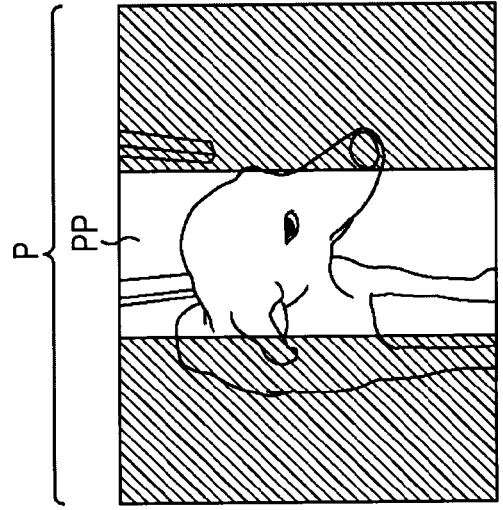
Figure 4A:
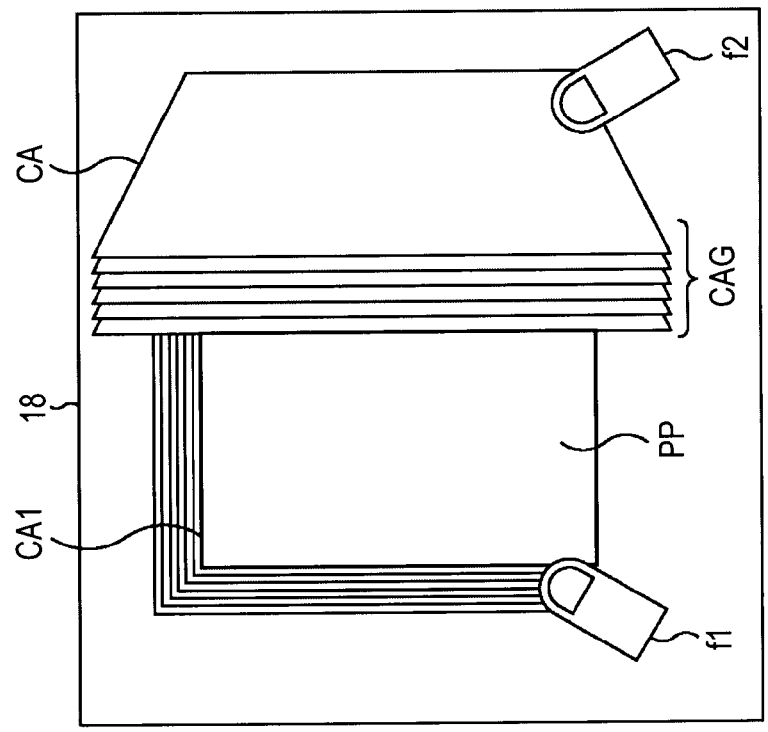

When the contact of the finger f1 with a specific image card CA1 is maintained for a predetermined time while the user performs the drag operation with the finger f1, the display state of the touch screen 18 is changed from the display state shown in FIG. 3A to the display state shown in FIG. 4A. That is, as shown in FIG. 4A, a group CAG of one or more image cards CA arranged in the back of the image card CA1 with which the contact of the finger f1 is maintained for a predetermined time is displayed as if it is turned. Then, information indicating an image P corresponding to the image card CA1 with which the contact of the finger f1 is maintained for a predetermined time is displayed. The "be maintained for a predetermined time" does not mean that the finger remains at rest for a predetermined time (threshold value) or more. That is, the "be maintained for a predetermined time" is a broad concept including a case where the finger instantaneously remains at rest and a case where the speed of the drag operation decreases (the finger slowly moves) and thus the finger is maintained on a specific image card as a result.

The information indicating the image P is not particularly limited, so long as it literally indicates the image P. For example, in FIGS. 4A to 4C, a portion PP of the image P is employed as the information indicating the image P.

Specifically, as shown in FIG. 4B, the left half of the image P can be displayed as a portion PP of the image P on the specific image card CA1 shown in FIG. 4A. When the drag operation is performed in the right area of the image card CA, the shape in which the group CAG of one or more image cards CA arranged in the back of the specific image card CA1 is turned is the axis-symmetry of the shape shown in FIG. 4A. Accordingly, in this case, only the right half of the image P may be displayed as a portion PP of the image P on the specific image card CA1 shown in FIG. 4A, although not shown.

For example, as shown in FIG. 4C, a central portion of the image P may be cut out and the cut portion may be displayed as a portion PP of the image P on the specific image card CA1 shown in FIG. 4A. This is because a subject which a user wants to check is generally included in the central portion of the image P. That is, by displaying the central portion of the image P, it is possible to enhance a user's recognition rate of a picture.

The information indicating the image P and being displayed on the specific image card CA1 is not limited to the example shown in FIGS. 4A, 4B, and 4C. For example, an arbitrary portion of the image P may be cut out and the cut portion may be displayed as a portion PP of the image P on the specific image card CA1.

For example, a thumbnail of the image P or an image (hereinafter, referred to as "feature image") of a featured portion of the image P may be employed as the information indicating the image P. These examples will be described now with reference to FIGS. 5 and 6.

Figure 5:
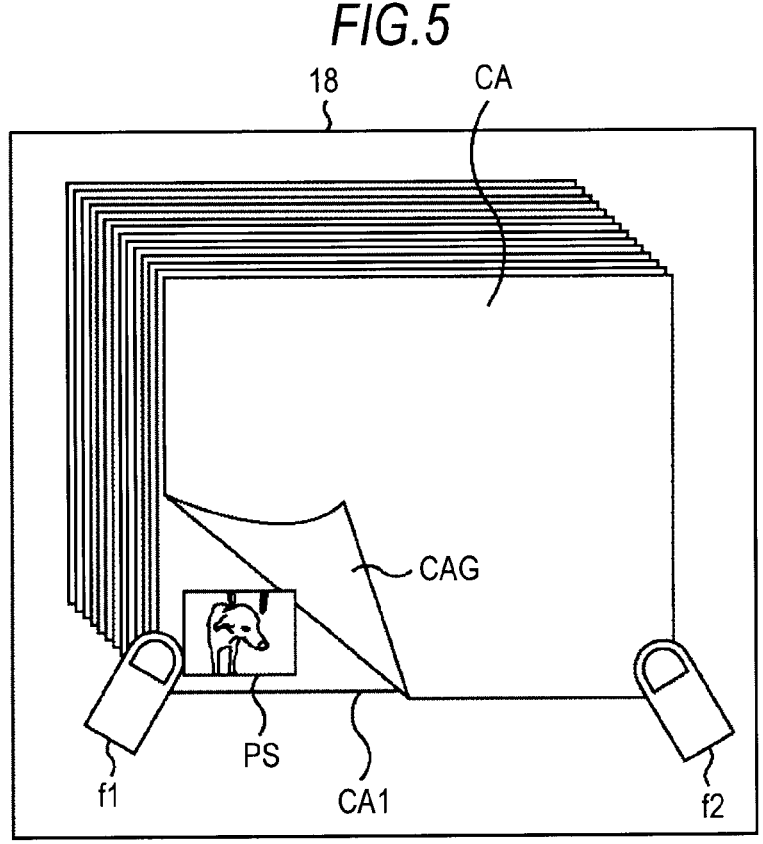
FIG. 5 is a diagram illustrating the first example of the image checking operation.

FIG. 5 shows an example of the information indicating the image P and being displayed on the specific image card CA1, which is different from the example shown in FIGS. 4A to 4C.

When a user is performing a drag operation with the finger f1 in an area of the overlapping portion of the image cards CA on the image checking operation picture and the contact of the finger f1 with the specific image card CA1 is maintained for a predetermined time, the display state of the touch screen 18 is changed from the display state shown in FIG. 3A to the display state shown in FIG. 5.

That is, as shown in FIG. 5, the left-lower area of the group CAG (only one in the example shown in FIG. 5) of one or more image cards CA arranged in the back of the specific image card CA1 is displayed as if it is turned. A thumbnail PS is displayed in an area, which is displayed as if it is turned, on the specific image card CA1.

The display place of the thumbnail PS is not limited to the area, which is displayed as if it is turned, on the left lower side of the specific image card CA1 as shown in FIG. 5, but may be an area of the specific image card CA1, for example shown in FIG. 4A.

Figure 6:
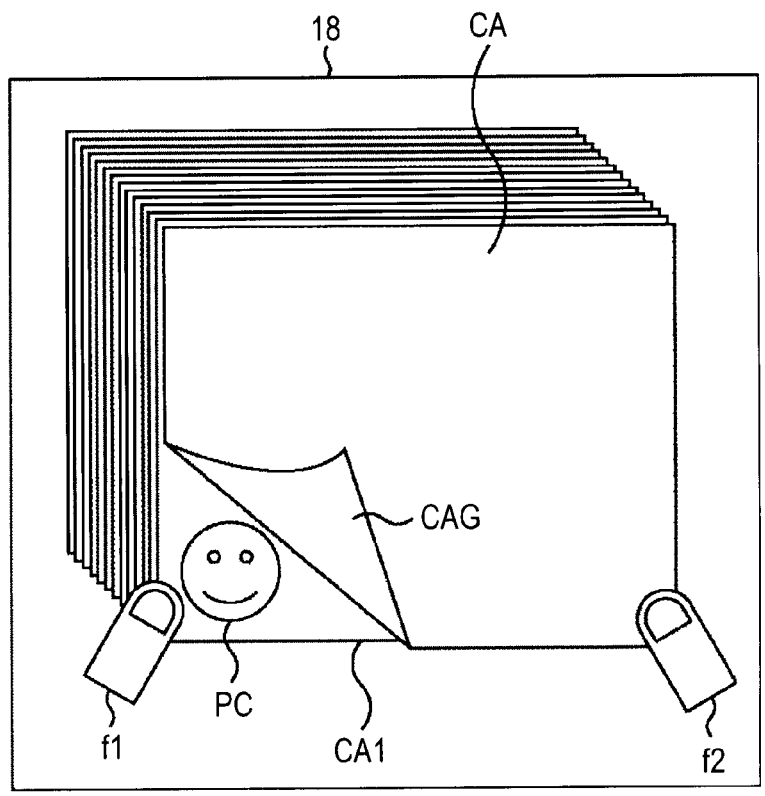
FIG. 6 is a diagram illustrating the first example of the image checking operation.

FIG. 6 is an example of the information indicating the image P and being displayed on the specific image card CA1, which is different from the example shown in FIGS. 4A, 4B, 4C, and 5.

As shown in FIG. 6, the left-lower area of the group CAG (only one in the example shown in FIG. 6) of one or more image cards CA arranged in the back of the specific image card CA1 is displayed as if it is turned. A feature image PC of the image P is displayed in an area, which is displayed as if it is turned, on the specific image card CA1. That is, a featured object such as face, building, animal, and flower among objects included in the image P is displayed as the feature image PC.

The display place of the feature image PC is not limited to the area, which is displayed as if it is turned, on the left lower side of the specific image card CA1 as shown in FIG. 6, but may be the entire area of the specific image card CA1 shown in FIG. 4A.

As described above, by allowing a user to perform the first example of the image checking operation, the information corresponding to the specific image card CA1 and indicating the image P is displayed thereon. Therefore, the user can easily check the contents of plural images in an album, thereby searching for a specific image P for a short time.

Although the operation is performed in the left area of the image cards CA in the examples shown in FIGS. 3A and 3B, FIGS. 4A to 4C, and FIGS. 5 and 6, the operation may be performed in the right area of the image cards CA.

As shown in FIG. 3A, by displaying the image cards CA corresponding to plural images in an album of the image pickup device so as to overlap with each other, it is possible to easily grasp the total number of images included in the album.

When a user checks an image P in the album, the operation distance of the drag operation with the finger f1 is satisfactorily about a distance indicated by an arrow in the area surrounded with the elliptical shape in FIG. 3A. That is, it is possible to reduce the operation distance of the finger f1.

FIG. 3B is a reference diagram for comparing the drag operation shown in FIG. 3A with an operation (hereinafter, referred to as "card turning operation") of turning plural real cards. The card turning operation with the left thumb f1 shown in FIG. 3B corresponds to the drag operation with the finger f1 shown in FIG. 3A. While the real card turning operation is being performed, as shown in FIG. 3B, the turned cards are held by the right thumb f2 so as not to scatter the turned cards. The finger f2 is shown in FIG. 3A to correspond to the finger f2 supporting the cards. That is, the reason for showing the finger f2 in FIG. 3A is that it indicates that the opposite area (the right area of the image cards CA in FIGS. 3A and 3B) of the area, which the drag operation with the finger f1 is being performed on, of the image cards CA is supported. Therefore, the finger f2 need not come in contact with the image cards CA, so long as the image pickup device can be supported.

In this way, since the user can perform an operation imitating the real operation on the touch screen 18 using the image cards CA imitating the real cards, it is possible to intuitively perform the operation.

The image checking operation picture is not particularly limited to the above-mentioned example. For example, the image checking operation picture shown in FIGS. 7A and 7B may be employed. In other words, FIGS. 7A and 7B are diagrams illustrating an example of the display method of displaying plural images on the touch screen 18, which is different from the example shown in FIGS. 3A and 3B.

In the example shown in FIGS. 7A and 7B, an image in which plural image cards CA are arranged to overlap in a fan shape is displayed on the touch screen 18 as an initial display state of the image checking operation picture.

The user performs the drag operation with the finger f1 in the range indicated by an arrow in FIG. 7A, that is, in the upper area of the overlapping portion of the image cards CA.

When the user is performing the drag operation with the finger f1 in the upper area of the overlapping portion of the image cards CA and the contact of the finger f1 with the specific image card CA1 is maintained for a predetermined time, the display state of the touch screen 18 is changed from the state shown in FIG. 7A to the state shown in FIG. 7B.

That is, as shown in FIG. 7B, an area TCA between a group CAGL of one or more image cards CA (however, not including the image card CA1) arranged in the back of the image card CA1 with which the contact of the finger f1 is maintained for a predetermined time and a group CAGR of one or more image cards CA (however, not including the image card CA1) arranged in the front of the image card CA1 with which the contact of the finger f1 is maintained for a predetermined time is displayed to be wider than the area between other image cards CA. When a distance exists in the three-dimensional depth direction in the real world, the area TCA is also displayed wide on the picture. For example, a feature image PC of an image P is displayed in the area TCA of the specific image card CA1.

The image displayed on the specific image card CA1 is information indicating the image P corresponding to the specific image card CA1, as described above. Therefore, for example, the image PP shown in FIGS. 4B and 4C or the thumbnail PS shown in FIG. 5 may be displayed in the area TCA of the specific image card CA1, in addition to the feature image PC.

As described above, when the user is performing the drag operation with the finger f1 and the contact of the finger f1 with the specific image card CA1 is maintained for a predetermined time, the information indicating the image P corresponding to the specific image card CA1 is displayed. In this case, the contact of the finger f1 is not a point contact on the touch screen 18, but an area contact with a predetermined area. Therefore, the finger f1 is in contact with plural image cards CA at any time. In this case, it is important what image card of the plural image cards CA in contact with the finger f1 should be set as the specific image card CA1 of "the information indicating the image P corresponding to the specific image card CA1 is displayed when the contact of the finger f1 with the specific image card CA1 is maintained for a predetermined time."

Basically, any of the plural image cards CA in contact with the finger f1 can be set as the specific image card CA1. That is, a designer can freely determine the specific image card.

Specifically, the image card CA in contact with the leftmost portion of a contact area EF1 of the finger f1 can be set as the specific image card CA1, for example, as shown in FIG. 8A.

Specifically, the image card CA in contact with the rightmost portion of the contact area EF1 of the finger f1 can be set as the specific image card CA1, for example, as shown in FIG. 8B.

Specifically, the image card CA in contact with the uppermost portion of the contact area EF1 of the finger f1 can be set as the specific image card CA1, for example, as shown in FIG. 8C.

Specifically, the image card CA in contact with the lowermost portion of the contact area EF1 of the finger f1 can be set as the specific image card CA1, for example, as shown in FIG. 8D.

Specifically, the image card CA in contact with the center of the contact area EF1 of the finger f1 can be set as the specific image card CA1, for example, as shown in FIG. 8E.

Specifically, the image card CA in contact with the entire portion of the contact area EF1 of the finger f1 can be set as the specific image card CA1, for example, as shown in FIG. 8F.

The invention is not limited to the examples shown in FIGS. 8A to 8F.

The processes performed by the image pickup device shown in FIG. 1 in an operation example shown in FIGS. 3A and 3B, FIGS. 4A to 4C, FIGS. 5 and 6, FIGS. 7A and 7B, and FIGS. 8A to 8F, that is, a first example of the image checking operation, will be described. The process performed by the image pickup device for the image checking operation is referred to as "image checking process." Particularly, the image checking process according to a K-th example (where K is an integer equal to or greater than 1) of the image checking operation according to this embodiment is referred to as "K-th image checking process."

FIG. 9 is a flowchart illustrating an example of a first image checking process.

When the operation state of the image pickup device is changed to a reproduction mode, the first image checking process is started.

In step S1, the CPU 23 controls the digital signal processor 15 to set the display state of the image checking operation picture to the initial display state. For example, the display state of the touch screen 18 is the display state shown in FIG. 3A.

In step S2, the CPU 23 determines whether the drag operation is performed in the overlapping portion of the plural image cards CA.

The determination on whether the drag operation is performed can be embodied by allowing the CPU 23 to monitor the coordinate signal from the touch panel 16 of the touch screen 18. That is, the CPU 23 can recognize the trace of the finger f1 from the time-series coordinate signals. Therefore, the CPU 23 determines whether the drag operation is performed on the basis of the recognition result.

Therefore, when the drag operation is not detected as the recognition result of the trace of the finger f1, the CPU 23 determines NO in step S2 and repeatedly performs the processes of step S2 and subsequent thereto. That is, the determination process of step S2 is repeatedly performed until the drag operation is detected.

Thereafter, when the drag operation is detected as the recognition result of the trace of the finger f1, the CPU 23 determines YES in step S2 and performs the process of step S3.

In step S3, the CPU 23 specifies a specific image card CA1 in contact for a predetermined time. Then, the CPU 23 controls the digital signal processor 15 to display information indicating the image P corresponding to the specific image card CA1.

That is, when the drag operation performed by the user is paused for a predetermined time, the CPU 23 specifies the image card CA in contact with the user's finger f1 for a predetermined time. Then, the CPU 23 controls the digital signal processor 15 to change the display state of the touch screen 18, for example, from the display state shown in FIG. 3A to the display state shown in FIG. 4A, 5, or 6. Then, the CPU 23 controls the digital signal processor 15 to display such as a portion PP of the image P shown in FIG. 4B or 4C, or the thumbnail PS of the image P shown in FIG. 5, or the feature image PC of the image P shown in FIG. 6 in a predetermined area of the specific image card CA1.

In step S4, the CPU 23 determines whether the image checking operation is finished.

When the user does not finish the image checking operation, NO is determined in step S4 and the processes of step S2 and subsequent thereto are repeatedly performed. That is, as long as the user continues to perform the image checking operation, the loop process of steps S2 to S4 is repeated.

Thereafter, when the user finishes the image checking operation, YES is determined in step S4 and thus the first image checking process is ended.

The first example of the image checking operation has hitherto been described with reference to FIGS. 3A and 3B, FIGS. 4A to 4C, FIGS. 5 and 6, FIGS. 7A and 7B, and FIGS. 8A to 8F. An example of the first image checking process according to the first example has been described with reference to the flowchart shown in FIG. 9.

A second example of the image checking operation will be described now with reference to FIG. 10 and FIGS. 11A and 11B. An example of the second image checking process according to the second example will be then described with reference to the flowchart shown in FIG. 12.

In the second example, when the user performs the drag operation with the finger f1 in the area of the overlapping portion of the plural image cards CA on the image checking operation picture, the display state of the specific image card CA1 is changed depending on a drag speed Vf. Here, the drag speed Vf means a moving speed of the finger f1 with which the drag operation is performed.

Figure 10:
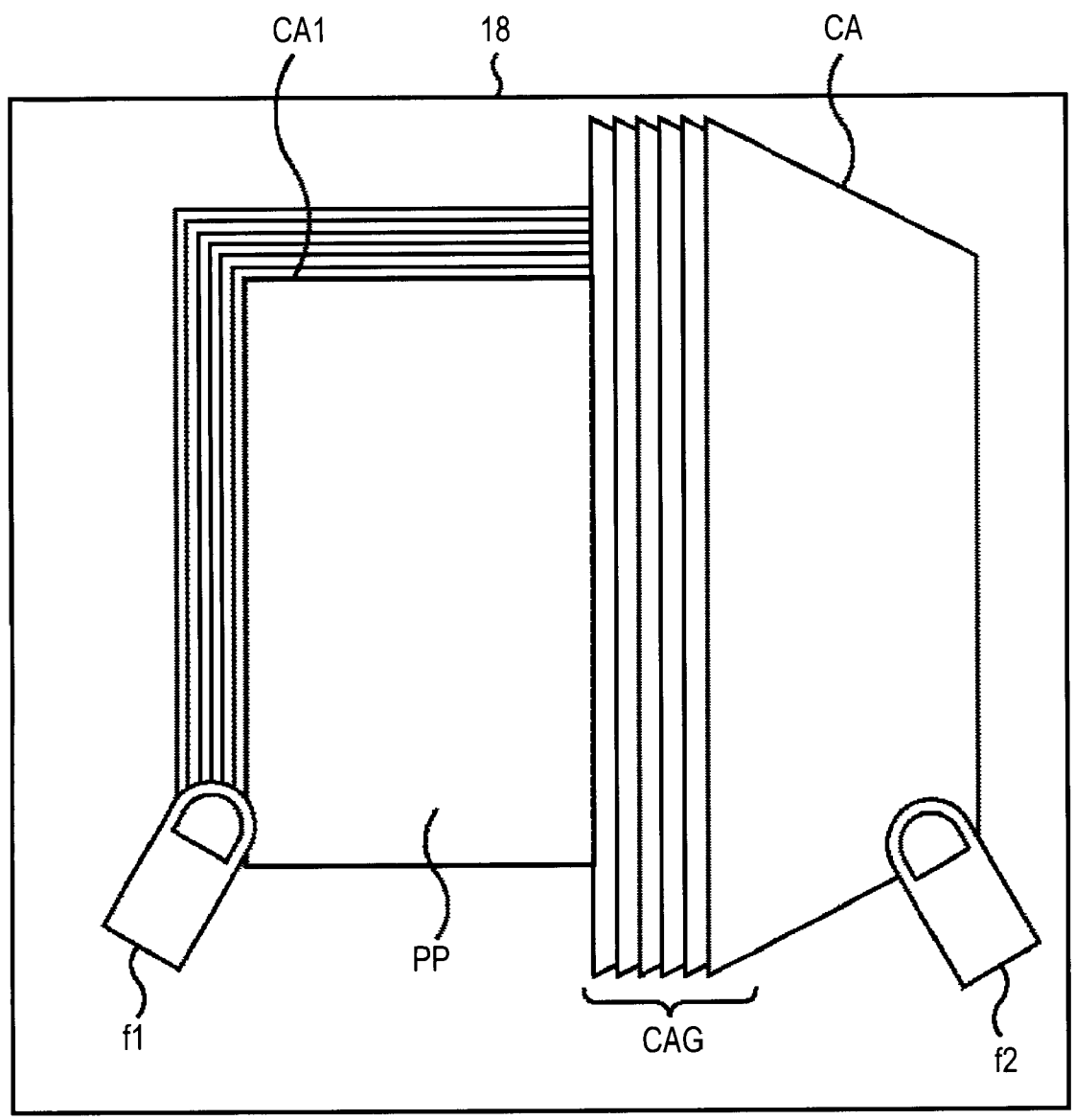
FIG. 10 is a diagram illustrating a second example of the image checking operation.

Specifically, for example, when the user is performing the drag operation with the finger f1 and the contact of the finger f1 with the specific image card CA1 is maintained for a predetermined time, the display state of the touch screen 18 is changed from the display state shown in FIG. 3A to the display state shown in FIG. 10. That is, as shown in FIG. 10, the group CAG of one or more image cards CA arranged in the back of the specific image card CA1 is displayed as if it is turned. The portion PP of the image P is displayed on the specific image card CA1 with which the contact of the finger f1 is maintained for a predetermined time.

At this time, the CPU 23 can change the display state of the specific image card CA1, depending, for example, on whether the drag speed Vf is greater than a threshold value Vt where a processing speed Vt of the image pickup device is used as the threshold value.

For example, when the drag speed Vf is equal to or less than the threshold value Vt, the information indicating the image P corresponding to the specific image card CA1 is displayed thereon, similarly to the above-mentioned example.

On the contrary, when the drag speed Vf is greater than the threshold value Vt, the image pickup device cannot secure the processing time. Therefore, to cope with this case, information (hereinafter, referred to as degradation information indicating the image P) having a quantity of information, which is smaller than that of the information displayed on the specific image card CA1 when the drag speed Vf is equal to or less than the threshold value Vt, among the information indicating the image P is prepared. When the drag speed Vf is greater than the threshold value Vt, the degradation information indicating the image P corresponding to the specific image card CA1 is displayed thereon.

When the drag speed Vf is equal to or less than the threshold value Vt, only the left half of the image P with an original resolution can be employed as the information indicating the image P, for example, as shown in the upper portion of FIG.

11A. The information indicating the image P can be displayed as a portion PP of the image P on the specific image card CA1.

On the contrary, when the drag speed Vf is greater than the threshold value Vt, only the left half of the image P (the image P having a reduced size in the lower portion of FIG. 11A) with a resolution lower than the original resolution can be employed as the degradation information indicating the image P, for example, as shown in the lower portion of FIG. 11A. The degradation information indicating the image P can be displayed as a portion PP of the image P on the specific image card CA1.

For example, when the drag speed Vf is equal to or less than the threshold value Vt, only the left half of the image P with the original resolution can be employed as the information indicating the image P, for example, as shown in the upper portion of FIG. 11B. The information indicating the image P can be displayed as a portion PP of the image P on the specific image card CA1.

On the contrary, when the drag speed Vf is greater than the threshold value Vt, the image pickup device cannot sufficiently secure the processing time. Therefore, for example, as shown in the lower portion of FIG. 11B, only the area narrower than the left half of the image P with the original resolution can be employed as the degradation information indicating the image P. The degradation information indicating the image P can be displayed as a portion PP of the image P on the specific image card CA1.

The information indicating the image P or the degradation information indicating the image P is not limited to the example shown in FIGS. 11A and 11B. For example, the information shown in FIGS. 11A and 11B may be employed as the information indicating the image P and the thumbnail PS or the feature image PC may be employed as the degradation information indicating the image P.

In this way, by changing the display of the specific image card CA1 depending on the processing speed of the drag operation, it is possible to prevent the delay of the display process.

An example of the second image checking process according to the second example of the image checking operation will be described now with reference to the flowchart shown in FIG. 12.

When the operation state of the image pickup device is changed to a reproduction mode, the second image checking process is started.

In step S21, the CPU 23 controls the digital signal processor 15 to set the display state of the image checking operation picture to the initial display state.

In step S22, the CPU 23 determines whether the drag operation is performed in the overlapping portion of the plural image cards CA.

When the drag operation is not performed, NO is determined in step S22 and the processes of step S22 and subsequent thereto are repeatedly performed. That is, the determination process of step S22 is repeatedly performed until the drag operation is performed.

Thereafter, when the drag operation is performed, YES is determined in step S22 and then the process of step S23 is performed.

In step S23, the CPU 23 recognizes the specific image card CA1 in contact for a predetermined time.

In step S24, the CPU 23 determines whether the drag speed Vf is greater than the threshold value Vt.

When the drag speed Vf is equal to or less than the threshold value Vt, NO is determined in step S24 and then the process of step S26 is performed. In step S26, the CPU 23 controls the digital signal processor 15 to display the information indicating the image corresponding to the specific image card CA1 thereon.

On the contrary, when the drag speed Vf is greater than the threshold value Vt, YES is determined in step S24 and then the process of step S25 is performed. In step S25, the CPU 23 controls the digital signal processor 15 to display the degradation information indicating the image corresponding to the specific image card CA1 thereon.

When the process of step S25 or S26 is ended, the process of step S27 is performed.

In step S27, the CPU 23 determines whether the image checking operation is finished.

When the user does not finish the image checking operation, NO is determined in step S27 and then the processes of step S22 and subsequent thereto are repeatedly performed again. That is, as long as the user continues to perform the image checking operation, the loop process of steps S22 to S27 is repeated.

Thereafter, when the user finishes the image checking operation, YES is determined in step S27 and the second image checking process is ended.

The second example of the image checking operation has hitherto been described with reference to FIG. 10 and FIGS. 11A and 11B. An example of the second image checking process according to the second example has been described with reference to the flowchart shown in FIG. 12.

A third example of the image checking operation will be described now with reference to FIGS. 13A and 13B and FIGS. 14A and 14B. An example of the third image checking process according to the third example will be then described with reference to the flowchart shown in FIG. 15.

Figure 13B:
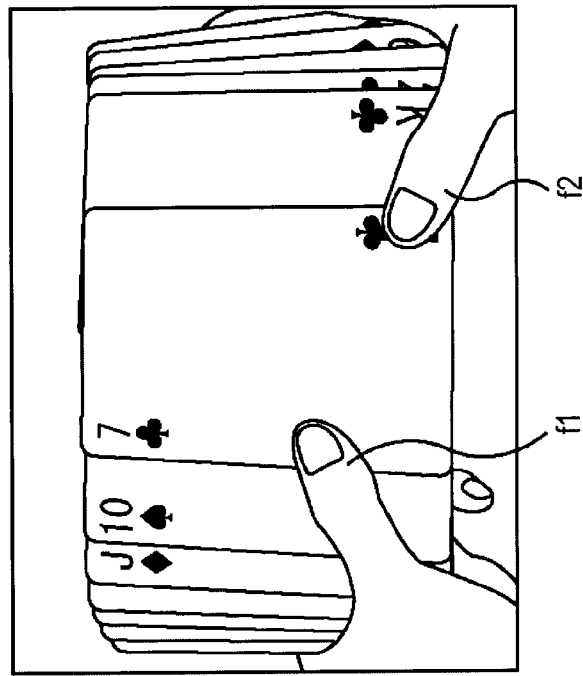
FIGS. 13A and 13B are diagrams illustrating a third example of the image checking operation.
Figure 13A:
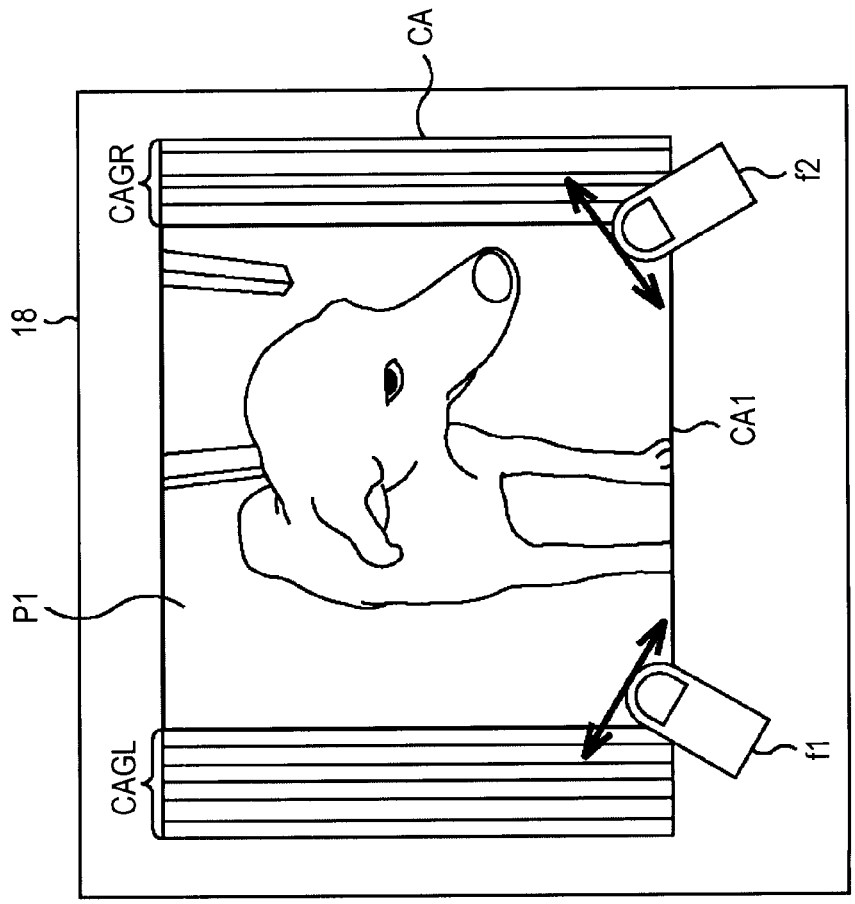

FIG. 13A shows an example of the initial display state of the image checking operation picture. The specific image card CA1 is disposed in the top of the overlapping of the plural image cards CA. A group CAGL of one or more image cards arranged on the left side of the specific image card CA1 and a group CAGR of one or more image cards CA arranged on the right side of the specific image card CA1 are disposed in the back of the specific image card CA1. An image P1 corresponding to the top specific image card CA1 or information indicating the image is displayed thereon. For example, in the example shown in FIGS. 13A and 13B, the image P1 is displayed. Hereinafter, it is assumed that the images P corresponding to the image cards CA are displayed thereon.

The user performs the drag operation to the left or right side with the fingers f1 and f2 on the group CAGL of the image cards CA and the group CAGR of the image cards CA. By this operation, the image cards CA are shifted to the left or right side. Accordingly, the top specific image card CA is changed from the image card CA1 to a different image card CA. The image P corresponding to the top specific image card CA is displayed thereon. Therefore, the user can check the image corresponding to a desired image card among the plural image cards CA.

FIG. 13B is a reference diagram for comparing the drag operation shown in FIG. 13A with an operation (hereinafter, referred to as "card moving operation") of moving plural real cards to the left or right side. The card moving operation with the left thumb f1 shown in FIG. 13B corresponds to the drag operation with the finger f1 shown in FIG. 13A. The card moving operation with the right thumb f2 shown in FIG. 13B corresponds to the drag operation with the finger f2 shown in FIG. 13A.

In this way, since the user can perform an operation imitating the real operation on the touch screen 18 using the image cards CA imitating the real cards, it is possible to intuitively perform the operation.

Figure 14A:
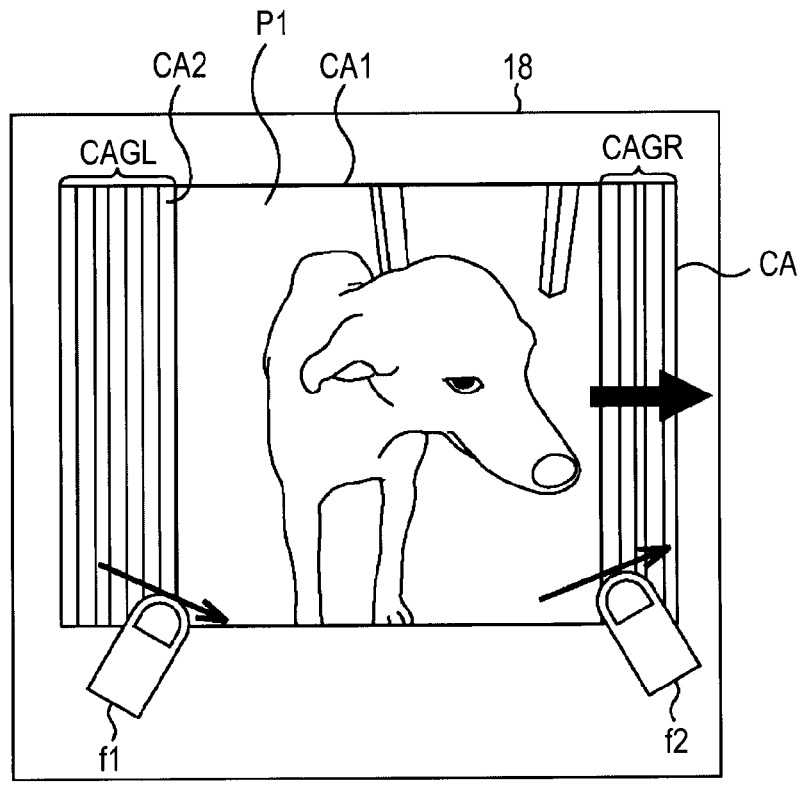
FIGS. 14A and 14B are diagrams illustrating the third example of the image checking operation.
Figure 14B:
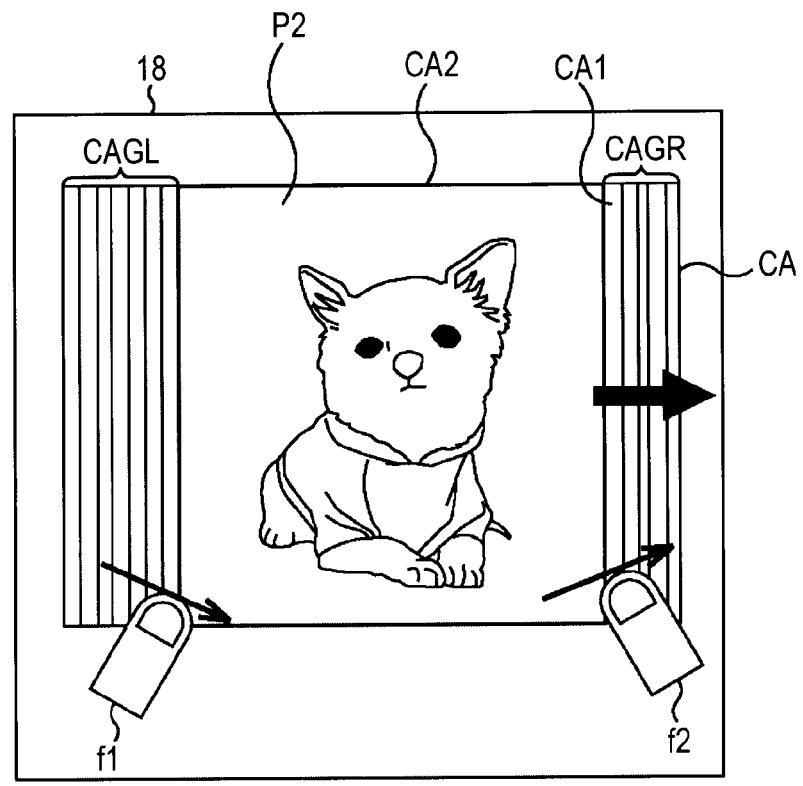

FIGS. 14A and 14B show a specific example of the result of the third example of the image checking operation.

In the state where the display state of the touch screen 18 is the display state shown in FIG. 14A, the user first performs the right drag operation with the finger f1 on the group CAGL of the image cards CA. Then, the user performs the right drag operation with the finger f2 on the group CAGR of the image cards CA.

When this series of operations are preformed, the image card CA1 disposed as the top specific image card CA moves to the group CAGR of the image cards CA and the specific image card CA2 disposed in the back of the specific image card CA1 is disposed as the top specific image card CA1 as shown in FIG. 14B. The image P2 corresponding to the specific image card CA2 is displayed.

In the examples shown in FIGS. 13A and 13B and FIGS. 14A and 14B, the drag operation is performed to the right side, but the drag operation may be performed to the opposite side as described above.

That is, in the state where the display state of the touch screen 18 is the display state shown in FIG. 14B, the user first performs the left drag operation with the finger f2 on the group CAGR of the image cards CA. Then, the user performs the left drag operation with the finger f1 on the group CAGL of the image cards CA.

When this series of operations are preformed, the image card CA2 disposed as the top specific image card CA moves to the group CAGL of the image cards CA and the specific image card CA1 disposed in the front of the image card CA2 is disposed as the top specific image card CA1 as shown in FIG. 14A. The image P1 corresponding to the specific image card CA1 is displayed.

In this way, by performing the right drag operation, the image cards CA are sequentially shifted to the right side. On the contrary, by performing the left drag operation, the image cards CA are sequentially shifted to the left side. When the left drag operation is performed and when the right drag operation is performed, the image pickup device basically performs the same process. Accordingly, it is hereinafter assumed for the purpose of convenient explanation that the image cards CA are shifted to the right side, as long as it is otherwise mentioned. This is true in the other embodiments.

An example of the third image checking process according to the third example of the image checking operation described with reference to FIGS. 13A and 13B and FIGS. 14A and 14B will be described now with reference to the flowchart shown in FIG. 15.

In step S41, the CPU 23 controls the digital signal processor 15 to set the display state of the image checking operation picture to the initial display state. For example, the display state of the touch screen 18 is the display state shown in FIG. 13A. That is, the top specific image card CA is the image card CA1.

In step S42, the CPU 23 determines whether the right drag operation with the finger f1 is performed in the overlapping portion CAGL of the plural image cards arranged on the left side of the top specific image card CA1.

When the right drag operation with the finger f1 is not performed, NO is determined in step S42 and the processes of step S42 and subsequent thereto are repeatedly performed. That is, the determination process of step S42 is repeatedly performed until the right drag operation with the finger f1 is performed.

Thereafter, when the right drag operation with the finger f1 is performed, YES is determined in step S42 and then the process of step S43 is performed.

In step S43, the CPU 23 determines whether the right drag operation with the finger f2 is performed in the overlapping portion CAGR of the plural image cards CA arranged on the right side of the top specific image card CA1.

When the right drag operation with the finger f2 is not performed, NO is determined in step S43 and the processes of step S42 and subsequent thereto are repeatedly performed. That is, the determination processes of steps S42 and S43 are repeatedly performed until the right drag operation with the finger f2 is performed.

Thereafter, when the right drag operation with the finger f2 is performed, YES is determined in step S43 and then the process of step S44 is performed.

In step S44, the CPU 23 controls the digital signal processor 15 to move the top specific image card CA1 to the right overlapping portion CAGR and to move the image card CA2 of the left overlapping portion CAGL to the top (to display such a moving image). That is, the top specific image card CA is changed to the image card CA2.

In step S45, the CPU 23 displays the image P2 corresponding to the top specific image card CA2 thereon.

In step S46, the CPU 23 determines whether the image checking operation is finished.

When the user does not finish the image checking operation, NO is determined in step S46 and then the processes of step S42 and subsequent thereto are repeatedly performed again. That is, as long as the user continues to perform the image checking operation, the loop process of steps S42 to S46 is repeated.

Thereafter, when the user finishes the image checking operation, YES is determined in step S46 and the third image checking process is ended.

The third example of the image checking operation has hitherto been described with reference to FIGS. 13A and 13B and FIGS. 14A and 14B. An example of the third image checking process according to the third example has been described with reference to the flowchart shown in FIG. 15.

A fourth example of the image checking operation will be described now with reference to FIGS. 16A and 16B and FIG. 17. An example of the fourth image checking process according to the fourth example will be then described with reference to the flowchart shown in FIG. 18.

Figure 16A:
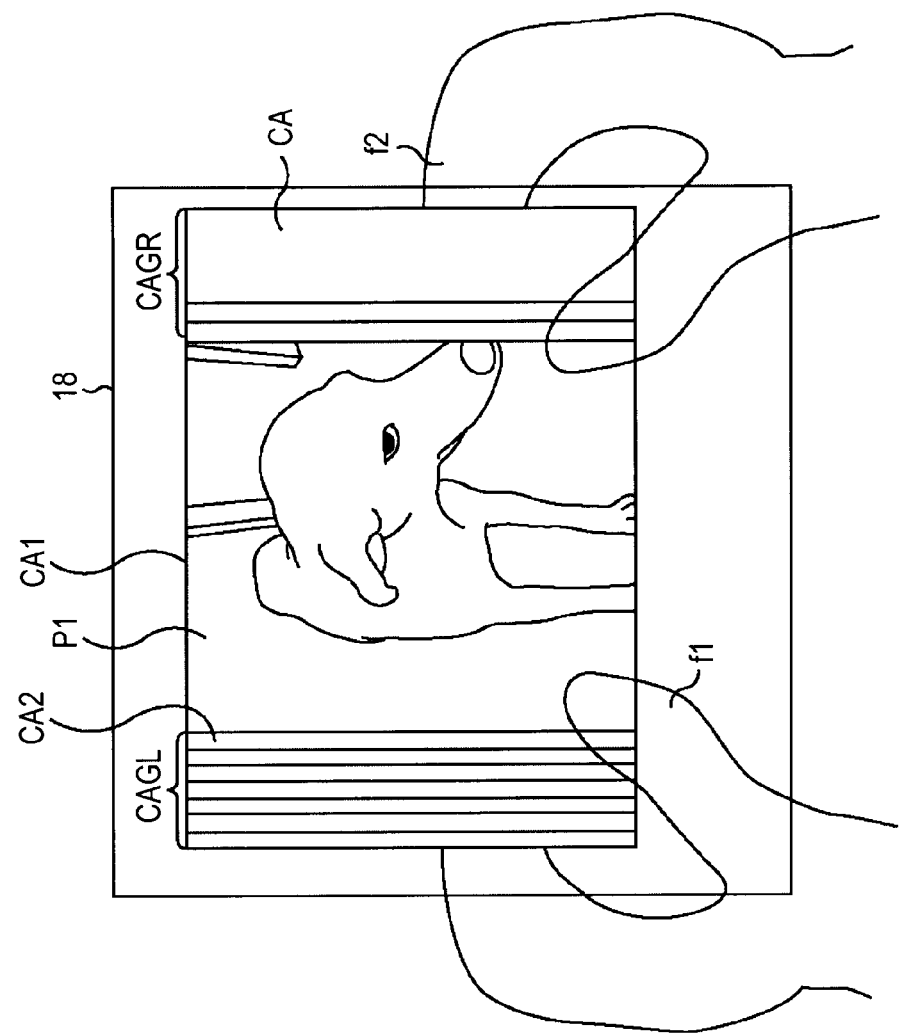
FIGS. 16A and 16B are diagrams illustrating a fourth example of the image checking operation.
Figure 16B:
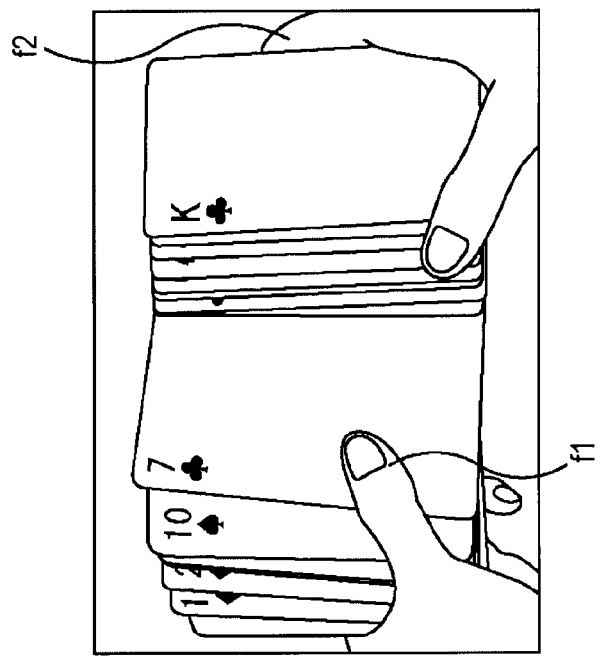
Figure 17:
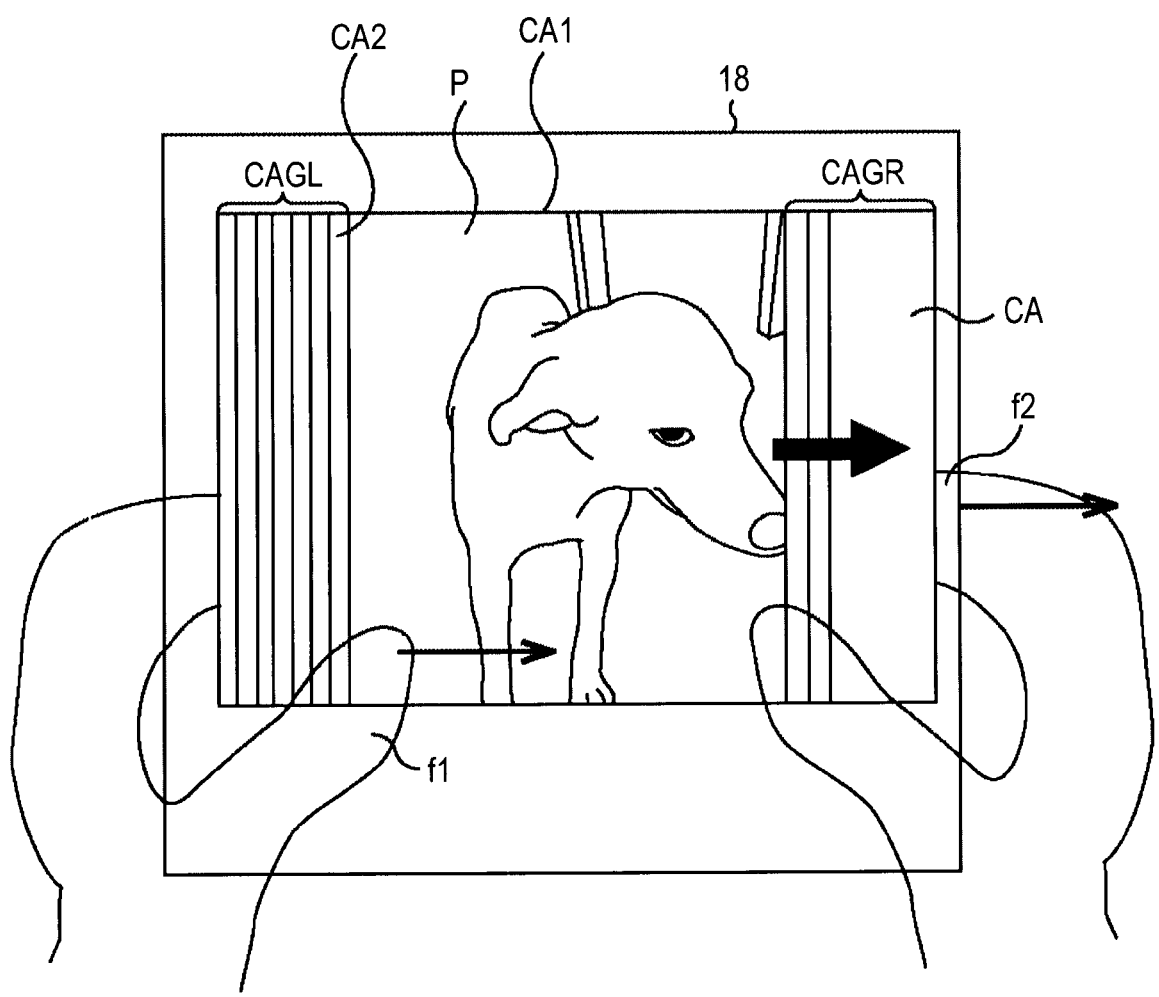
FIG. 17 is a diagram illustrating the fourth example of the image checking operation.

In the examples shown in FIGS. 16A and 16B and FIG. 17, the touch panel 28 disposed on the front surface (close to the lens unit 11) of the image pickup device is used. As described above, the touch panel 28 is disposed on the surface opposed to the touch screen 18 (see FIGS. 2A and 2B).

FIG. 16A shows an example of the initial display state of the image checking operation picture. A group CAGL of one or more image cards CA is disposed on the left side of the specific image card CA1 and a group CAGR of one or more image cards CA is disposed on the right side of the specific image card CA1.

However, to imitate the overlapping of the real cards, it is assumed that the group CAGL of one or more image cards CA is disposed in the back of the specific image card CA1 to overlap therewith and the group CAGR of one or more image cards CA is disposed in the front of the specific image card CA1 to overlap therewith.

The image P1 corresponding to the central specific image card CA1 or the information indicating the image is displayed thereon. In the example shown in FIGS. 16A and 16B, the image P1 is displayed. It is assumed hereinafter that the images P corresponding to the image cards CA are displayed thereon.

The user performs the right drag operations with the finger f1 and the finger f2 on the touch screen 18 on which the group CAGL of the image cards CA and the touch panel 28 close to the imaging lens 45. Here, the right side is based on the assumption that the group CAGL of one or more image cards CA is disposed in the back of the specific image card CA1 to overlap therewith and the group CAGR of one or more image cards CA is disposed in the front of the specific image card CA1 to overlap therewith. The reason for setting the right side will be additionally described with reference to FIG. 16B.

FIG. 16B is a reference diagram for comparing the drag operation shown in FIG. 16A with the real right card moving operation. As shown in FIG. 16B, the right card moving operation is performed with the left thumb f1 holding the upside of the cards and the finger f2 such as the right index finger holding the downside of the cards in the real world. An operation imitating the right card moving operation is the drag operation shown in FIG. 16A. Accordingly, as shown in FIG. 16A, since the right drag operation with the finger f1 corresponds to the right card moving operation with the real finger f1, the drag operation is performed on the touch screen 18 disposed on the front side of the image cards CA. On the contrary, since the right drag operation with the finger f2 corresponds to the right card moving operation with the real finger f2, the drag operation is performed on the touch panel 28 disposed on the rear side of the image cards CA.

In other words, when it is assumed that the direction in which the plural image cards CA overlap is the opposite, the drag operation is the opposite operation. That is, the direction of the drag operation is directed to the left. Specifically, the left drag operation with the finger f1 is performed on the touch panel 28 disposed on the rear side of the image cards CA. On the contrary, the left drag operation with the finger f2 is performed on the touch screen 18 disposed on the front side of the image cards CA.

When the drag operation is performed to the left side, the image cards CA are shifted to the left side. When the drag operation is performed to the right side, the image cards CA are shifted to the right side. In any case, the central specific image card CA is changed from the image card CA1 to a different image card CA. The image P corresponding to the central specific image card CA is displayed thereon. Accordingly, the user can check the image corresponding to a desired image card of the plural image cards CA.

However, as described above, it is assumed that the image cards CA are shifted to the right side.

The third example of the image checking operation will be described in more detail with reference to FIG. 17.

In the state where the display state of the touch screen 18 is the display state shown in FIG. 17, the user first performs the right drag operation with the finger f1 on the group CAGL of the image cards CA. Then, the user performs the right drag operation with the finger f2 on the opposite touch panel 28 of the group CAGR of the image cards CA.

When this series of operations is performed, the image card CA1 disposed as the central specific image card CA is moved to the group CAGR of the image cards CA and the image card CA2 disposed in the back of the image card CA1 is disposed as the central specific image card CA. The image P (for example, the image P2 shown in FIG. 14B) corresponding to the specific image card CA2 is displayed.

An example of the fourth image checking process according to the fourth example of the image checking operation described with reference to FIGS. 16A and 16B and FIG. 17 will be described now with reference to the flowchart shown in FIG. 18.

In step S61, the CPU 23 controls the digital signal processor 15 to set the display state of the image checking operation picture to the initial display state. For example, the display state of the touch screen 18 is the display state shown in FIG. 16A.

In step S62, the CPU 23 determines whether the right drag operation with the finger f1 is performed on the touch screen 18.

When the right drag operation with the finger f1 is not performed, NO is determined in step S62 and the processes of step S62 and subsequent thereto are repeatedly performed. That is, the determination process of step S62 is repeatedly performed until the right drag operation with the finger f1 is performed.

Thereafter, when the right drag operation with the finger f1 is performed, YES is determined in step S62 and then the process of step S63 is performed.

In step S63, the CPU 23 determines whether the right drag operation with the finger f2 is performed on the touch panel 28 close to the imaging lens 45.

When the right drag operation with the finger f2 is not performed, NO is determined in step S63 and the processes of step S62 and subsequent thereto are repeatedly performed. That is, the determination processes of steps S62 and S63 are repeatedly performed until the right drag operation with the finger f2 is performed on the touch panel 28 close to the imaging lens 45.

Thereafter, when the right drag operation with the finger f2 is performed on the touch panel 28 close to the imaging lens 45, YES is determined in step S63 and then the process of step S64 is performed.

In step S64, the CPU 23 controls the digital signal processor 15 to move the central specific image card CA1 to the right overlapping portion CAGR and to move the image card CA2 of the left overlapping portion CAGL to the center (to display such a moving image).

In step S65, the CPU 23 displays the image P corresponding to the central specific image card CA2 thereon.

In step S66, the CPU 23 determines whether the image checking operation is finished.

When the user does not finish the image checking operation, NO is determined in step S66 and then the processes of step S62 and subsequent thereto are repeatedly performed again. That is, as long as the user continues to perform the image checking operation, the loop process of steps S62 to S66 is repeated.

Thereafter, when the user finishes the image checking operation, YES is determined in step S66 and the fourth image checking process is ended.

The fourth example of the image checking operation has hitherto been described with reference to FIGS. 16A and 16B and FIG. 17. An example of the fourth image checking process according to the fourth example has been described with reference to the flowchart shown in FIG. 18.

Fifth to seventh examples of the image checking operation will be described now with reference to FIGS. 19A and 19B, FIGS. 20A and 20B, and FIGS. 21A and 21B. Examples of the fifth to seventh image checking processes according to the fifth to seventh example will be then described with reference to the flowcharts shown in FIGS. 22 to 24.

In the fifth example shown in FIGS. 19A and 19B, it is assumed that the display state shown in FIG. 3A is employed as the initial display state of the image checking operation picture. The specific image card CA1 is disposed in the top of the overlapping of the plural image cards CA. The image P1 corresponding to the top specific image card CA1 or the information indicating the image is displayed thereon. For example, in the example of FIGS. 19A and 19B, the image P1 is displayed. It is assumed hereinafter that the images P corresponding to the image cards CA are displayed thereon.

The user performs the upward drag operation indicated by an arrow with the finger f2 in any area of the top specific image card CA1. Then, as shown in FIG. 19B, the specific image card CA1 is moved to the bottom of the plural image cards CA. The image card CA2 disposed in the back of the image card CA1 is moved to the top. That is, the image card CA2 becomes the top specific image card CA. The image P2 corresponding to the specific image card CA2 is displayed thereon.

Figure 20B:
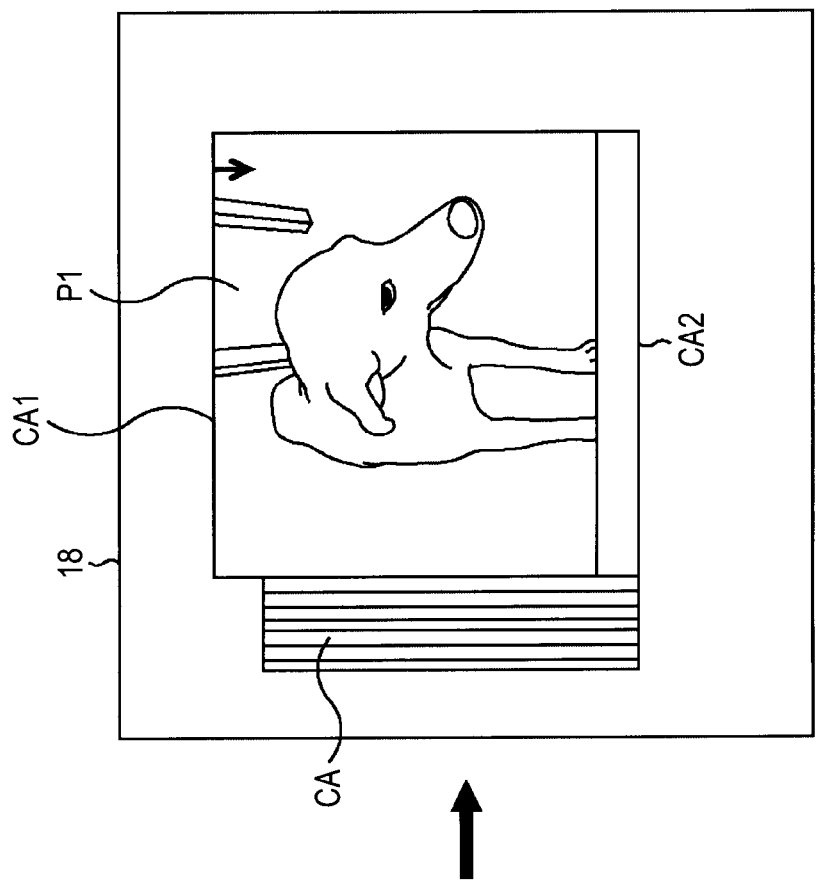
FIGS. 20A and 20B are diagrams illustrating a sixth example of the image checking operation.
Figure 20A:
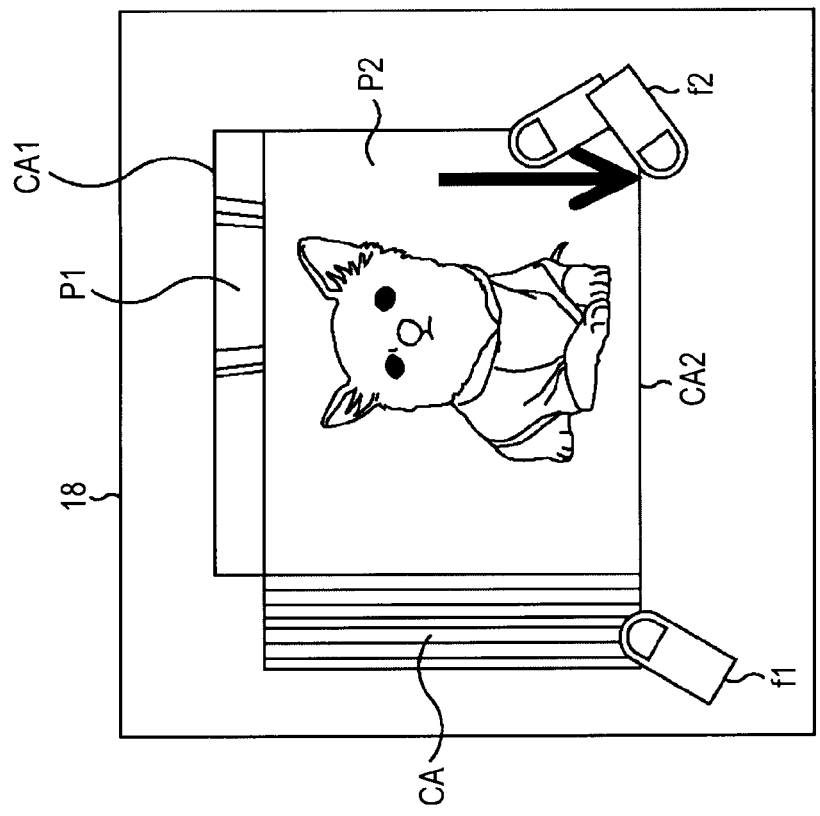

FIGS. 20A and 20B are diagrams illustrating the sixth example of the image checking operation. That is, the sixth example shown in FIGS. 20A and 20B is an example of an operation of moving the specific image card CA1 disposed in the bottom of the overlapping plural image cards CA to the top in the fifth example shown in FIGS. 19A and 19B.

Accordingly, in the sixth example, it is assumed that the display state shown in FIG. 19B is employed as the initial display state of the image checking operation picture. The same is actually true in the display state shown in FIG. 3A. In this case, the image P2 corresponding to the top specific image card CA2 or the information indicating the image is displayed thereon. For example, the image P2 is displayed in the example shown in FIGS. 20A and 20B. It is assumed hereinafter that the images P corresponding to the image cards CA are displayed thereon.

As shown in FIG. 20A, the user performs the downward drag operation indicated by an arrow with the finger f2 in any area of the specific image card CA2 disposed in the top. Then, as shown in FIG. 20B, the image card CA1 disposed in the bottom is moved to the top of the plural image cards CA. That is, the image card CA1 becomes the top specific image card CA. The image P1 corresponding to the top specific image card CA1 is displayed thereon.

Figure 21B:
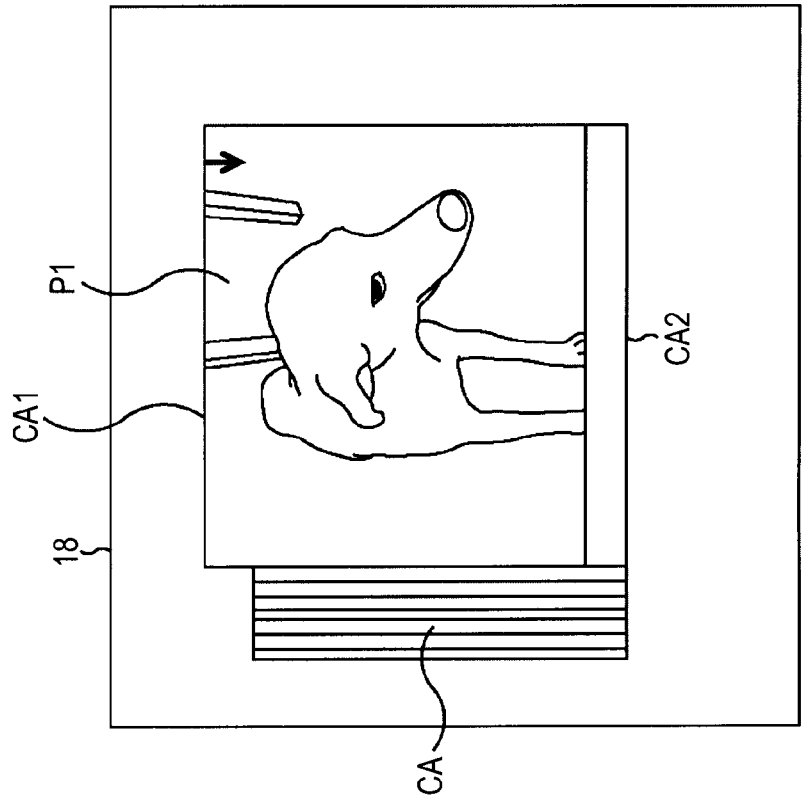
FIGS. 21A and 21B are diagrams illustrating a seventh example of the image checking operation.
Figure 21A:
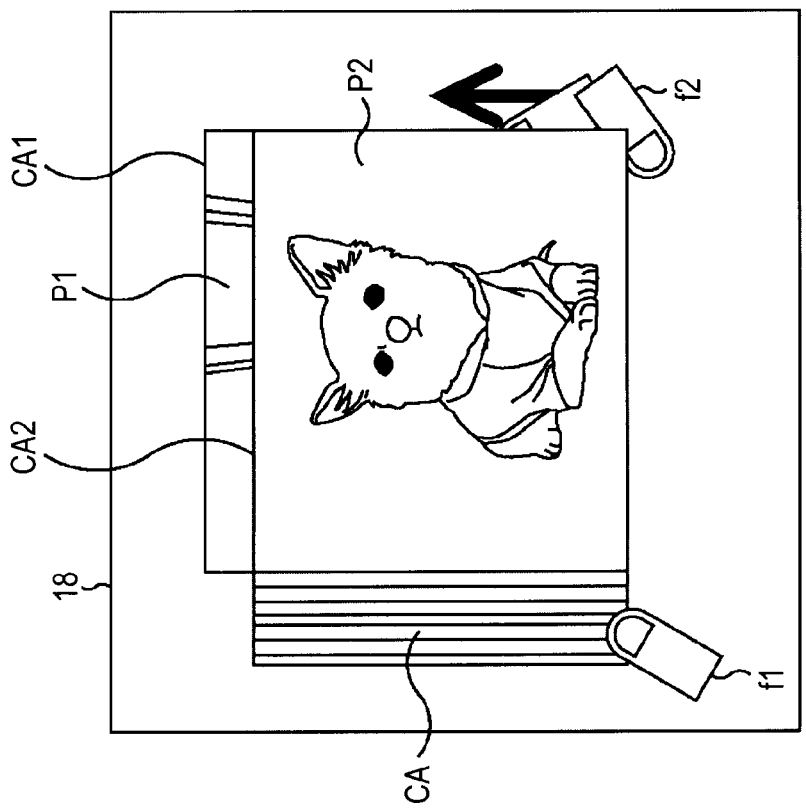

FIGS. 21A and 21B are diagrams illustrating the seventh example of the image checking operation. That is, the seventh example shown in FIGS. 21A and 21B is an example of an operation of moving the specific image card CA1 disposed in the bottom of the plural image cards CA to the top, similarly to the sixth example shown in FIGS. 20A and 20B.

Accordingly, in the seventh example, it is assumed that the display state shown in FIG. 19B is employed as the initial display state of the image checking operation picture. The same is actually true in the display state shown in FIG. 3A. In this case, the image P2 corresponding to the top specific image card CA2 or the information indicating the image is displayed thereon. For example, the image P2 is displayed in the example shown in FIGS. 21A and 21B. It is assumed hereinafter that the images P corresponding to the image cards CA are displayed thereon.

However, the touch panel 28 disposed on the front surface (close to the lens unit 11) of the image pickup device is used in the seventh example. As described above, the touch panel 28 is disposed on the surface opposed to the touch screen 18 (see FIGS. 2A and 2B).

As shown in FIG. 21A, the user performs the upward drag operation indicated by an arrow with the finger f2 in any area of the touch panel 28 close to the imaging lens 45. Then, as shown in FIG. 21B, the image card CA1 disposed in the bottom is moved to the top of the plural image cards CA. That is, the image card CA1 becomes the top specific image card CA. The image P1 corresponding to the specific image card CA1 is displayed thereon.

An example of the fifth image checking process according to the fifth example of the image checking operation described with reference to FIGS. 19A and 19B will be described now with reference to the flowchart shown in FIG. 22.

In step S81, the CPU 23 controls the digital signal processor 15 to set the display state of the image checking operation picture to the initial display state. For example, the display state of the touch screen 18 is the display state shown in FIG. 3A.

In step S82, the CPU 23 determines whether the upward drag operation with the finger f2 is performed in any area of the top specific image card CA1.

When the upward drag operation with the finger f2 is not performed, NO is determined in step S82 and the processes of step S82 and subsequent thereto are repeatedly performed. That is, the determination process of step S82 is repeatedly performed until the upward drag operation with the finger f2 is performed.

Thereafter, when the upward drag operation with the finger f2 is performed, YES is determined in step S82 and then the process of step S83 is performed.

In step S83, the CPU 23 controls the digital signal processor 15 to move the top specific image card CA1 to the bottom of the plural image cards CA. As a result, the image card CA2 disposed in the back of the image card CA1 is moved to the top. That is, the image card CA2 becomes the top specific image card CA. As shown in FIG. 19B, the image P2 corresponding to the specific image card CA2 is displayed thereon.

In step S84, the CPU 23 determines whether the image checking operation is finished.

When the user does not finish the image checking operation, NO is determined in step S84 and then the processes of step S82 and subsequent thereto are repeatedly performed again. That is, as long as the user continues to perform the image checking operation, the loop process of steps S82 to S84 is repeated.

Thereafter, when the user finishes the image checking operation, YES is determined in step S84 and the fifth image checking process is ended.

Figure 23:
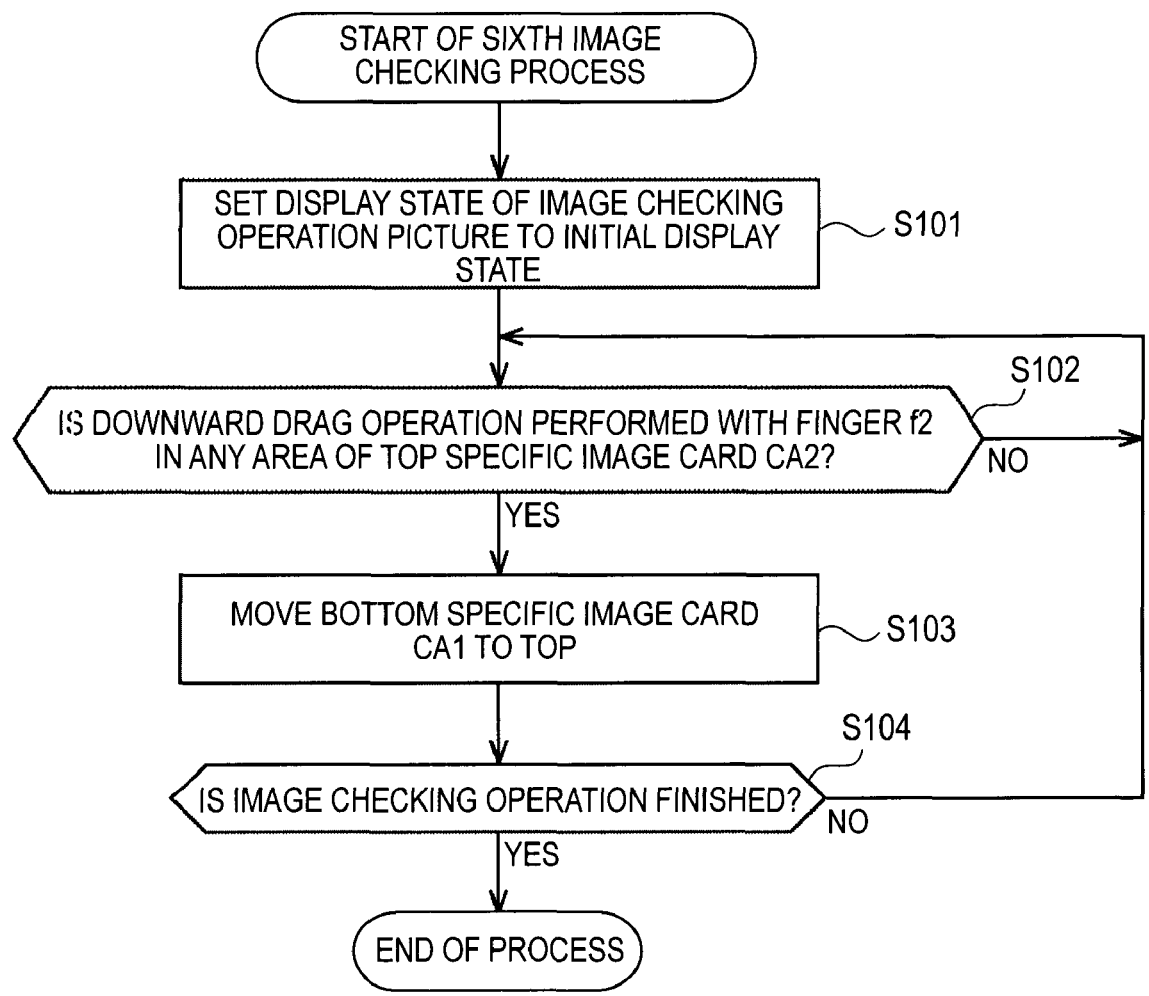
FIG. 23 is a flowchart illustrating an example of a sixth image checking process.

An example of the sixth image checking process according to the sixth example of the image checking operation described with reference to FIGS. 20A and 20B will be described now with reference to the flowchart shown in FIG. 23.

In step S101, the CPU 23 controls the digital signal processor 15 to set the display state of the image checking operation picture to the initial display state. For example, the display state of the touch screen 18 is the display state shown in FIG. 19B.

In step S102, the CPU 23 determines whether the downward drag operation with the finger f2 is performed in any area of the top specific image card CA2.

When the downward drag operation with the finger f2 is not performed, NO is determined in step S102 and the processes of step S102 and subsequent thereto are repeatedly performed. That is, the determination process of step S102 is repeatedly performed until the downward drag operation with the finger f2 is performed.

Thereafter, when the downward drag operation with the finger f2 is performed, YES is determined in step S102 and then the process of step S103 is performed.

In step S103, the CPU 23 controls the digital signal processor 15 to move the bottom image card CA1 to the top of the plural image cards CA. That is, the image card CA1 becomes the top specific image card CA. As shown in FIG. 20B, the image P1 corresponding to the top specific image card CA1 is displayed thereon.

In step S104, the CPU 23 determines whether the image checking operation is finished.

When the user does not finish the image checking operation, NO is determined in step S104 and then the processes of step S102 and subsequent thereto are repeatedly performed again. That is, as long as the user continues to perform the image checking operation, the loop process of steps S102 to S104 is repeated.

Thereafter, when the user finishes the image checking operation, YES is determined in step S104 and the sixth image checking process is ended.

Figure 24:
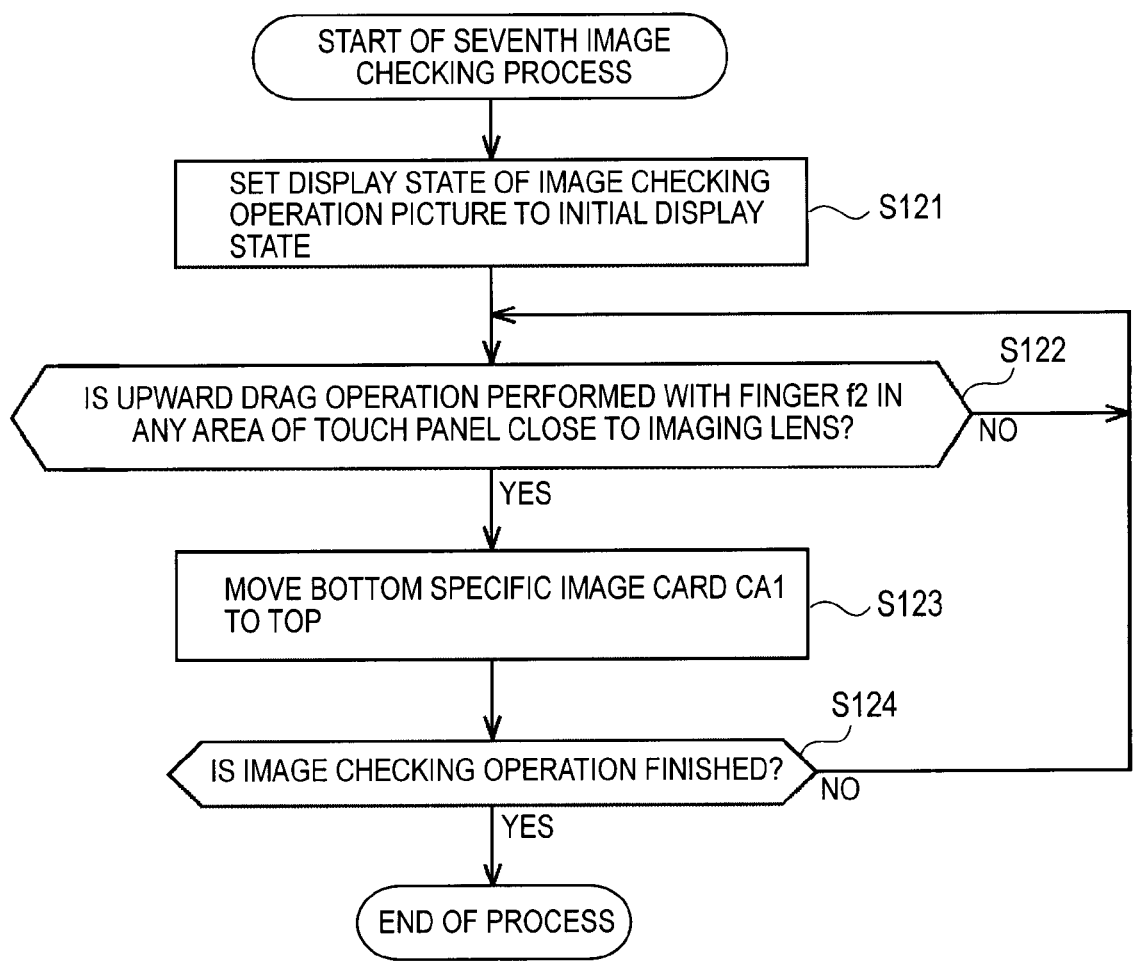
FIG. 24 is a flowchart illustrating an example of a seventh image checking process.

An example of the seventh image checking process according to the seventh example of the image checking operation described with reference to FIGS. 21A and 21B will be described now with reference to the flowchart shown in FIG. 24.

In step S121, the CPU 23 controls the digital signal processor 15 to set the display state of the image checking operation picture to the initial display state. For example, the display state of the touch screen 18 is the display state shown in FIG. 19B.

In step S122, the CPU 23 determines whether the upward drag operation with the finger f2 is performed in any area of the touch panel 28 close to the imaging lens 45.

When the upward drag operation with the finger f2 is not performed, NO is determined in step S122 and the processes of step S122 and subsequent thereto are repeatedly performed. That is, the determination process of step S122 is repeatedly performed until the upward drag operation with the finger f2 is performed.

Thereafter, when the upward drag operation with the finger f2 is performed in any area of the touch panel 28 close to the imaging lens 45, YES is determined in step S122 and then the process of step S123 is performed.

In step S123, the CPU 23 controls the digital signal processor 15 to move the bottom image card CA1 to the top of the plural image cards CA. That is, the image card CA1 becomes the top specific image card CA. As shown in FIG. 21B, the image P1 corresponding to the top specific image card CA1 is displayed thereon.

In step S124, the CPU 23 determines whether the image checking operation is finished.

When the user does not finish the image checking operation, NO is determined in step S124 and then the processes of step S122 and subsequent thereto are repeatedly performed again. That is, as long as the user continues to perform the image checking operation, the loop process of steps S122 to S124 is repeated.

Thereafter, when the user finishes the image checking operation, YES is determined in step S124 and the seventh image checking process is ended.

The fifth to seventh examples of the image checking operation have been described with reference to FIGS. 19A and 19B, FIGS. 20A and 20B, and FIGS. 21A and 21B. An example of the fifth to seventh image checking processes according to the fifth to seventh examples of the image checking operation have been described with reference to the flowcharts shown in FIGS. 22 to 24.

Of course, the image checking operation according to this embodiment is not limited to the above-mentioned examples. For example, FIGS. 25A and 25B are diagrams illustrating an example of the image checking operation according to this embodiment, which are different from the examples shown in FIGS. 3A and 3B to FIGS. 23A and 23B.

Figure 25B:
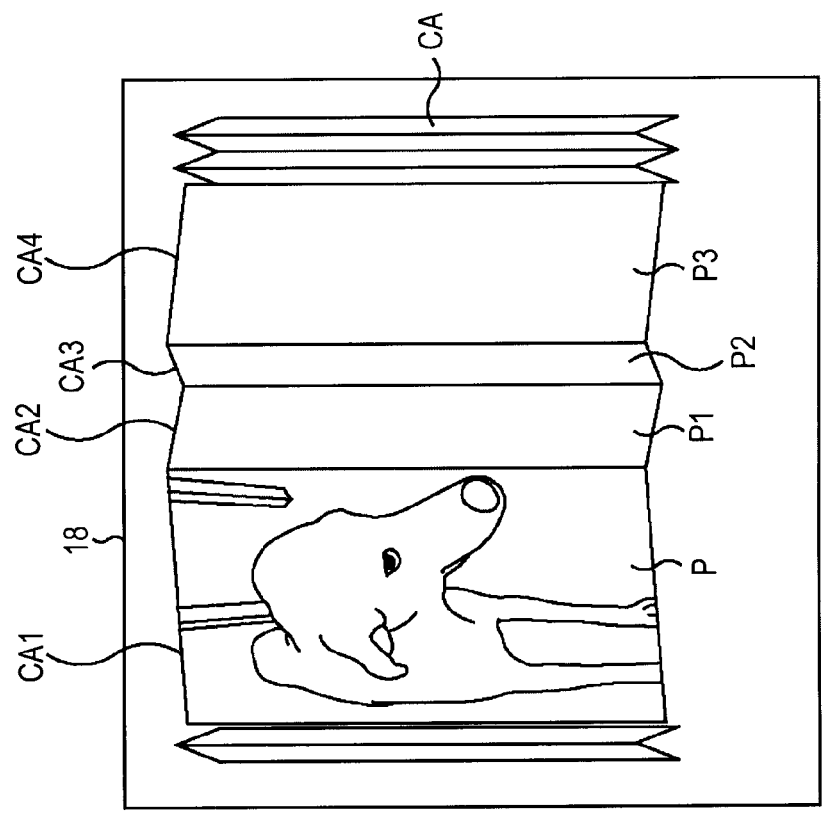
FIGS. 25A and 25B are diagrams illustrating an example of the image checking operation.
Figure 25A:
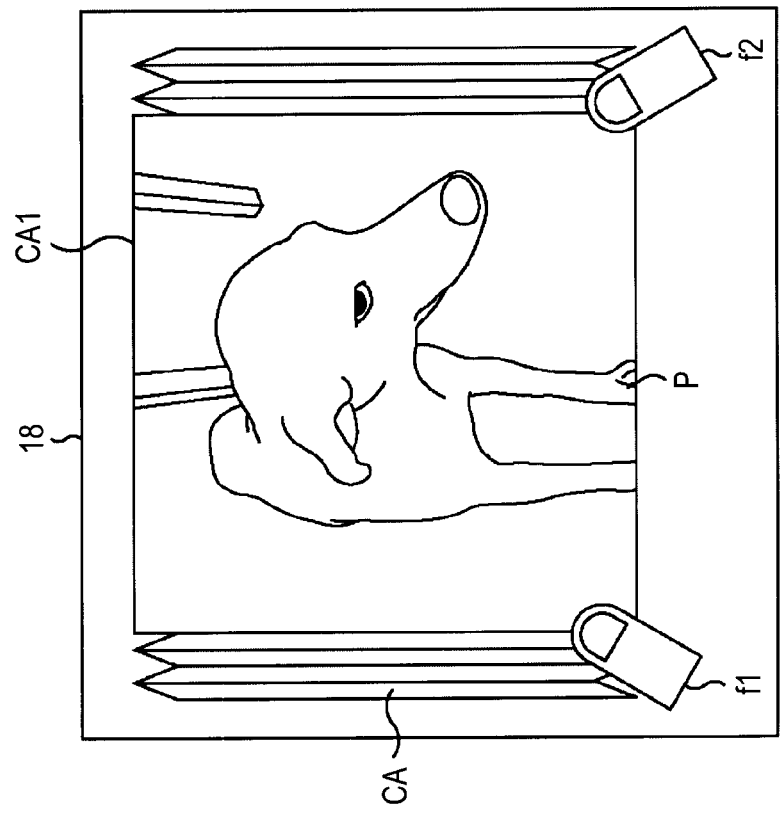

FIGS. 25A and 25B show an example of the initial display state of the image checking operation picture. In this example, plural image cards CA are displayed to overlap with each other in a state where the image cards are laterally folded about a specific image card CA1 (like an accordion).

The user performs the drag operation with the finger f1 or the finger f2 on the area of the overlapping portion in which the plural image cards CA are folded. Accordingly, the specific image card CA1 disposed at the center is moved to one of the left and right overlapping portions in which the plural image cards CA are folded (to the left side in the example shown in FIGS. 25A and 25B). Thereafter, although not shown, the image card CA2 disposed in the back is moved to the center. That is, the image card CA2 becomes the central specific image card CA. Accordingly, the image P (the image P2 shown in FIG. 14B) corresponding to the specific image card CA2 is displayed. By performing the drag operation in this way, the respective image cards CA are sequentially moved from the overlapping portion in which the plural image cards CA are folded to the center.

Various examples of the image checking operations and various examples of the image checking process corresponding thereto have been described hitherto.

Various examples of an operation (hereinafter, referred to as "image selecting operation") of selecting a specific image from plural images as the GUI operation using the touch screen 18 will be described now.

A first example of the image selecting operation will be first described with reference to FIGS. 26A, 26B, and 26C.

The same image checking operation picture as used in the image checking operation is used in the image selecting operation. For example, FIG. 26A shows the same image checking operation picture as shown in FIG. 3A. FIG. 26B shows the same image checking operation picture shown in FIG. 13A.

Therefore, the operation until the specific image card CA1 is selected is basically similar to the image checking operation.

That is, for example, when the initial display state of the image checking operation picture is the state shown in FIG. 26A, the user performs the drag operation with the finger f1 on the area of the overlapping portion of the plural image cards CA. When the contact of the finger f1 with the specific image card CA1 is maintained for a predetermined time, the information indicating the image P corresponding to the specific image card CA1 is displayed (see FIGS. 4A to 4C and FIGS. 5 and 6). That is, the operation up to now is the same as the first example of the image checking operation. On the other hand, the user can release the finger f1 after maintaining the contact of the finger f1 with the specific image card CA1 for a predetermined time as the image selection operation. Accordingly, the display state of the touch screen 18 is changed from the image checking operation picture shown in FIG. 26A to the display state shown in FIG. 26C. That is, as shown in FIG. 26C, the image P is displayed on the touch screen 18 with the full size.

For example, when the initial display state of the image checking operation picture is the state shown in FIG. 26B, the user performs the drag operations with the finger f1 and the finger f2 on the left and right areas of the overlapping portions of the plural image cards CA, respectively. When the contact of the finger f1 and the finger f2 is maintained in the meantime, the image P (which is the image P2 corresponding to the top specific image card CA2 in the example shown in FIG. 15, but the example shown in FIG. 26A is employed herein)

corresponding to the top specific image card CA1 is displayed. That is, the operation up to now is the same as the third example of the image checking operation. On the other hand, the user can release at least one of the finger f1 and the finger f2 as the image selecting operation. Accordingly, the display state of the touch screen 18 is changed from the image checking operation picture shown in FIG. 26B to the display state shown in FIG. 26C. That is, as shown in FIG. 26C, the image P corresponding to the specific image card CA1 disposed in the top just before the release is displayed on the touch screen 18 with the full size.

In this way, the image checking operation and the image selecting operation can be carried out as a series of operations. Hereinafter, this series of operations is called an image checking and selecting operation. That is, an example of the image checking and selecting operation is described with reference to FIGS. 26A and 26C. Another example of the image checking and selecting operation is described with reference to FIGS. 26B and 26C. Hereinafter, the former example is called a 1A-th example and the latter example is called a 1B-th example.

The processes performed by the image pickup device shown in FIG. 1 in the 1A-th and 2A-th examples of the image checking and selecting operation will be described now. The process performed by the image pickup device for the image checking and selecting operation is hereinafter referred to as an image checking and selecting process. Particularly, the image checking and selecting process according to the K-th example (where K is 1A, 1B, or an integer of 2 or greater) of the image checking and selecting operation according to this embodiment is referred to as a K-th image checking and selecting process.

FIG. 27 is a flowchart illustrating an example of the 1A-th image checking and selecting process.

When the operation state of the image pickup device is changed to the reproduction mode, the 1A-th image checking and selecting process is started.

In step S141, the CPU 23 controls the digital signal processor 15 to set the display state of the image checking operation picture to the initial display state. For example, the display state of the touch screen 18 is the display state shown in FIG. 26A.

In step S142, the CPU 23 determines whether the drag operation is performed in the overlapping portion of the plural image cards CA.

When the drag operation is not performed, NO is determined in step S142 and the processes of step S142 and subsequent thereto are repeatedly performed. That is, the determination process of step S142 is repeatedly performed until the drag operation is performed.

Thereafter, when the drag operation is performed, YES is determined in step S142 and then the process of step S143 is performed.

In step S143, the CPU 23 determines whether the specific image card CA1 is in contact with the finger f1 for a predetermined time.

When the finger f1 is not in contact with the specific image card CA1 for a predetermined time, that is, when the finger f1 is moved, NO is determined in step S143 and the processes of step S143 and subsequent thereto are repeatedly performed. That is, while the finger f1 is being moved, the determination process of step S143 is repeatedly performed.

Thereafter, when the finger f1 is stopped and the finger f1 is in continuous contact with the specific image card CA1 for a predetermined time, YES is determined in step S143 and then the process of step S144 is performed.

In step S144, the CPU 23 determines whether the finger f1 is released. That is, the CPU 23 can determine that the finger f1 is released when the coordinate signals are not input from the touch panel 16 of the touch screen 18.

Therefore, the CPU 23 determines NO in step S144 as long as the coordinate signals are continuously input, and then performs the process of step S145.

In step S145, the CPU 23 controls the digital signal processor 15 to display the information indicating the image P corresponding to the specific image card CA1.

That is, when the user stops the drag operation for a predetermined time, the CPU 23 recognizes the specific image card CA1 in contact with the user's finger f1 for a predetermined time. Then, the CPU 23 controls the digital signal processor 15 to change the display state of the touch screen 18, for example, from the display state shown in FIG. 3A to the display state shown in FIGS. 4A, 5, and 6. The CPU 23 controls the digital signal processor 15 to display a portion PP of the image P shown in FIGS. 4B and 4C, the thumbnail PS of the image P shown in FIG. 5, or the feature image PC of the image P shown in FIG. 6 in a predetermined area of the specific image card CA1.

In step S146, the CPU 23 determines whether the image checking operation is finished.

When the user does not finish the image checking operation, NO is determined in step S146 and the processes of step S141 and subsequent thereto are repeatedly performed. That is, as long as the user does not finish the image checking operation and the image selecting operation to be described later, the loop process of steps S141 to S146 or the loop process of steps S141 to S148 is repeated.

Thereafter, when the user finishes the image checking operation, YES is determined in step S146 and thus the 1A-th image checking and selecting process is ended.

On the contrary, when it is determined in step S143 that the specific image card CA1 is in contact for a predetermined time and it is determined in step S144 that the finger f1 is released, that is, when the input of the coordinate signal of the finger f1 is stopped, the process of step S147 is performed.

In step S147, the CPU 23 controls the digital signal processor 15 to display the image P corresponding to the specific image card CA1 on the touch screen 18 with the full size. That is, in the example shown in FIGS. 26A, 26B, and 26C, the display state of the touch screen 18 is changed from the image checking operation picture shown in FIG. 26A to the display state shown in FIG. 26C.

In step S148, the CPU 23 determines whether the image selecting operation is finished.

When the user does not finish the image selecting operation, NO is determined in step S148 and the processes of step S141 and subsequent thereto are repeated again. That is, as long as the user does not finish the image selecting operation and the image checking operation, the loop process of steps S141 to S146 or the loop process of steps S141 to S148 is repeated.

Thereafter, when the user finishes the image selecting operation, YES is determined in step S148 and the 1A-th image checking and selecting process is ended.

Figure 28:
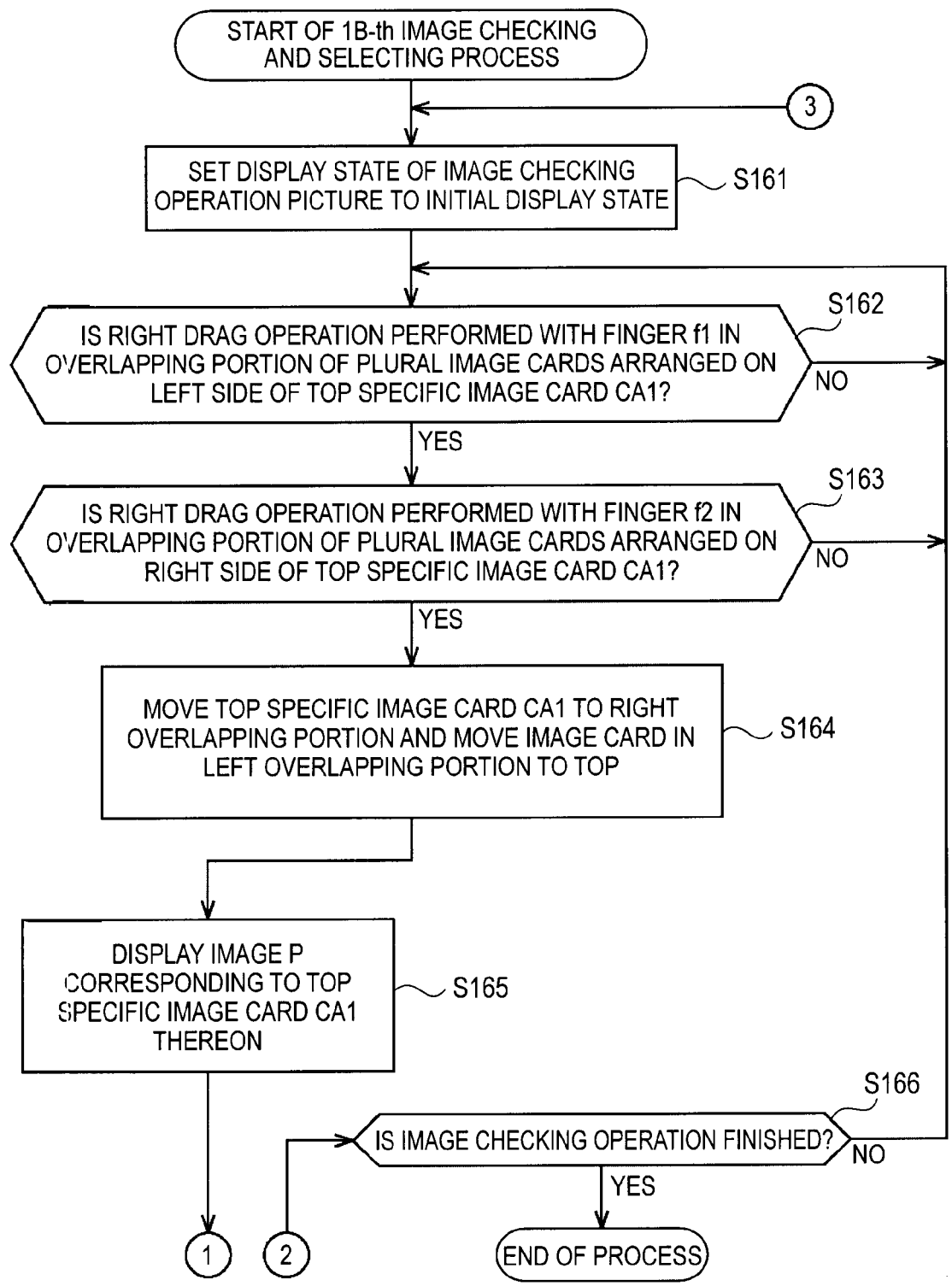
FIG. 28 is a flowchart illustrating an example of a 1B-th image checking and selecting process.
Figure 29:
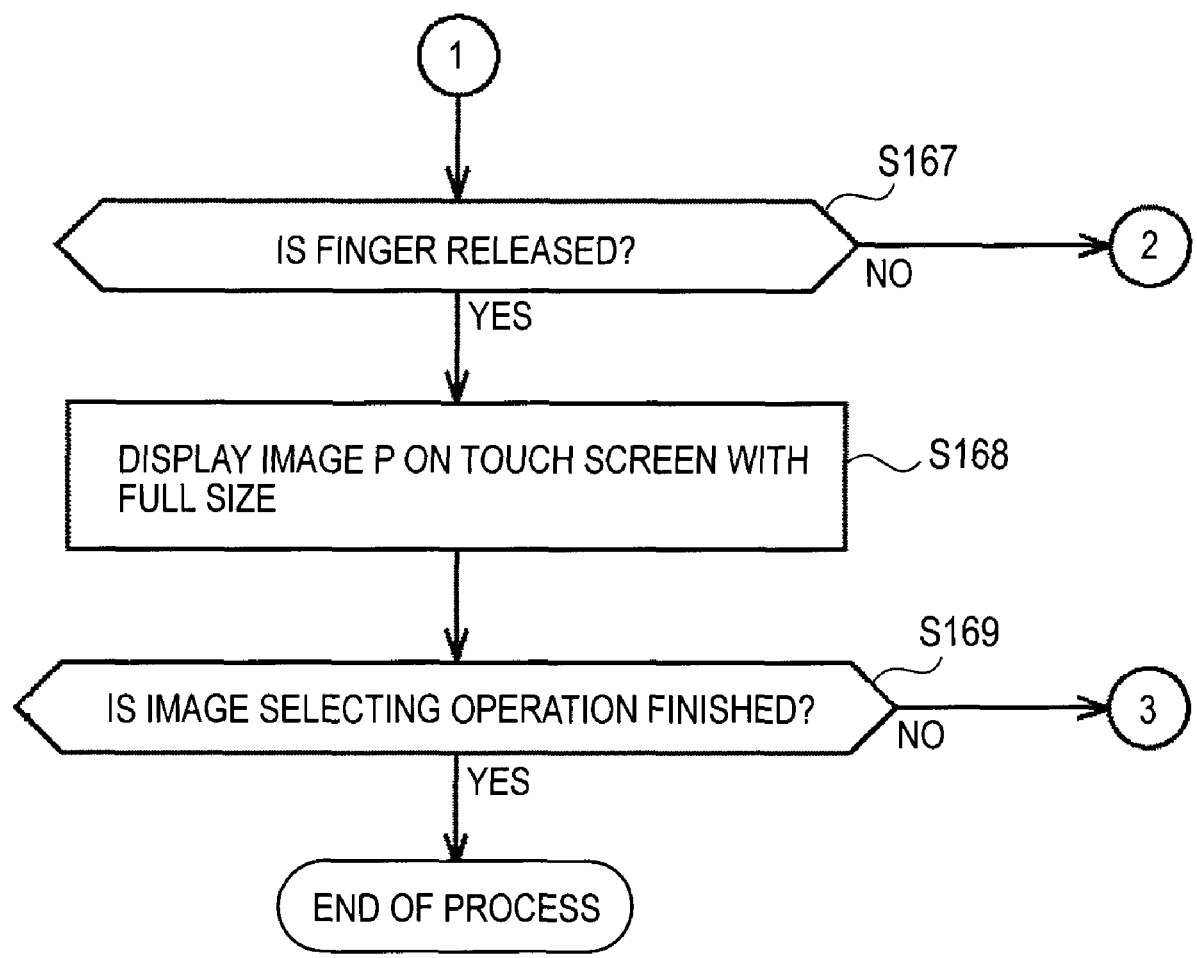
FIG. 29 is a flowchart illustrating the example of the 1B-th image checking and selecting process.

FIGS. 28 and 29 are flowcharts illustrating an example of the 1B-th image checking and selecting process.

When the operation state of the image pickup device is changed to the reproduction mode, the 1B-th image checking and selecting process is started.

In step S161 of FIG. 28, the CPU 23 controls the digital signal processor 15 to set the display state of the image checking operation picture to the initial display state. For example, the display state of the touch screen 18 is set to the display state shown in FIG. 26B.

In step S162, the CPU 23 determines whether the right drag (operation with the finger f1 is performed in the overlapping portion CAGL of the plural image cards CA arranged on the left side of the top specific image card CA1 (see FIGS. 13A and 13B).

When the right drag operation with the finger f1 is not performed, NO is determined in step S162 and the processes of step S162 and subsequent thereto are repeatedly performed. That is, the determination process of step S162 is repeatedly performed until the right drag operation with the finger f1 is performed.

Thereafter, when the right drag operation with the finger f1 is performed, YES is determined in step S162 and then the process of step S163 is performed.

In step S163, the CPU 23 determines whether the right drag operation with the finger f2 is performed in the overlapping portion CAGR of the plural image cards CA arranged on the right side of the top specific image card CA1 (see FIGS. 13A and 13B).

When the right drag operation with the finger f2 is not performed, NO is determined in step S163 and the processes of step S162 and subsequent thereto are repeatedly performed. That is, the determination processes of steps S162 and S163 are repeatedly performed until the right drag operation with the finger f2 is performed.

Thereafter, when the right drag operation with the finger f2 is performed, YES is determined in step S163 and then the process of step S164 is performed.

In step S164, the CPU 23 controls the digital signal processor 15 to move the top specific image card CA1 to the right overlapping portion CAGR and to move the image card CA2 of the left overlapping portion CAGL to the top (see FIGS. 14A and 14B).

In step S165, the CPU 23 displays the image P (the image P2 in the example shown in FIGS. 14A and 14B) corresponding to the top specific image card CA2 thereon (see FIGS. 14A and 14B).

In step S167 of FIG. 29, the CPU 23 determines whether the finger is released.

When at least one of the finger f1 and the finger f2 is released, YES is determined in step S167 and then the process of step S168 is performed.

In step S168, the CPU 23 controls the digital signal processor 15 to display the image P corresponding to the specific image card CA2 on the touch screen 18 with the full size. That is, in the example shown in FIGS. 26A, 26B, and 26C, the display state of the touch screen 18 is changed from the image checking operation state shown in FIG. 26B to the display state shown in FIG. 26C.

In step S169, the CPU 23 determines whether the image selecting operation is finished.

When the user does not finish the image selecting operation, NO is determined in step S169 and the processes of step S161 of FIG. 28 and subsequent thereto are repeated again.

On the contrary, when the user finishes the image selecting operation, YES is determined in step S169 and the 1B-th image checking and selecting process is ended.

When both the finger f1 and the finger f2 are in continuous contact with the touch screen 18 at the time of performing the process of step S167, NO is determined in step S167 and then the process of step S166 shown in FIG. 28 is performed.

In step S166, the CPU 23 determines whether the image checking operation is finished.

When the user does not finish the image checking operation, NO is determined in step S166 and the processes of step S162 and subsequent thereto are repeatedly performed.

On the contrary, when the user finishes the image checking operation, YES is determined in step S166 and thus the 1B-th image checking and selecting process is ended.

The 1A-th and 1B-th examples of the image checking and selecting operation have been hitherto described with reference to FIGS. 26A, 26B, and 26C. The examples of the 1A-th and 1B-th image checking and selecting processes according to the first example have been described with reference to the flowcharts of FIGS. 27, 28, and 29.

A second example of the image checking and selecting operation will be described now with reference to FIGS. 30A to 30C and FIGS. 31A and 31B. An example of the second image checking and selecting process according to the second example will be described with reference to the flowcharts shown in FIGS. 32 and 33.

In the second example, it is assumed that the display state shown in FIG. 26B is employed as the initial display state of the image checking operation picture. Accordingly, in the display state shown in FIG. 26B, the user performs the drag operations with the finger f1 and the finger f2 on the left and right areas of the overlapping portions of the plural image cards CA, respectively. When the contact of the finger f1 and the finger f2 is maintained in the meantime, the image P corresponding to the top specific image card CA1 is displayed (see FIGS. 16A and 16B). That is, the operation up to now is the same as the third example of the image checking operation.

On the other hand, the user can perform the upward drag operation indicated by an arrow with the finger f2 using any area of the top specific image card CA1 as a start point at the time of performing the image selecting operation. Accordingly, the display state of the touch screen 18 is changed from the image checking operation picture shown in FIG. 30A to the display state shown in FIG. 30B. That is, as shown in FIG. 30B, the image P corresponding to the top specific image card CA1 is displayed on the touch screen 18 with the full size.

When the display state of the touch screen 18 is changed from the image checking operation picture to the display state of the image P with the full size, the image P may be displayed to slide into the entire plane of the touch screen 18 from the downside of the touch screen 18 by animation.

FIG. 30C is a reference diagram for comparing the upward and downward drag operations shown in FIG. 30A with an operation (hereinafter, referred to as "card extracting operation") of extracting a specific image card upward from plural real cards. The card extracting operation with the left thumb f1 shown in FIG. 30C corresponds to the upward and downward drag operations with the finger f2 shown in FIG. 30A.

In the example shown in FIGS. 30A, 30B, and 30C, the fingers used in the card extracting operation and the drag operation are different from each other, but any one of the finger f1 and the finger f2 may be used in both cases. More generally speaking, the finger used in the drag operation is not particularly limited. This is true in all the operations described in the specification. That is, the operations with the finger f1 and the finger f2 in this specification are only examples corresponding to the drawings.

In this way, since the user can perform the operation imitating the real operation on the touch screen 18 using the image cards CA imitating the real cards, it is possible to intuitively perform the operation.

When the display state of the touch screen 18 is the display state shown in FIG. 31A, that is, the display state of the image P with the full size, the user can perform the downward drag operation indicated by an arrow with the finger f2 using any area of the image P as a start point. Accordingly, the display state of the touch screen 18 is changed again to the image checking operation picture shown in FIG. 31B.

When the display state of the touch screen 18 is changed again from the display state of the image P with the full size to the image checking operation picture, the image P may be displayed to slide into the top specific image card CA1 from the upside of the touch screen 18 by animation.

An example of a process according to the second example of the image checking and selecting operation described with reference to FIGS. 30A to 30C and FIGS. 31A and 31B, that is, a second image checking and selecting process, will be described now with reference to the flowcharts shown in FIGS. 32 and 33.

Figure 32:
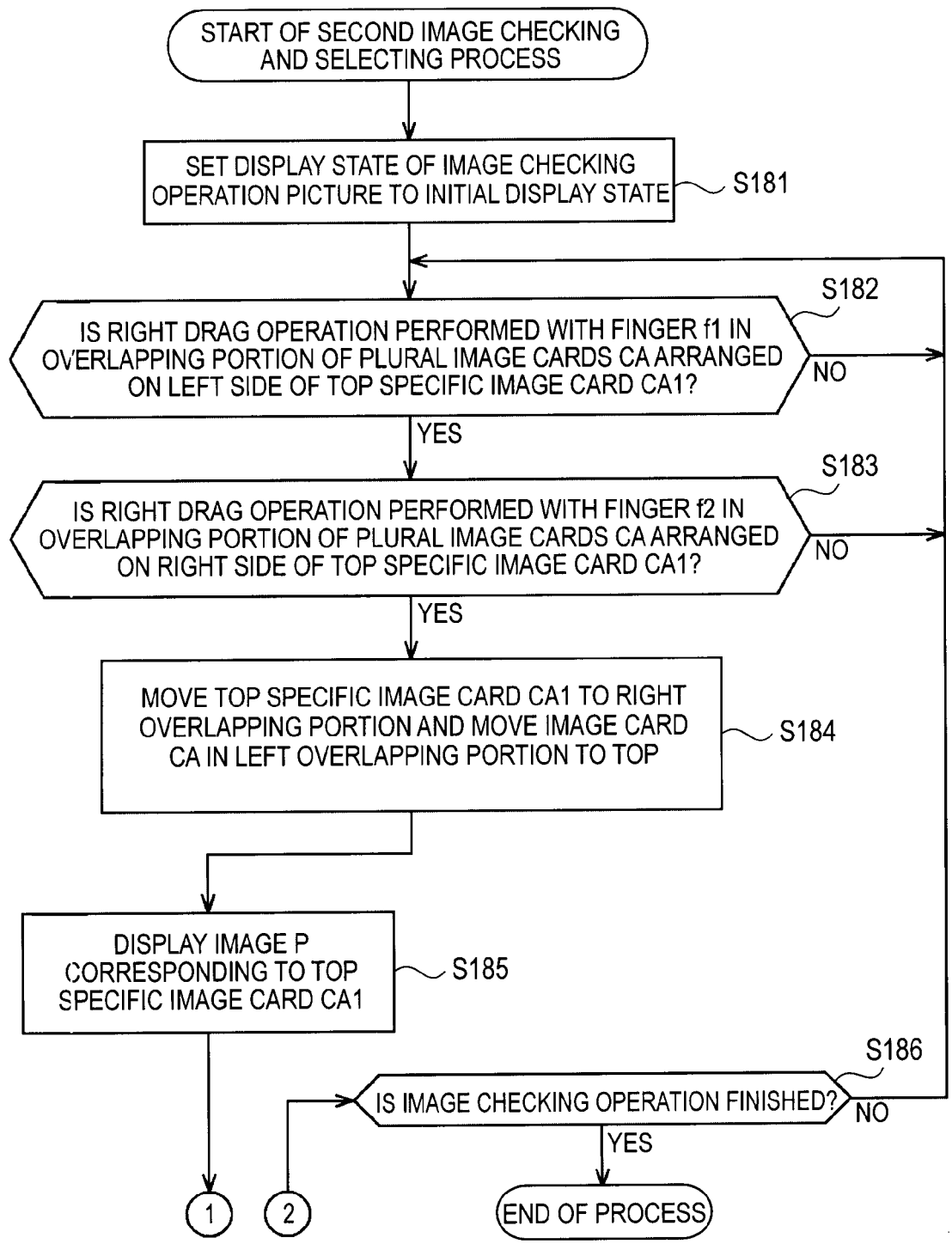
FIG. 32 is a flowchart illustrating an example of a 2B-th image checking and selecting process.
Figure 33:
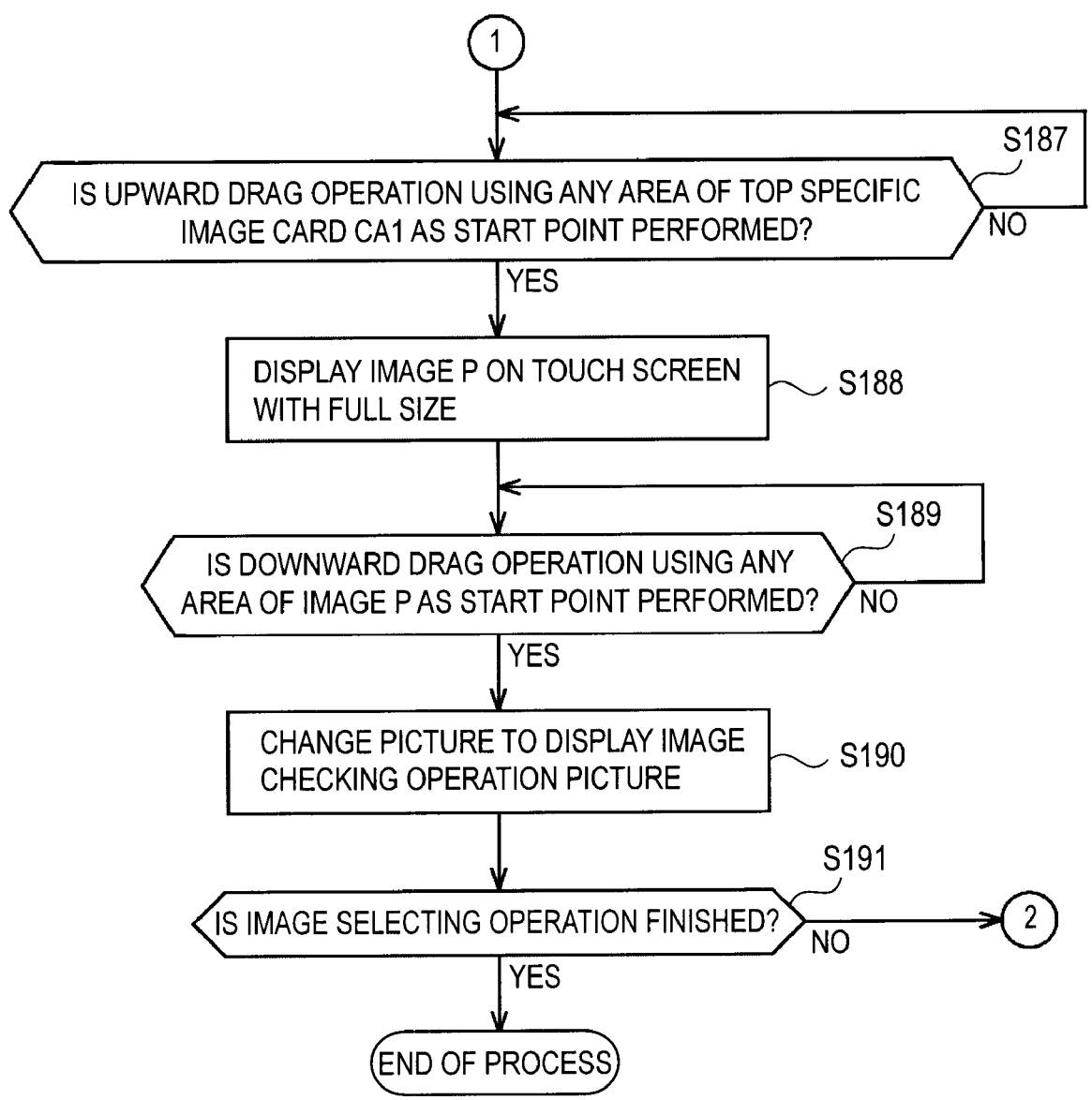
FIG. 33 is a flowchart illustrating the example of the 2B-th image checking and selecting process.

The processes of steps S181 to S186 shown in FIG. 32 are basically the same as the processes of steps S161 to S166 shown in FIG. 28. Accordingly, the description of the processes is omitted.

Therefore, a process after the image P corresponding to the too specific image card CA1 (as shown in FIGS. 30A to 30C and FIGS. 31A and 31B) is displayed thereon (see FIGS. 14A and 14B) in step S185 will be described now. When the process of step S185 is ended, the process of step S187 in FIG. 33 is performed.

In step S187, the CPU 23 determines whether the upward drag operation using any area of the top specific image card CA1 as a start point is performed.

When the upward drag operation is not performed, NO is determined in step S187 and the processes of step S187 and subsequent thereto are repeatedly performed. That is, the determination process of step S187 is repeatedly performed until the upward drag operation is performed.

Thereafter, when the upward drag operation is performed, YES is determined in step S187 and then the process of step S188 is performed.

In step S188, the CPU 23 controls the digital signal processor 15 to display the image P on the touch screen 18 with the full size. That is, the display state of the touch screen 18 is (hanged from the image checking operation picture shown in FIG. 30A to the display state shown in FIG. 30B.

In step S189, the CPU 23 determines whether the downward drag operation using any area of the image P as a start point is performed.

When the downward drag operation is not performed, NO is determined in step S189 and the processes of step S189 and subsequent thereto are repeatedly performed. That is, the determination process of step S189 is repeatedly performed until the downward drag operation is performed.

Thereafter, when the downward drag operation is performed, YES is determined in step S189 and then the process of step S190 is performed.

In step S190, the CPU 23 controls the digital signal processor 15 to change the display state to the image checking operation picture. That is, the display state of the touch screen 18 is changed from the display state of the image P with the full size shown in FIG. 31A to the image checking operation picture shown in FIG. 31B again.

In step S191, the CPU 23 determines whether the image selecting operation is finished.

When the user does not finish the image selecting operation, NO is determined in step S191 and the processes of step S186 in FIG. 32 and subsequent thereto are repeated again.

On the contrary, when the user finishes the image selecting operation, YES is determined in step S191 and the second image checking and selecting process is ended.

Since FIGS. 30A to 30C and FIGS. 31A and 31B are used to describe the second example of the image checking and selecting operation, the state shown in FIG. 26B is employed as an example of the initial display state of the image checking operation picture in the above description. However, the initial display state of the image checking operation picture for embodying the second example of the image checking and selecting operation is not limited to the state shown in FIG. 26B.

For example, the state shown in FIG. 26A, that is, the state shown in FIG. 3A, may be employed as an example of the initial display state of the image checking operation picture.

In this case, the user performs the drag operations with the finger f1 on the area of the overlapping portion of the plural image cards CA. When the contact of the finger f1 with the specific image card CA1 is maintained for a predetermined time, the information indicating the image P corresponding to the specific image card CA1 is displayed (see FIGS. 4A to 4C and FIGS. 5 and 6). That is, the operation up to now is the same as the first example of the image checking operation.

Figure 34:
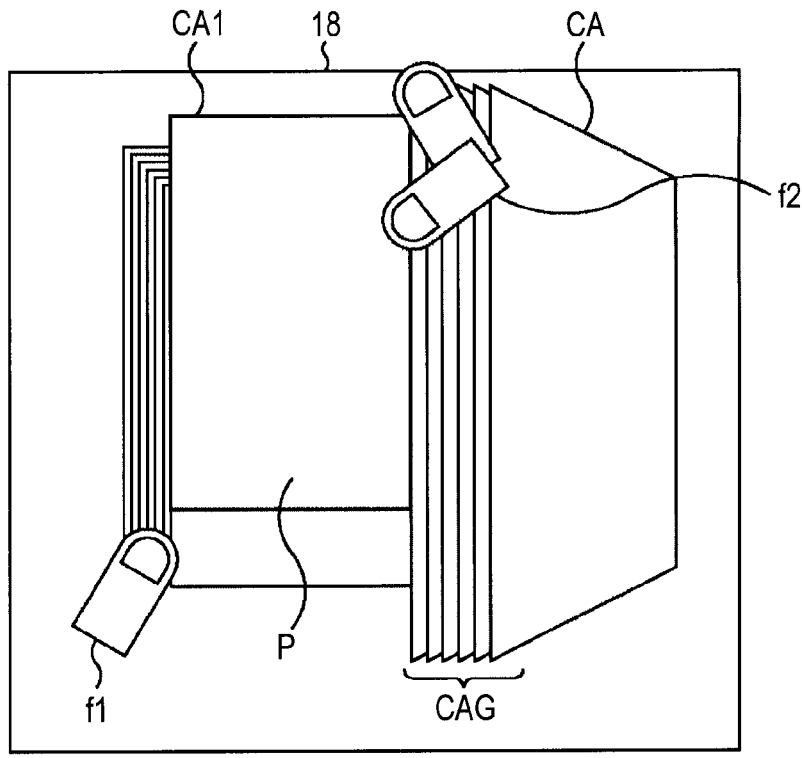
FIG. 34 is a diagram illustrating an example of an initial display state of an image checking operation picture for embodying the second example of the image checking and selecting operation.

On the other hand, as the image selecting operation, the user can perform the upward drag operation indicated by an arrow with the finger f2 using any area of the specific image card CA1 as the start point. Accordingly, the display state of the touch screen 18 is changed from the image checking operation picture shown in FIG. 34 to the display state shown in FIG. 30B. That is, as shown in FIG. 30B, the image P corresponding to the top specific image card CA1 is displayed on the touch screen 18 with the full size.

For example, the state shown in FIG. 7A may be employed as the initial display state of the image checking operation picture.

In this case, the user performs the drag operation with the finger f1 on the range indicated by the arrow in FIG. 7A, that is, on the upper area of the overlapping portion of the plural image cards CA.

When the contact of the finger f1 with the specific image card CA is maintained for a predetermined time while the user is performing the drag operation with the finger f1 on the upper area of the overlapping portion of the image cards CA, the display state of the touch screen 18 is changed from the state shown in FIG. 7A to the state shown in FIG. 7B. That is, the information indicating the image P corresponding to the specific image card CA1 is displayed. The operation up to now is the same as the first example of the image checking operation.

Figure 35:
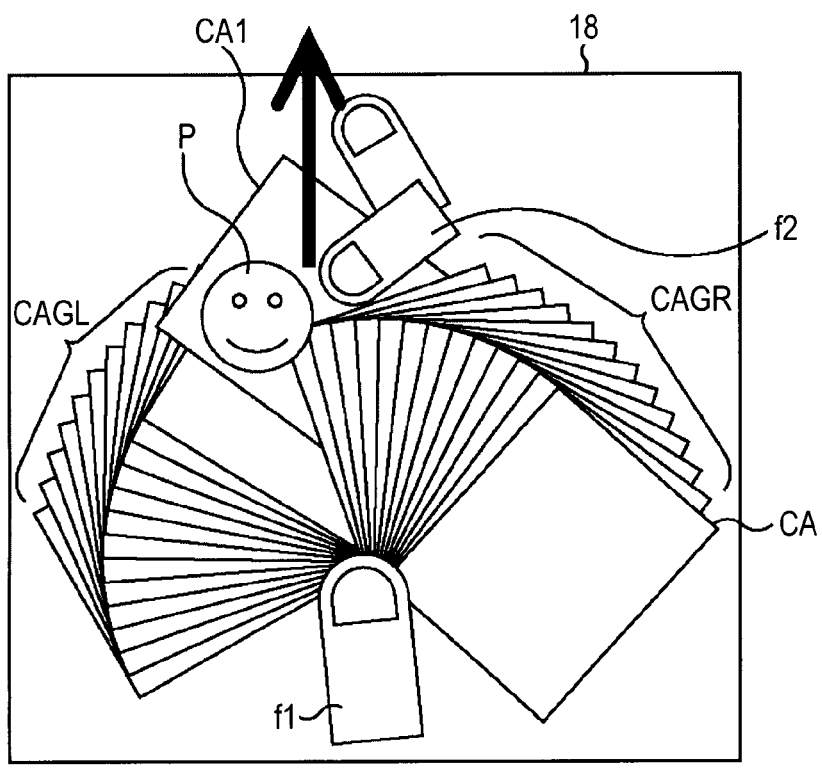
FIG. 35 is a diagram illustrating an example of the initial display state of the image checking operation picture for embodying the second example of the image checking and selecting operation.

On the other hand, as the image selecting operation, the user can perform the upward drag operation indicated by an arrow with the finger f2 using any area of the specific image card CA1 as the start point. Accordingly, the display state of the touch screen 18 is changed from the image checking operation picture shown in FIG. 35 to the display state shown in FIG. 30B. That is, as shown in FIG. 30B, the image P corresponding to the top specific image card CA1 is displayed on the touch screen 18 with the full size.

Various examples of the image checking and selecting operation and various examples of the image checking and selecting process corresponding thereto have been described hitherto.

In the above-mentioned examples, the function assigned to the image selecting operation is a function of displaying the selected image P with the full size. However, the function which can be assigned to the image selecting operation is not particularly limited to the above-mentioned examples.

For example, a function of deleting the image P can be assigned to the image selecting operation. When the function of deleting the image P is assigned to the image selecting operation, the image selecting operation is hereinafter referred to as an image deleting operation.

Specifically, it is assumed that the state shown in FIG. 26B is employed as an example of the initial display state of the image checking operation picture. Accordingly, in the state shown in FIG. 26B, the user performs the drag operations with the finger f1 and the finger f2 on the left and right areas of the overlapping portions of the plural image cards CA, respectively. When the contact of the finger f1 and the finger f2 is maintained in the meantime, the information indicating the image P corresponding to the top specific image card CA1 is displayed (see FIGS. 16A and 16B). That is, the operation up to row is the same as the third example of the image checking operation.

On the other hand, the user can perform the downward drag operation indicated by an arrow with the finger f2 using any area of the top specific image card CA1 as a start point at the time of performing the image deleting operation, as shown in FIG. 36A. Accordingly, as shown in FIG. 36B, the image P corresponding to the top specific image card CA1 is deleted.

Figure 37:
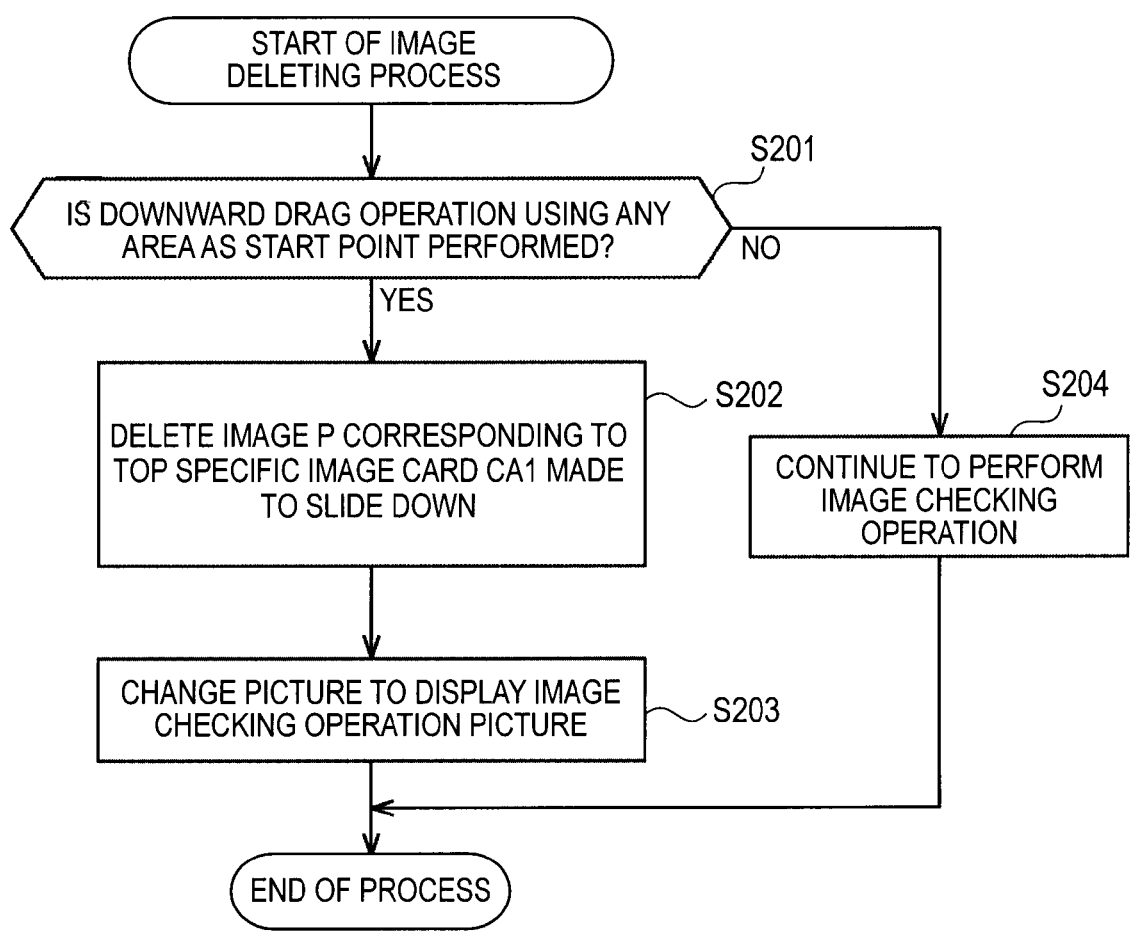
FIG. 37 is a flowchart illustrating an example of an image deleting process.

FIG. 37 is a flowchart illustrating an example of a process (hereinafter, referred to as "image deleting process") performed by the image pickup device in the image deleting operation.

When the state shown in FIG. 26B is employed as the initial display state of the image checking operation picture, the processes of steps S181 to S186 in FIG. 32 are properly performed as the image checking process. When the image P corresponding to the top specific image card CA1 (as shown in FIGS. 36A and 36B) is displayed thereon (see FIGS. 14A and 14B) in the process of step S185, the image deleting process shown in FIG. 37 is started.

In step S201, the CPU 23 determines whether the downward drag operation using any area of the top specific image card CA1 as a start point is performed.

When the downward drag operation is not performed, NO is determined in step S201 and the process of step S204 is then performed. In step S204, the CPU 23 continues to perform the image checking operation. Accordingly, the image deleting process is ended. Therefore, the user can perform the image checking operation and thus the CPU 23 performs the processes of steps S181 to S186 in FIG. 32.

On the contrary, when the downward drag operation is performed, YES is determined in step S201 and the process of step S202 is then performed.

In step S202, the CPU 23 controls the digital signal processor 15 to perform the process of deleting the image P corresponding to the top specific image card CA1 made to slide down.

In step S203, the CPU 23 controls the digital signal processor 15 to change the display state to the image checking operation picture. Accordingly, the image deleting process is ended. Therefore, the user can perform the image checking operation and thus the CPU 23 performs the processes of steps S181 to S186 in FIG. 32.

An example where the function of deleting the image P is assigned to the image selecting operation has been described hitherto.

In addition, for example, a function of registering the image P as a favorite image or registering the image as a sharing image may be assigned to the image selecting operation. When the function of registering the image P is assigned to the image selecting operation, the image selecting operation is referred to as an image registering operation.

Specifically, it is assumed that the state shown in FIG. 26B is employed as an example of the initial display state of the image checking operation picture. Accordingly, in the state shown in FIG. 26B, the user performs the drag operations with the finger f1 and the finger f2 on the left and right areas of the overlapping portions of the plural image cards CA, respectively. When the contact of the finger f1 and the finger f2 is maintained in the meantime, the information indicating the image P corresponding to the top specific image card CA1 is displayed (see FIGS. 16A and 16B). That is, the operation up to now is the same as the third example of the image checking operation.

Figures 38A, 38B:
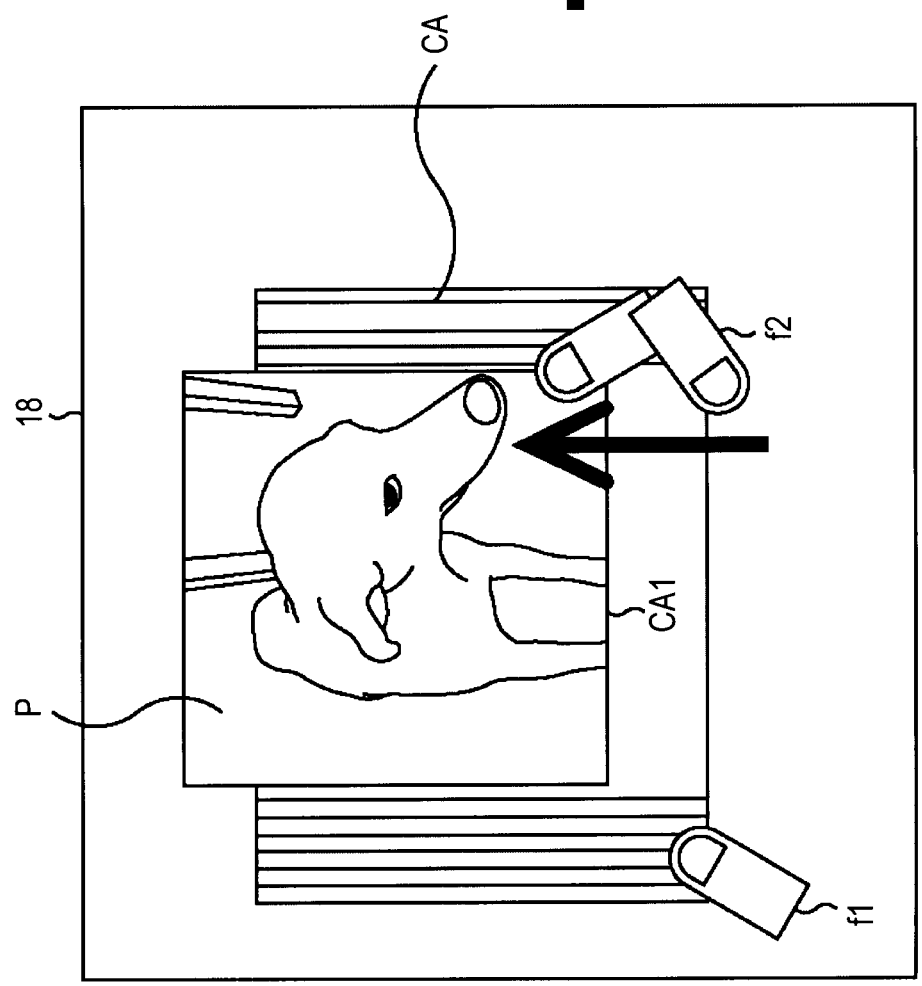
FIGS. 38A and 38B are diagrams illustrating an example of an image registering operation.

On the other hand, the user can perform the upward drag operation indicated by an arrow with the finger f2 using any area of the top specific image card CA1 as a start point at the time of performing the image registering operation, as shown in FIG. 38A. Accordingly, as shown in FIG. 38B, the image P corresponding to the top specific image card CA1 is registered as the favorite image or the sharing image.

Figure 39:
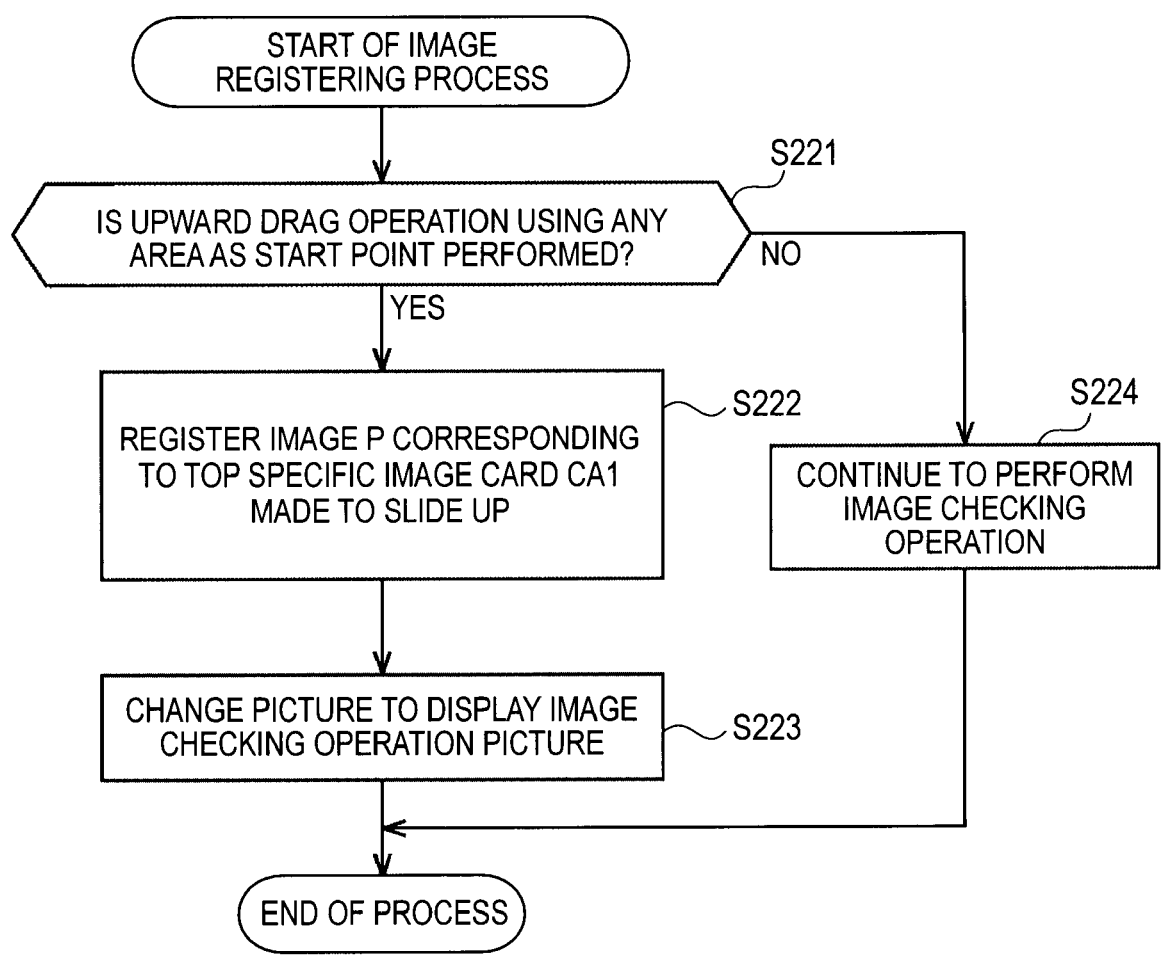
FIG. 39 is a flowchart illustrating an example of an image registering process.

FIG. 39 is a flowchart illustrating an example of a process (hereinafter, referred to as "image registering process") performed by the image pickup device in the image registering operation.

When the state shown in FIG. 26B is employed as the initial display state of the image checking operation picture, the processes of steps S181 to S186 in FIG. 32 are properly performed as the image checking process. When the image P corresponding to the top specific image card CA1 (as shown in FIGS. 36A and 36B) is displayed thereon (see FIGS. 14A and 14B) in the process of step S185, the image registering process shown in FIG. 39 is started.

In step S221, the CPU 23 determines whether the upward drag operation using any area of the top specific image card CA1 as a start point is performed.

When the upward drag operation is not performed, NO is determined in step S221 and the process of step S224 is then performed. In step S224, the CPU 23 continues to perform the image checking operation. Accordingly, the image registering process is ended. Therefore, the user can perform the image checking operation and thus the CPU 23 performs the processes of steps S181 to S186 in FIG. 32.

On the contrary, when the upward drag operation is performed, YES is determined in step S221 and the process of step S222 is then performed.

In step S222, the CPU 23 controls the digital signal processor 15 to perform the process of registering the image P corresponding to the top specific image card CA1 made to slide up. Accordingly, the image P is registered as the favorite image or the sharing image.

In step S223, the CPU 23 controls the digital signal processor 15 to change the display state to the image checking operation picture. Accordingly, the image registering process is ended. Therefore, the user can perform the image checking operation and thus the CPU 23 performs the processes of steps S181 to S186 in FIG. 32.

The above-mentioned operations such as the image deleting operation and the image registering operation can be arranged in view of the sliding direction of the image cards CA as follows. That is, when the specific image card CA1 slides to the right side (when the right drag operation is performed), the image checking process is performed to move the specific image card CA1 to the right side and to display the next image card CA2 on the top. When the specific image card CA1 slides down (when the downward drag operation is performed), the image deleting process is performed to delete the image P corresponding to the specific image card CA1. When the specific image card CA1 slides up (when the upward drag operation is performed), the image registering process is performed to register the image P corresponding to the specific image card CA1 as the favorite image or the sharing image.

In this way, a specific meaning can be given to the sliding direction of the image card CA. Accordingly, the user can more intuitively perform various operations, thereby allowing the image pickup device to perform the corresponding functions.

The sliding direction of the image card CA is not particularly limited.

Figure 40:
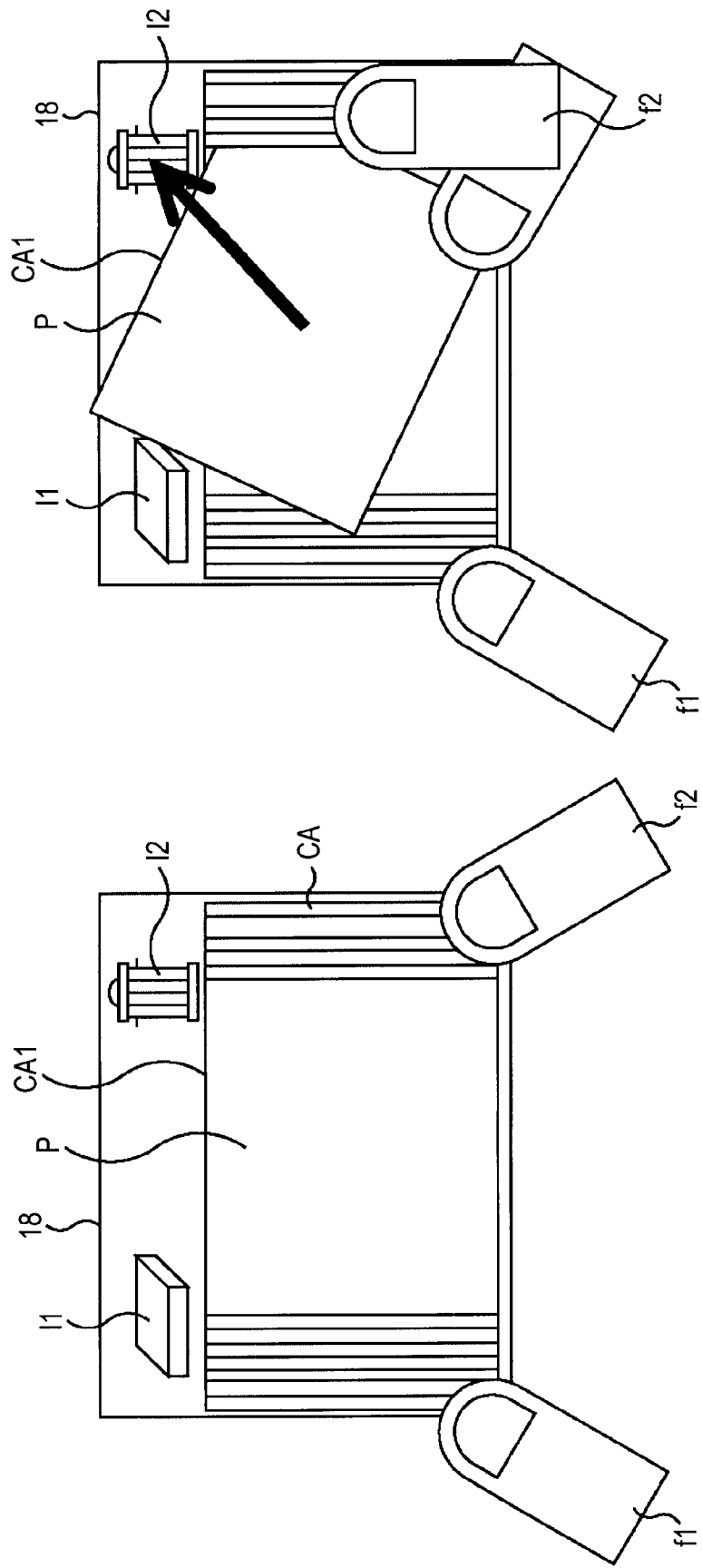
FIGS. 40A and 40B are diagrams illustrating a variety of operations depending on slide directions.

For example, as shown in FIG. 40A, it is assumed that an icon I1 (hereinafter, referred to as "registration icon I1") for registering an image P is displayed in the left-upper area of the touch screen 18 and an icon 12 (hereinafter, referred to as "deletion icon 12") for deleting an image P is displayed in the right upper area of the touch screen 18.

In this case, for example, as shown in FIG. 40B, the user performs the upward drag operation indicated by an arrow with the finger f2 obliquely to the right side using any area of the top specific image card CA1 as a start point and releases the finger f2 in the vicinity of the deletion icon 12. Then, the image P corresponding to the top specific image card CA1 is deleted.

For example, although not shown, the user performs the upward drag operation indicated by an arrow with the finger f2 obliquely to the left side using any area of the top specific image card CA1 as a start point and releases the finger f2 in the vicinity of the registration icon I1. Then, the image P corresponding to the top specific image card CA1 is registered as the favorite image or the sharing image.

In the above-mentioned examples, the deletion function and the registration function are assigned to the sliding directions of the image card CA. However, the functions assigned to the sliding directions of the image card CA are not particularly limited as described above.

Figure 41:
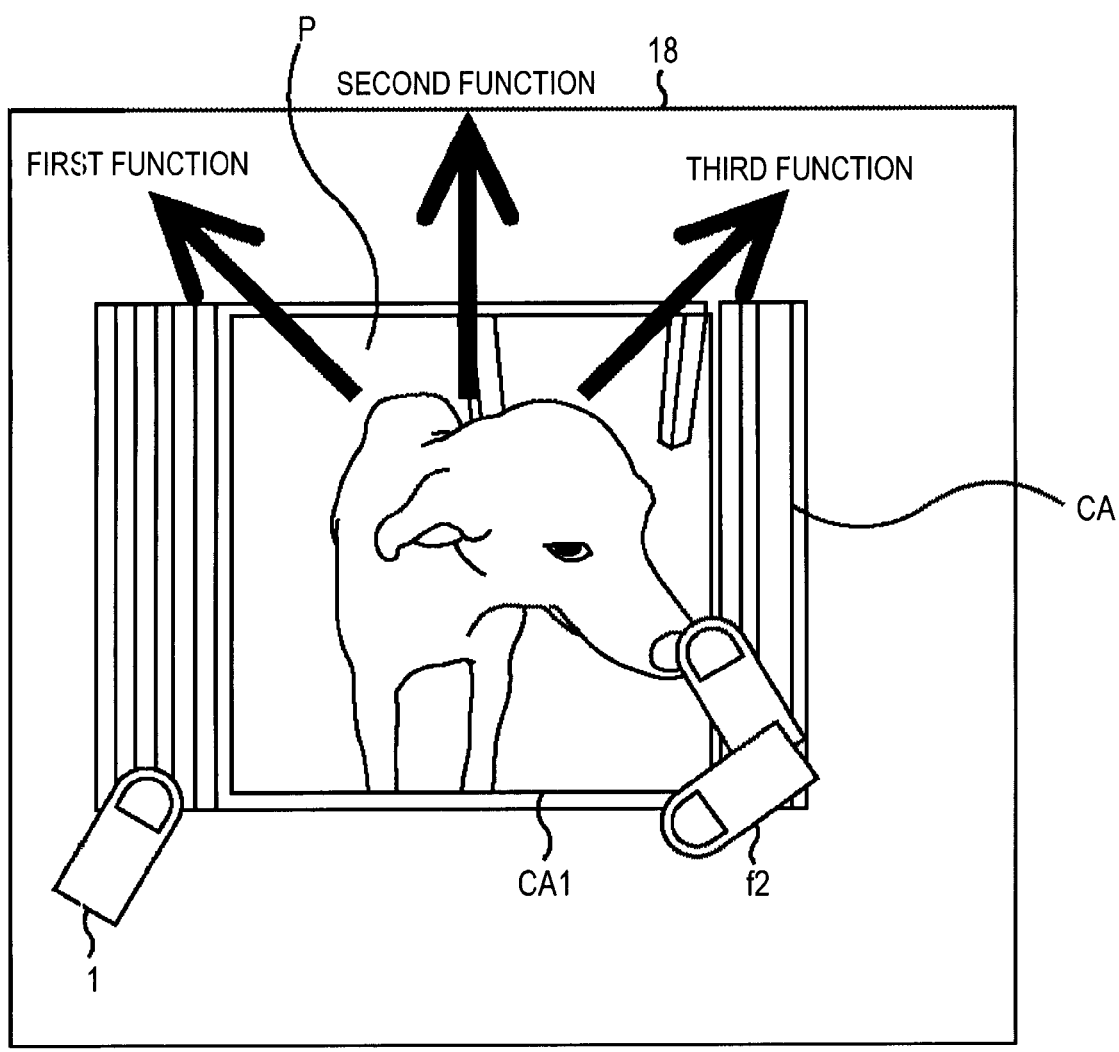
FIG. 41 is a diagram illustrating a variety of operations depending on the slide directions.

For example, as shown in FIG. 41, first to third functions different from each other may be prepared. In this case, it is possible to easily assign the first function to the oblique left-upward sliding direction of the image card CA, to easily assign the second function to the direct upward sliding direction of the image card CA, and to easily assign the third function to the oblique right-upward sliding direction of the image card CA.

The above-mentioned series of processes may be performed by hardware, but may be embodied by software.

Figure 42:
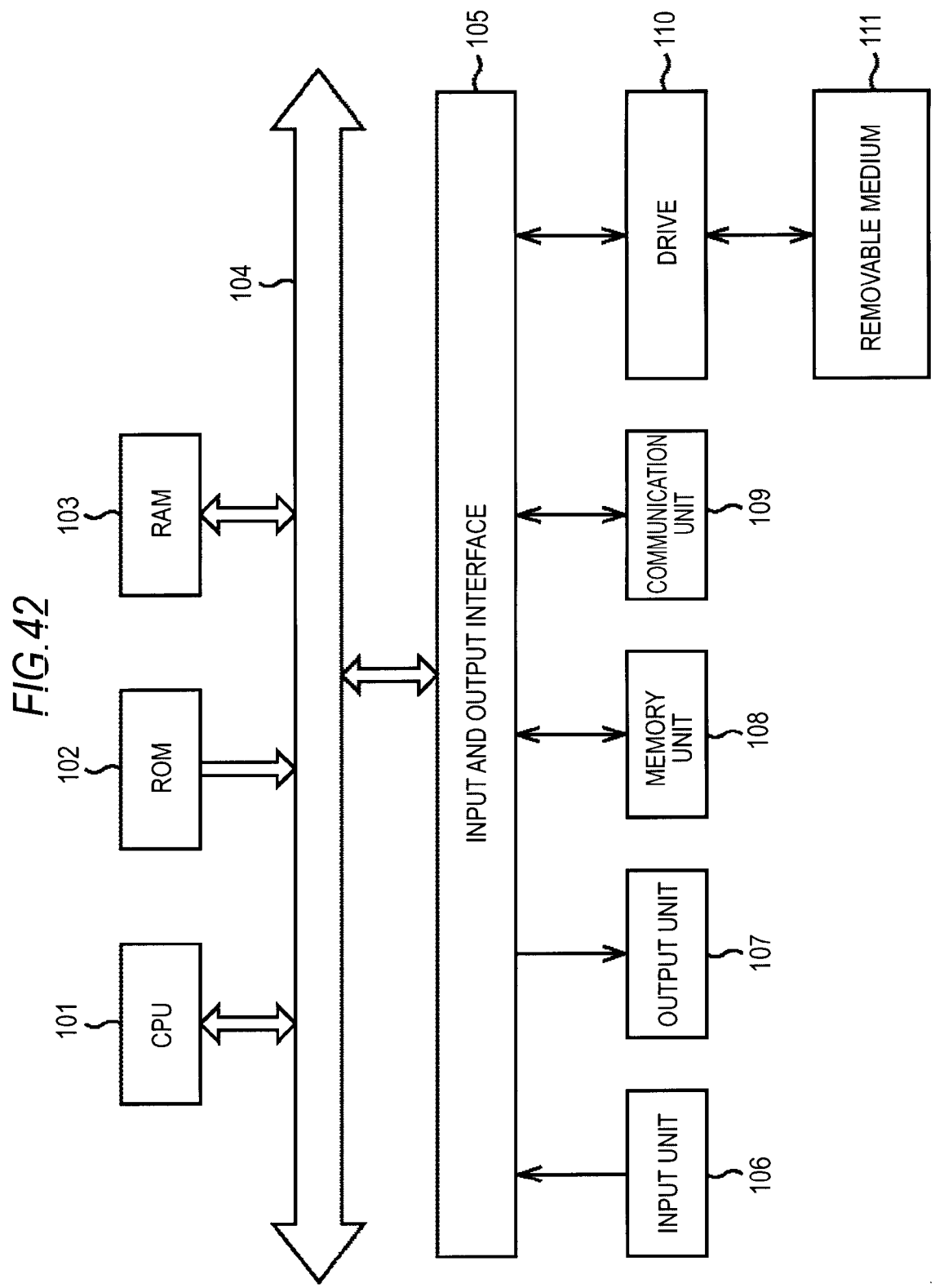
FIG. 42 is a block diagram illustrating a configuration of an information processing apparatus according to an embodiment of the invention, which is different from the configuration shown in FIG. 1.

In this case, the series of processes may be performed by the image pickup device shown in FIG. 1 and may be performed, for example, by a personal computer shown in FIG. 42.

In FIG. 42, a CPU 101 performs a variety of processes in accordance with programs stored in a ROM (Read Only Memory) 102 or programs loaded to a RAM (Random Access Memory) 103 from a memory unit 108. Data necessary for the CPU 101 to perform the processes are properly stored in the RAM 103.

The CPU 101, the ROM 102, and the RAM 103 are connected to each other via a bus 104. An input and output interface 105 is connected to the bus 104.

An input unit 106 including a keyboard and a mouse, an output unit 107, a memory unit 108 including a hard disc, and a communication unit 109 including a modem and a terminal adaptor are connected to the input and output interface 105. The communication unit 109 controls communications with other devices (not shown) via a network including Internet.

A drive 110 is connected to the input and output interface 105 as needed and a removable medium 111 such as a magnetic disc, an optical disc, a magneto-optical disc, or a semiconductor memory is properly mounted thereon. Computer programs read therefrom are installed in the memory unit 108 as needed.

When the series of processes are performed by software, the programs of the software are installed from a network or a recording medium in a computer assembled into exclusive hardware or a general-purpose personal computer capable of performing a variety of functions by installing a variety of programs.

As shown in FIG. 1 or 42, separately from the device body, the recording medium storing the programs may include a removable medium (package medium) 111, which is distributed to provide programs to users, such as a magnetic disc (including a floppy disc), an optical disc (including a CD-ROM (Compact Disk-Read Only Memory) and a DVD (Digital Versatile Disk)), a magneto-optical disk (including MD (Mini-Disk)), and a semiconductor memory which store programs and may include a hard disk included in the program ROM 26 shown in FIG. 1 and the ROM 102 and the memory unit 108 shown in FIG. 42 which store the programs and which are provided to users in a state where they are already assembled into the device body.

In this specification, the steps describing the programs recorded in the recording medium include processes which are sequentially performed in time series and processes which are performed in parallel or separately instead of being performed in time series.

A liquid crystal display device such as the liquid crystal display panel 17 has been described as the display device of which the display is controlled by the information processing apparatus according to the embodiments of the invention. However, the invention can be applied to the following display devices as well as the liquid crystal display panel. That is, the invention can be applied to a display device of which a display is instructed every unit (hereinafter, referred to as "segment") called frame or field constituting a moving image and which can maintain the display of at least some display elements among display elements constituting plural pixels of one segment for a predetermined time. These display elements are called holding-type display elements and a display device of which a screen is constructed by the display elements is called a holding-type display device. That is, the liquid crystal display device is only an example of the holding-type display device and the invention can be applied to all the holding-type display devices.

In addition to the holding-type display devices, the invention can be applied to voluntary surface-emitting display devices using organic EL (Electroluminescence) elements as light-emitting elements. That is, the invention can be applied to all the display devices including display elements which display plural pixels constituting an image. This display device is called a pixel-type display device. Here, in the pixel-type display device, one display element need not correspond to one pixel.

In other words, any display device can be used as the display device of which the display is controlled by the information processing apparatus according to the embodiments of the invention, as long as it is a display device capable of performing the above-mentioned series of processes.

The present application contains subject matter related to that disclosed in Japanese Priority Patent Application JP 2008-220895 filed in the Japan Patent Office on Aug. 29, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   display means for displaying an image out of a plurality of stored images;
   operation input receiving means for receiving a user's operation input; and
   display control means for controlling the plurality of stored images to correspond to a plurality of image cards, displaying a check image, which indicates a shape in which the plurality of image cards overlap, on the display means, and displaying at least a portion of the image which corresponds to a specific image card out of the plurality of the image cards when a check operation indicating an instruction to check the specific image card among the plurality of image cards is received by the operation input receiving means,
   wherein when an operation of moving a user's finger by a predetermined distance in a predetermined direction with the user's finger in contact with the display means is a drag operation, the drag operation on an overlapping portion of the plurality of image cards is employed as the check operation, and wherein the display control means recognizes an image card among the plurality of image cards in contact with the user's finger as the specific image card when a stop of the drag operation with the user's finger is received by the operation input receiving means, and
   wherein when the specific image card is not the top image card displayed in the overlapping portion of the plurality of image cards, the display control means displays the at least a portion of the image corresponding to the specific image card without changing a sequence position of the specific image card in the overlapping portion of the plurality of image cards.

2. The information processing apparatus according to claim 1, wherein the display control means displays the plurality of image cards as bound or as overlapping in a fan shape as the check image indicating a shape in which the plurality of image cards overlap.

3. The information processing apparatus according to claim 1, wherein the display control means displays the at least a portion of the image corresponding to the specific image card as one of a portion of the image, a thumbnail of the image, and a feature image which is a featured portion of the image as the information indicating the image.

4. The information processing apparatus according to claim 3, wherein the portion of the image is one of both end portions of the image or a center portion of the image.

5. The information processing apparatus according to claim 1, wherein the display control means recognizes a top image card of the plurality of image cards as the specific image card, displays overlapping portions of the image cards on the left and right sides of the specific image card, and displays the overlapping portions behind the top image card.

6. The information processing apparatus according to claim 1, wherein the display control means recognizes a predetermined image card of the plurality of image cards as the specific image card and sequentially displays overlapping portions on the left and right sides of the specific image card.

7. The information processing apparatus according to claim 5 or 6, wherein the display control means updates the specific image card and displays one of an image corresponding to the updated specific image card and information indicating the image, by shifting the plurality of image cards to one side of the left and right sides of the specific image card when a one-side drag operation on the overlapping portion displayed on the one side and the one-side drag operation on the overlapping portion displayed on the other side are received by the operation input receiving means.

8. An information processing method of an information processing apparatus which displays an image out of a plurality of stored images on a display means and receives a user's operation input, the information processing method comprising the steps of:
   controlling the plurality of stored images to correspond to a plurality of image cards;
   displaying a check image which indicates a shape in which the plurality of image cards overlap; and
   displaying at least a portion of the image which corresponds to a specific image card out of the plurality of image cards when a check operation indicating an instruction to check the specific image card among the plurality of image cards is received,
   wherein when an operation of moving a user's finger by a predetermined distance in a predetermined direction with the user's finger in contact with the display means is a drag operation, the drag operation on an overlapping portion of the plurality of image cards is employed as the check operation, and recognizing an image card among the plurality of image cards in contact with the user's finger as the specific image card when a stop of the drag operation with the user's finger is detected, and
   wherein when the specific image card is not the top image card displayed in the overlapping portion of the plurality of image cards, the displaying includes displaying the at least a portion of the image corresponding to the specific image card without changing a sequence position of the specific image card in the overlapping portion of the plurality of image cards.

9. A non-transitory computer readable storage medium encoded with computer executable instructions, which when executed by an information processing apparatus that displaying an image on a display means and receiving a user's operation input, causes the information processing apparatus to perform process comprising the steps of:
   controlling the plurality of stored images to correspond to a plurality of image cards;
   displaying a check image which indicates a shape in which the plurality of image cards overlap; and
   displaying at least a portion of the image which corresponds to a specific image card out of the plurality of image cards when a check operation indicating an instruction to check the specific image card among the plurality of image cards is received,
   wherein when an operation of moving a user's finger by a predetermined distance in a predetermined direction with the user's finger in contact with the display means is a drag operation, the drag operation on an overlapping portion of the plurality of image cards is employed as the check operation, and recognizing an image card among the plurality of image cards in contact with the user's finger as the specific image card when a stop of the drag operation with the user's finger is detected, and
   wherein when the specific image card is not the top image card displayed in the overlapping portion of the plurality of image cards, the displaying includes displaying the at least a portion of the image corresponding to the specific image card without changing a sequence position of the specific image card in the overlapping portion of the plurality of image cards.

10. An information processing apparatus comprising:
a display unit configured to display an image out of a plurality of stored images;
an operation input receiving unit configured to receive a user's operation input; and
a display control unit configured to control the plurality of stored images to correspond to a plurality of image cards, displaying a check image, which indicates a shape in which the plurality of image cards overlap, on the display unit, and displaying at least a portion of the image which corresponds to a specific image card out of the plurality of image cards when a check operation indicating an instruction to check the specific image card among the plurality of image cards is received by the operation input receiving unit,
wherein when an operation of moving a user's finger by a predetermined distance in a predetermined direction with the user's finger in contact with the display unit is a drag operation, the drag operation on an overlapping portion of the plurality of image cards is employed as the check operation, and wherein the display control unit recognizes an image card among the plurality of image cards in contact with the user's finger as the specific image card when a stop of the drag operation with the user's finger is received by the operation input receiving unit, and
wherein when the specific image card is not the top image card displayed in the overlapping portion of the plurality of image cards, the display control unit displays the at least a portion of the image corresponding to the specific image card without changing a sequence position of the specific image card in the overlapping portion of the plurality of image cards.

* * * * *